(12) United States Patent
Zhang

(10) Patent No.: US 12,413,964 B2
(45) Date of Patent: Sep. 9, 2025

(54) METHOD AND DEVICE USED FOR WIRELESS COMMUNICATION

(71) Applicant: BUNKER HILL TECHNOLOGIES LLC, Allen, TX (US)

(72) Inventor: Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 423 days.

(21) Appl. No.: 17/978,222

(22) Filed: Nov. 1, 2022

(65) Prior Publication Data
US 2023/0050029 A1   Feb. 16, 2023

Related U.S. Application Data

(63) Continuation of application No. PCT/CN2021/096662, filed on May 28, 2021.

(30) Foreign Application Priority Data

May 30, 2020 (CN) .......................... 202010480728.4
Jun. 6, 2020 (CN) .......................... 202010508580.0

(51) Int. Cl.
H04W 12/037   (2021.01)
(52) U.S. Cl.
CPC ................................. H04W 12/037 (2021.01)
(58) Field of Classification Search
CPC .................................................. H04W 12/037
See application file for complete search history.

(56) References Cited

U.S. PATENT DOCUMENTS

| 10,952,230 | B1* | 3/2021 | Pan | H04W 28/0268 |
| 12,231,524 | B2* | 2/2025 | Kim | H04L 69/22 |
| 2015/0264615 | A1* | 9/2015 | Zhao | H04W 24/10 370/329 |
| 2017/0181206 | A1* | 6/2017 | Lee | H04W 76/32 |

(Continued)

FOREIGN PATENT DOCUMENTS

| WO | 2016122533 A1 | 8/2016 |
| WO | 2020076027 A1 | 4/2020 |

OTHER PUBLICATIONS

ISR received in application No. PCT/CN2021/096662 dated Aug. 10, 2021.

(Continued)

Primary Examiner — Melanie Jagannathan
(74) Attorney, Agent, or Firm — Ascenda Law Group, PC

(57) ABSTRACT

The present disclosure provides a method and a device used for wireless communications, comprising: transmitting a first transmission on a first SDU, including transmitting a first MAC PDU group; the first MAC PDU group at least comprises a first MAC PDU; receiving a first signaling and a first status report, the first signaling being used to indicate that a first ID is renewed as a second ID; the first status report is used to indicate that the first SDU is not received yet; and performing a second transmission on the first SDU, including transmitting a second MAC PDU group; the second MAC PDU group at least comprises a second MAC PDU; the first signaling is used to trigger the first status report. By transmitting the first SDU in a rational way, the present disclosure helps improve reliability and prevent risks in communications.

20 Claims, 8 Drawing Sheets

(56) References Cited

U.S. PATENT DOCUMENTS

| | | | |
|---|---|---|---|
| 2019/0364617 A1 | 11/2019 | Wu | |
| 2020/0045674 A1* | 2/2020 | Tseng | H04W 76/14 |
| 2020/0163005 A1* | 5/2020 | Rao | H04W 4/44 |
| 2020/0205209 A1* | 6/2020 | Pan | H04W 4/40 |
| 2020/0221329 A1* | 7/2020 | Kim | H04W 12/037 |
| 2020/0337083 A1* | 10/2020 | Loehr | H04W 72/1263 |
| 2020/0351699 A1* | 11/2020 | Pan | H04W 28/0268 |
| 2021/0127362 A1* | 4/2021 | Jin | H04W 80/02 |
| 2021/0211924 A1* | 7/2021 | Pan | H04W 28/0268 |
| 2021/0345356 A1* | 11/2021 | Fan | H04W 72/543 |
| 2022/0007231 A1* | 1/2022 | Basu Mallick | H04W 28/0284 |
| 2022/0124489 A1* | 4/2022 | Lu | H04W 76/23 |
| 2022/0141897 A1* | 5/2022 | Lee | H04W 72/20 370/329 |
| 2022/0167441 A1* | 5/2022 | Lee | H04W 28/0278 |
| 2022/0256412 A1* | 8/2022 | Kim | H04W 28/06 |
| 2022/0303821 A1* | 9/2022 | Kang | H04W 28/0278 |
| 2022/0345252 A1* | 10/2022 | Loehr | H04L 1/1874 |
| 2022/0377800 A1* | 11/2022 | Chin | H04W 74/0833 |
| 2023/0007721 A1* | 1/2023 | Chun | H04W 76/19 |
| 2023/0063472 A1* | 3/2023 | Freda | H04W 52/0274 |
| 2023/0070446 A1* | 3/2023 | Lee | H04W 76/10 |
| 2024/0357422 A1* | 10/2024 | Kim | H04W 76/19 |

OTHER PUBLICATIONS

First Office Action of Chinses patent application No. CN202010508580.0 dated May 7, 2022.
Second Office Action of Chinses patent application No. CN202010508580.0 dated Oct. 10, 2022.
First Search Report of Chinses patent application No. CN202010508580.0 dated Apr. 26, 2022.
Qualcomm Technologies Inc Corrections to NR5G PDCP TC 7.1.3.4.1 and 7.1.3.4.2 3GPP TSG-RAN5 Meeting #87-e R5-201642 May 9, 2020.
Huawei Rapporteur's review 3GPP TSG-RAN WG3 Meeting #86 R3-142641 Nov. 7, 2014.
LG Electronics Inc. Discussion on PDCP status report for DAPS HO 3GPP TSG-RAN WG2 #109-e R2-2001507 Feb. 14, 2020.
LG Electronics Inc. (summary rapporteur) Outcome of offline discussion 209 for closing UP issues (PDCP/RLC/MAC) and discussing remaining open items for DAPS 3GPP TSG-RAN WG2 Meeting #109-e R2-2002165 Mar. 11, 2020.
Intel Corporation Report of [108#66][LTE NR Mob] Open issues for LTE and NR mobility (Intel) 3GPP TSG-RAN WG2 Meeting #109 electronic R2-2000461 Feb. 14, 2020.
Datang Linktester Technology Co., Ltd. Updates to AM RLC / Reassembling of AMD PDUs TCs 7.1.2.3.9 3GPP TSG-RAN5 Meeting #84 R5s190493 Jul. 15, 2019.

* cited by examiner

METHOD AND DEVICE USED FOR WIRELESS COMMUNICATION

CROSS REFERENCE TO RELATED APPLICATIONS

This application is a continuation of International Application No. PCT/CN2021/096662, filed May 28, 2021, which claims the priority benefit of Chinese Patent Application No. 202010480728.4, filed on May 30, 2020, and claims the priority benefit of Chinese Patent Application No. 202010508580.0, filed on Jun. 6, 2020 the full disclosure of which is incorporated herein by reference.

BACKGROUND

Technical Field

The present disclosure relates to transmission methods and devices used in wireless communication systems, and in particular to a transmission method and device in wireless communications for improving the system efficiency, optimizing resource utilization, reducing traffic interruption, enhancing traffic continuity and reliability and better safeguarding security and privacy.

Related Art

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

In communications, both Long Term Evolution (LTE) and 5G NR involves correct reception of reliable information, optimized energy efficiency ratio (EER), determination of information validity, flexible resource allocation, elastic system structure, effective information processing on non-access stratum, and lower traffic interruption and call drop rate, higher security and privacy and support to lower consumption, which play an important role in the normal communication between a base station and a User Equipment (UE), rational scheduling of resources, and also in the balance of system payload, thus laying a solid foundation for increasing throughput, meeting a variety of traffic needs in communications, enhancing the spectrum utilization and improving service quality. Therefore, LTE and 5G are indispensable no matter in enhanced Mobile BroadBand (eMBB), Ultra Reliable Low Latency Communication (URLLC) or enhanced Machine Type Communication (eMTC). And a wide range of requests can be found in terms of Industrial Internet of Things (IIoT), Vehicular to X (V2X), and Device to Device (D2D), Unlicensed Spectrum communications, and monitoring on UE communication quality, network plan optimization, Non Terrestrial Network (NTN) and Terrestrial Network (TN), Dual connectivity system, radio resource management and multi-antenna codebook selection, primary link communication or sidelink communication as well as signaling design, neighbor management, traffic management and beamforming. Information is generally transmitted by broadcast and unicast, and both ways are beneficial to fulfilling the above requests and make up an integral part of the 5G system.

As the number and complexity of system scenarios increases, more and more demands have been made on reducing interruption rate and latency, strengthening reliability and system stability, increasing the traffic flexibility and power conservation, and in the meantime the compatibility between different versions of systems shall be taken into account for system designing.

SUMMARY

In various communication scenarios, the inter-UE communication scenario relates to reliable link establishment and maintenance, the address management and configuration, inter-layer coordination and the issue of security arising therefrom. Due to the lack of central node management in the inter-UE communication, especially in communications out of coverage of a serving cell, the authentication between these two UEs is more likely to be threatened. Therefore, a feasible solution is proposed to update parameters of the UEs in a periodical manner or at intervals, including information of the UE's identity (ID) and secure algorithm. In the parameter updating, any inappropriate processing will probably allow a listener to infer updated information from previously obtained information, thus raising the chance of security threat against users. For example, a listener usually spends a long time tracking and requires a large amount of calculation before cracking an encrypted key, the longer the tracking, the higher possibility of the deciphering. If the listener is able to infer new information from old information or associate them, which to some extent means that the UE fails to be updated effectively, there will be a drastic increase of security threat to the user as time passes by, and relevant security issues are reflected in the encryption, authentication and certification, privacy and integrity protection of data and control information. Besides, when a listener is aware of the user's communication mode, the security and privacy of the user are more likely to be violated, and parameters such as the user address are likely to be exposed, which may result in illegal tracking of the user. These are all difficulties that remain to be handled in inter-UE communications, particularly in sidelink communications.

To address the above problem, the present disclosure provides a solution.

It should be noted that if no conflict is incurred, the embodiments of any node in the present disclosure and the characteristics in the embodiments can be applied to any other node, and vice versa. And the embodiments in the present disclosure and characteristics in the embodiments can be mutually combined if there is no conflict.

The present disclosure provides a method in a first node for wireless communications, comprising:
  performing a first transmission on a first Service Data Unit (SDU); the action of performing a first transmission on the first SDU including transmitting a first Medium Access Control (MAC) Protocol Data Unit (PDU) group; the first MAC PDU group at least comprising a first MAC PDU;
  receiving a first signaling and a first status report, the first signaling being used to indicate that a first ID is renewed as a second ID; the first status report being used to indicate that the first SDU is not received yet; and
  performing a second transmission on the first SDU; the action of performing a second transmission on the first SDU including transmitting a second MAC PDU group; the second MAC PDU group at least comprising a second MAC PDU;

herein, the first signaling is used to trigger the first status report, and the first ID and the second ID are link layer IDs, respectively; the first MAC PDU group carries the first SDU; the first MAC PDU group comprises at least part of bits comprised in the first ID; and the second MAC PDU group carries the first SDU; the second MAC PDU group comprises at least part of bits comprised in the second ID.

In one embodiment, a problem to be solved in the present disclosure includes that during UE-UE communication, especially when relating to sidelink communication, users are required to update their identities frequently to ensure security. The update of user ID can be done at any time and independent from data transmission; but an ID being updated will influence the data transmission, for the reason that data has to be identified by an ID in sidelink to ensure the correct recognition and reception of a receiver. The ID updating shall be performed simultaneously by both sides of communication so as to avoid being tracked by the listener. However, a new ID of the user may be revealed by data transmission, because the listener is probable to infer that a user ID has already been updated according to ID information associated with previously transmitted data, and then associate with a new ID and track it. In conclusion, the technical issue to be solved herein includes how to process data transmission and retransmission during ID updating to prevent security vulnerabilities such as being tracked down. By utilizing a first status report to determine some data not yet received correctly and associating the data with a renewed user ID, the present disclosure manages to solve the above-mentioned problem.

In one embodiment, the above method is advantageous in that there won't be any impact on data transmission and reception, mainly reflected by the fact that if data reception is failed, the data is to be retransmitted, and the retransmission does not affect security, besides, the listener is unable to track how a user ID changes according to data retransmission; and the method proposed hereby not only supports link ID updating initiated by any party but ensures the security of ID updates and the reliability of data transmission.

In one embodiment, characteristics of the above method include that MAC refers to Medium Access Control.

In one embodiment, characteristics of the above method include that SDU refers to Service Data Unit.

In one embodiment, characteristics of the above method include that PDU refers to Protocol Data Unit.

Specifically, according to one aspect of the present disclosure, the action of performing a first transmission on the first SDU includes:

transmitting a first physical layer signaling, the first physical layer signaling comprises configuration information of a first channel, and the first MAC PDU is transmitted on the first channel;

herein, the first physical layer signaling and the first MAC PDU jointly comprise the first ID.

Specifically, according to one aspect of the present disclosure, the action of performing a second transmission on the first SDU includes:

transmitting a second physical layer signaling, the second physical layer signaling comprises configuration information of a second channel, and the second MAC PDU is transmitted on the second channel;

herein, the second physical layer signaling and the second MAC PDU jointly comprise the second ID.

Specifically, according to one aspect of the present disclosure, the first status report indicates that a first SDU set is not received, the first SDU set comprising the first SDU.

Specifically, according to one aspect of the present disclosure, comprising:

receiving a second signaling; and transmitting a third signaling;

herein, the second signaling is used to trigger the third signaling, and the third signaling is used to trigger the first signaling.

Specifically, according to one aspect of the present disclosure, characterized in that:

the first signaling is used to indicate that a first part of a first key ID is renewed as a first part of a second key ID; the action of performing a first transmission on the first SDU includes: the first transmitter, using the first key ID to encrypt the first SDU; the action of performing a second transmission on the first SDU includes: the first transmitter, using the second key ID to encrypt the first SDU.

Specifically, according to one aspect of the present disclosure, comprising:

receiving a fourth signaling;

herein, the fourth signaling is used to indicate that a first logical channel ID is renewed as a second logical channel ID; the action of performing a first transmission on the first SDU includes: applying the first logical channel ID in secure algorithm of the first SDU; the action of performing a second transmission on the first SDU includes: applying the second logical channel ID in secure algorithm of the first SDU.

Specifically, according to one aspect of the present disclosure, the first node is a User Equipment (UE).

Specifically, according to one aspect of the present disclosure, the first node is an Internet-of-Things (IoT) terminal.

Specifically, according to one aspect of the present disclosure, the first node is a relay.

Specifically, according to one aspect of the present disclosure, the first node is a vehicle-mounted terminal.

Specifically, according to one aspect of the present disclosure, the first node is an aircraft.

The present disclosure provides a method in a second node for wireless communications, comprising:

failing to correctly receive a first MAC PDU group; the first MAC PDU group at least comprises a first MAC PDU;

transmitting a first signaling and a first status report, the first signaling being used to indicate that a first ID is renewed as a second ID; the first status report is used to indicate that a first SDU is not received;

receiving a second MAC PDU group; the second MAC PDU group at least comprises a second MAC PDU;

herein, the first signaling is used to trigger the first status report, and the first ID and the second ID are link layer IDs, respectively; the first MAC PDU group carries the first SDU; the first MAC PDU group comprises at least part of bits comprised in the first ID; and the second MAC PDU group carries the first SDU; the second MAC PDU group comprises at least part of bits comprised in the second ID.

Specifically, according to one aspect of the present disclosure, the method is characterized in monitoring a first physical layer signaling, the first physical layer signaling comprises configuration information of a first channel, and the first MAC PDU is transmitted on the first channel;

herein, the first physical layer signaling and the first MAC PDU jointly comprise the first ID.

Specifically, according to one aspect of the present disclosure, the method is characterized in monitoring a second physical layer signaling, the second physical layer signaling comprises configuration information of a second channel, and the second MAC PDU is transmitted on the second channel;

herein, the second physical layer signaling and the second MAC PDU jointly comprise the second ID.

Specifically, according to one aspect of the present disclosure, the first status report indicates that a first SDU set is not received, the first SDU set comprising the first SDU.

Specifically, according to one aspect of the present disclosure, comprising:

transmitting a second signaling; and
receiving a third signaling;
herein, the second signaling is used to trigger the third signaling, and the third signaling is used to trigger the first signaling.

Specifically, according to one aspect of the present disclosure, characterized in that:

the first signaling is used to indicate that a first part of a first key ID is renewed as a first part of a second key ID; the first key ID is used to encrypt the first SDU carried by the first MAC PDU group; the second key ID is used to encrypt the first SDU carried by the second MAC PDU group; the second key ID is employed to decrypt the first SDU carried by the second MAC PDU group.

Specifically, according to one aspect of the present disclosure, comprising:

transmitting a fourth signaling;
herein, the fourth signaling is used to indicate that a first logical channel ID is renewed as a second logical channel ID; the first logical channel ID is applied in secure algorithm of the first SDU carried by the first MAC PDU group; the second logical channel ID is applied in secure algorithm of the first SDU carried by the second MAC PDU group.

Specifically, according to one aspect of the present disclosure, the first node is a UE.

Specifically, according to one aspect of the present disclosure, the first node is an IoT terminal.

Specifically, according to one aspect of the present disclosure, the first node is a relay.

Specifically, according to one aspect of the present disclosure, the first node is a vehicle-mounted terminal.

Specifically, according to one aspect of the present disclosure, the first node is an aircraft.

The present disclosure provides a first node for wireless communications, comprising:

a first transmitter, performing a first transmission on a first SDU; the action of performing a first transmission on the first SDU includes transmitting a first MAC PDU group; the first MAC PDU group at least comprises a first MAC PDU;

a first receiver, receiving a first signaling and a first status report, the first signaling being used to indicate that a first ID is renewed as a second ID; the first status report is used to indicate that the first SDU is not received yet; and the first transmitter, performing a second transmission on the first SDU; the action of performing a second transmission on the first SDU includes transmitting a second MAC PDU group; the second MAC PDU group at least comprises a second MAC PDU;

herein, the first signaling is used to trigger the first status report, and the first ID and the second ID are link layer IDs, respectively; the first MAC PDU group carries the first SDU; the first MAC PDU group comprises at least part of bits comprised in the first ID; and the second MAC PDU group carries the first SDU; the second MAC PDU group comprises at least part of bits comprised in the second ID.

The present disclosure provides a second node for wireless communications, comprising:

a second receiver, failing to correctly receive a first MAC PDU group; the first MAC PDU group at least comprises a first MAC PDU;

a second transmitter, transmitting a first signaling and a first status report, the first signaling being used to indicate that a first ID is renewed as a second ID; the first status report is used to indicate that a first SDU is not received;

the second receiver, receiving a second MAC PDU group; the second MAC PDU group at least comprises a second MAC PDU;

herein, the first signaling is used to trigger the first status report, and the first ID and the second ID are link layer IDs, respectively; the first MAC PDU group carries the first SDU; the first MAC PDU group comprises at least part of bits comprised in the first ID; and the second MAC PDU group carries the first SDU; the second MAC PDU group comprises at least part of bits comprised in the second ID.

In one embodiment, the present disclosure has the following advantages over the prior art:

As proposed by the present disclosure, in the process of user ID updating, a user is required to avoid any behavior that may help the listener in associating renewed user IDs with old ones and continuing the tracking of the user, which poses a big threat to user security. A conventional practice is that after a user ID is renewed, the data not having been received yet will be transmitted again, and retransmitted data will adopt new IDs, and then the listener will determine according to the retransmitted data that an old ID had been updated, thus leading to new security loopholes; to solve such difficulty, a method put forward in the present disclosure indicates an SDU not yet received by a first status report, so as to ensure that a transmitter is capable of encrypting the data once more, as a result, even after retransmission the data can hardly be associated with previous data when obtained by the listener, making it less possible to track the user's ID, hence avoidance of potential security threat.

The present disclosure provides a method in a first node for wireless communications, comprising:

receiving a first signaling, the first signaling being used to indicate a first ID set, the first ID set comprising at least one link layer ID; and generating a second ID according to a first parameter set; and transmitting a second MAC PDU;
herein, the second MAC PDU comprises at least part of bits in the second ID, and the first parameter set comprises the first ID set.

In one embodiment, a problem to be solved in the present disclosure includes that during UE-UE communication, especially when relating to sidelink communication, users are required to update their identities frequently to ensure security. The update of user ID can be done at any time and independent from data transmission; and the ID updating of each link is independent from each other. The ID updating shall be performed simultaneously by both sides of communication so as to avoid being tracked by the listener. However, if a relay node's ID does not change correspondingly, the listener can make use of the relay node's ID and updated IDs of the associated source node and destination node to figure out previous IDs of these nodes, thus causing security trouble. The present disclosure provides a method of using a first signaling to generate a second ID to achieve synchronous ID updating, thus settling the trouble.

In one embodiment, the above method is advantageous in that when a source node and a destination node update their IDs, a relay node has to update its own ID accordingly, since the updating of the relay node's ID is controlled by the source node, rather than controlling each ID update by itself as defined in a traditional scheme, some security issues can thus be avoided. Therefore, by employing the method provided in the present disclosure, simultaneous ID updates between all nodes and links can be achieved, thereby reducing security risk and improving privacy.

In one embodiment, characteristics of the above method include that MAC refers to Medium Access Control.

In one embodiment, characteristics of the above method include that SDU refers to Service Data Unit.

In one embodiment, characteristics of the above method include that PDU refers to Protocol Data Unit.

Specifically, according to one aspect of the present disclosure, comprising: receiving a first MAC PDU;
   herein, the first MAC PDU comprises at least part of bits in a first ID, the first ID is a link layer ID in the first ID set, and the first MAC PDU and the second MAC PDU respectively comprise a first packet.

Specifically, according to one aspect of the present disclosure, the second MAC PDU comprises at least part of bits in a third ID, and the third ID is a link layer ID comprised in the first ID set different from the first ID.

Specifically, according to one aspect of the present disclosure, the first signaling indicates a first link ID, the first link ID is used to determine a first link, and the second ID is associated with the first link, the first MAC PDU belonging to the first link.

Specifically, according to one aspect of the present disclosure, the first signaling indicates a second link ID, the second link ID is used to determine a second link, and the second ID is associated with the second link, the second MAC PDU belonging to the second link.

Specifically, according to one aspect of the present disclosure, the first parameter set comprises first time information.

Specifically, according to one aspect of the present disclosure, comprising: receiving a first physical layer signaling, the first physical layer signaling comprises configuration information of a first channel, and a channel occupied by the first MAC PDU includes the first channel;
   herein, the first physical layer signaling and the first MAC PDU jointly comprise the first ID.

Specifically, according to one aspect of the present disclosure, comprising: transmitting a second physical layer signaling, the second physical layer signaling comprises configuration information of a second channel, and a channel occupied by the second MAC PDU includes the second channel;
   herein, the second physical layer signaling and the second MAC PDU jointly comprise the second ID.

Specifically, according to one aspect of the present disclosure, comprising: transmitting a third signaling, the third signaling being used to respond to the first signaling.

Specifically, according to one aspect of the present disclosure, the first signaling is used to indicate a first logical channel ID, and the first MAC PDU comprises the first logical channel ID.

Specifically, according to one aspect of the present disclosure, the first signaling is used to indicate a second logical channel ID, and the second MAC PDU comprises the second logical channel ID.

The present disclosure provides a method in a second node for wireless communications, comprising:
   transmitting a first signaling, the first signaling being used to indicate a first ID set, the first ID set comprising at least one link layer ID; a first parameter set is used to generate a second ID;
   herein, a second MAC PDU comprises at least part of bits in the second ID, and the first parameter set comprises the first ID set.

Specifically, according to one aspect of the present disclosure, comprising: transmitting a first MAC PDU;
   herein, the first MAC PDU comprises at least part of bits in a first ID, the first ID is a link layer ID in the first ID set, and the first MAC PDU and the second MAC PDU respectively comprise a first packet.

Specifically, according to one aspect of the present disclosure, the second MAC PDU comprises at least part of bits in a third ID, and the third ID is a link layer ID comprised in the first ID set different from the first ID.

Specifically, according to one aspect of the present disclosure, the first signaling indicates a first link ID, the first link ID is used to determine a first link, and the second ID is associated with the first link, the first MAC PDU belonging to the first link.

Specifically, according to one aspect of the present disclosure, the first signaling indicates a second link ID, the second link ID is used to determine a second link, and the second ID is associated with the second link, the second MAC PDU belonging to the second link.

Specifically, according to one aspect of the present disclosure, the first parameter set comprises first time information.

Specifically, according to one aspect of the present disclosure, comprising: transmitting a first physical layer signaling, the first physical layer signaling comprises configuration information of a first channel, and a channel occupied by the first MAC PDU includes the first channel;
   herein, the first physical layer signaling and the first MAC PDU jointly comprise the first ID.

Specifically, according to one aspect of the present disclosure, comprising: receiving a third signaling, the third signaling being used to respond to the first signaling.

Specifically, according to one aspect of the present disclosure, the first signaling is used to indicate a first logical channel ID, and the first MAC PDU comprises the first logical channel ID.

Specifically, according to one aspect of the present disclosure, the first signaling is used to indicate a second logical channel ID, and the second MAC PDU comprises the second logical channel ID.

The present disclosure provides a method in a third node for wireless communications, comprising:
   receiving a second MAC PDU;
   herein, the second MAC PDU comprises at least part of bits in a second ID, and a first parameter set comprises the first ID set; a first signaling is used to indicate a first ID set, and the first ID set comprises at least one link layer ID; a first parameter set is used to generate a second ID.

Specifically, according to one aspect of the present disclosure, a first MAC PDU is used to generate the second MAC PDU, and the first MAC PDU comprises at least part of bits in a first ID, the first ID is a link layer ID in the first ID set, and the first MAC PDU and the second MAC PDU respectively comprise a first packet.

Specifically, according to one aspect of the present disclosure, the second MAC PDU comprises at least part of bits in a third ID, and the third ID is a link layer ID comprised in the first ID set different from the first ID.

Specifically, according to one aspect of the present disclosure, the first signaling indicates a first link ID, the first link ID is used to determine a first link, and the second ID is associated with the first link, the first MAC PDU belonging to the first link.

Specifically, according to one aspect of the present disclosure, the first signaling indicates a second link ID, the second link ID is used to determine a second link, and the second ID is associated with the second link, the second MAC PDU belonging to the second link.

Specifically, according to one aspect of the present disclosure, the first parameter set comprises first time information.

Specifically, according to one aspect of the present disclosure, comprising: receiving a second physical layer signaling, the second physical layer signaling comprises configuration information of a second channel, and a channel occupied by the second MAC PDU includes the second channel;

herein, the second physical layer signaling and the second MAC PDU jointly comprise the second ID.

Specifically, according to one aspect of the present disclosure, comprising: receiving a third signaling, the third signaling being used to respond to the first signaling.

Specifically, according to one aspect of the present disclosure, the first signaling is used to indicate a first logical channel ID, and the first MAC PDU comprises the first logical channel ID.

Specifically, according to one aspect of the present disclosure, the first signaling is used to indicate a second logical channel ID, and the second MAC PDU comprises the second logical channel ID.

Specifically, according to one aspect of the present disclosure, the first node is a UE.

Specifically, according to one aspect of the present disclosure, the first node is an IoT terminal.

Specifically, according to one aspect of the present disclosure, the first node is a relay.

Specifically, according to one aspect of the present disclosure, the first node is a vehicle-mounted terminal.

Specifically, according to one aspect of the present disclosure, the first node is an aircraft.

The present disclosure provides a first node for wireless communications, comprising:
 a first receiver, receiving a first signaling, the first signaling being used to indicate a first ID set, the first ID set comprising at least one link layer ID; and generating a second ID according to a first parameter set; and
 a first transmitter, transmitting a second MAC PDU;
 herein, the second MAC PDU comprises at least part of bits in the second ID, and the first parameter set comprises the first ID set.

The present disclosure provides a second node for wireless communications, comprising:
 a second transmitter, transmitting a first signaling, the first signaling being used to indicate a first ID set, the first ID set comprising at least one link layer ID; a first parameter set is used to generate a second ID;
 herein, a second MAC PDU comprises at least part of bits in the second ID, and the first parameter set comprises the first ID set.

The present disclosure provides a third node for wireless communications, comprising:
 a third receiver, receiving a second MAC PDU;
 herein, the second MAC PDU comprises at least part of bits in a second ID, and a first parameter set comprises the first ID set; a first signaling is used to indicate a first ID set, and the first ID set comprises at least one link layer ID; a first parameter set is used to generate a second ID.

In one embodiment, the present disclosure has the following advantages over the prior art:

As proposed in the method in the present disclosure, a user in the process of ID updating has to avoid any behavior that may help the listener associate the older user identity with a new one to ensure further tracking of the user, which poses a big threat to the user's security. As tradition goes, user IDs of every two nodes are usually updated independently, as a result, when some links have renewed their identities, other nodes such as a relay node will still employ their old identities, on the other hand, a packet contains at least part of both a source ID and a destination ID, which enables the listener to associate the old identity with a new one by taking advantage of the unchanged identity, thus causing a series of security issues about user tracking. Besides, a node self-determines the updating of its own identity in the traditional practice, which means any two nodes are independent from each other when updating identities, so the updating procedure is usually complicated and slow. To solve this problem, the present disclosure put forward the method of providing a first ID set by a first signaling so as to control a first node in generating a second ID rapidly, so that identity updating among all nodes can be fast and unified, hence a reduction in security risk.

In one embodiment, the present disclosure has the following advantages over the prior art:

When applying the layer 2 (L2)-Relay, the relay node is lack of at least one PDCP layer and maybe some control layers on upper layers, and functions above all lower layers can only be seen between a source node and a destination node. If the second ID, the first ID and the third ID are in the control of one or more layers above lower layers, the structure of the L2-Relay will result in the absence of these functions. Therefore, a method is proposed in the present disclosure to address these concerns: specifically, the second ID is configured by or together with other nodes, including a source node, and can even be configured by an RRC signaling, thus avoiding disorganized protocol structures, reducing the system complexity and apparatus cost, streamlining the development and shortening the configuration period, hence higher flexibility and security.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1A

Figure 1A:
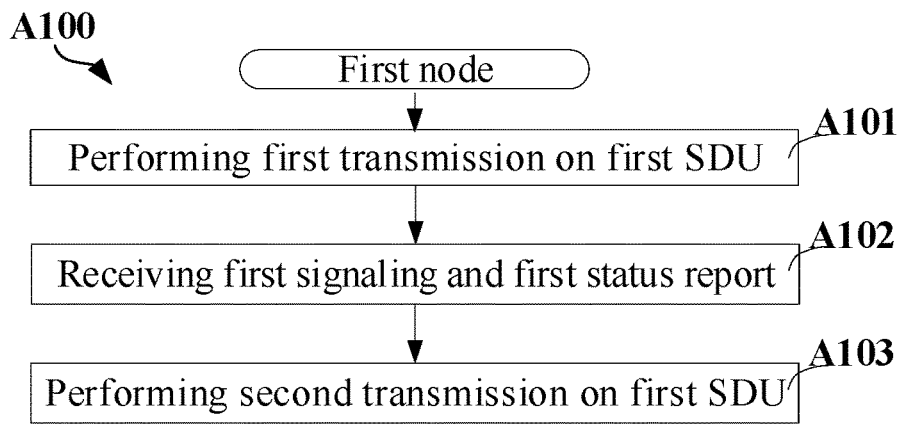
FIG. 1A illustrates a flowchart of performing a first transmission on a first SDU, receiving a first signaling and a first status report and performing a second transmission on the first SDU according to one embodiment of the present disclosure.

Embodiment 1A illustrates a flowchart of performing a first transmission on a first SDU, receiving a first signaling and a first status report and performing a second transmission on the first SDU according to one embodiment of the present disclosure, as shown in FIG. 1A. In FIG. 1A, each box represents a step. It should be particularly stressed that the sequence of how each box is arranged in the figure does not necessarily represent a chronological order of the steps respectively marked by these boxes.

In Embodiment 1A, a first node in the present disclosure performs a first transmission on a first SDU in step A101; receives a first signaling and a first status report in step A102; and performs a second transmission on the first SDU in step A103;

herein, the action of performing the first transmission on the first SDU includes: transmitting a first MAC PDU group; the first MAC PDU group at least comprises a first MAC PDU;

the first signaling being used to indicate that a first ID is renewed as a second ID; the first status report is used to indicate that the first SDU is not received yet;

the action of performing the second transmission on the first SDU includes: transmitting a second MAC PDU group; the second MAC PDU group at least comprises a second MAC PDU;

the first signaling is used to trigger the first status report, and the first ID and the second ID are link layer IDs, respectively; the first MAC PDU group carries the first SDU; the first MAC PDU group comprises at least part of bits comprised in the first ID; and the second MAC PDU group carries the first SDU; the second MAC PDU group comprises at least part of bits comprised in the second ID.

In one embodiment, the first node is a UE.

In one embodiment, the first signaling comprises an upper layer signaling.

In one embodiment, the first signaling comprises a Radio Resource Control (RRC) signaling.

In one embodiment, the first signaling comprises a PC5-S signaling.

In one embodiment, the first signaling is a PC5-S signaling.

In one embodiment, the first signaling comprises an application layer signaling.

In one embodiment, the first signaling comprises a ProSe signaling.

In one embodiment, the first signaling is transmitted on a Uu interface.

In one embodiment, the first signaling is transmitted on a PC5 interface.

In one embodiment, the first signaling is transmitted through a Sidelink Control Channel (SCCH).

In one embodiment, the first signaling is transmitted through a Sidelink Traffic Channel (STCH).

In one embodiment, the first signaling is transmitted through a Physical sidelink control channel (PSCCH).

In one embodiment, the first signaling is transmitted through a Physical sidelink shared channel (PSSCH).

In one embodiment, the first signaling is transmitted through a Physical sidelink broadcast channel (PSBCH).

In one embodiment, the first signaling is transmitted through a SideLink Shared CHannel (SL-SCH).

In one embodiment, the first signaling is transmitted through a sidelink.

In one embodiment, the first signaling is used for configuring DRB.

In one embodiment, the first signaling is used for configuring RB.

In one embodiment, the first signaling comprises RRCReconfigurationSidelink.

In one embodiment, the first signaling comprises part of fields in RRCReconfigurationSidelink.

In one embodiment, the first signaling comprises RRCReconfiguration.

In one embodiment, the first signaling comprises SIB12.

In one embodiment, the first signaling comprises SL-LogicalChannelConfigPC5.

In one embodiment, the first signaling comprises SL-LogicalChannelConfig.

In one embodiment, the first signaling comprises SL-LogicalChannelConfig-r16.

In one embodiment, the first signaling comprises SL-LogicalChannelConfig-r17.

In one embodiment, the first signaling comprises part of fields in SL-LogicalChannelConfig.

In one embodiment, the first signaling comprises sl-RLC-Config.

In one embodiment, the first signaling comprises sl-RLC-Config-r16.

In one embodiment, the first signaling comprises sl-RLC-Config-r17.

In one embodiment, the first signaling comprises part of fields in sl-RLC-Config.

In one embodiment, the first signaling comprises sl-LogicalChannelGroup.

In one embodiment, the first signaling comprises RRCConnectionReconfigurationSidelink.

In one embodiment, the first signaling comprises RRCConnectionReconfiguration.

In one embodiment, the first signaling comprises DIRECT LINK MODIFICATION REQUEST.

In one embodiment, the first signaling comprises DIRECT LINK MODIFICATION ACCEPT.

In one embodiment, the first signaling comprises DIRECT LINK KEEPALIVE REQUEST.

In one embodiment, the first signaling comprises DIRECT LINK KEEPALIVE RESPONSE.

In one embodiment, the first signaling comprises PROXIMITY_REQUEST.

In one embodiment, the first signaling comprises PROXIMITY_REQUEST_RESPONSE.

In one embodiment, the first signaling comprises PROXIMITY_ALERT.

In one embodiment, the first signaling comprises PROXIMITY_REQUEST_VALIDATION.

In one embodiment, the first signaling comprises PROXIMITY_REQUEST_VALIDATION_RESPONSE.

In one embodiment, the first signaling comprises DISCOVERY_UPDATE_REQUEST.

In one embodiment, the first signaling comprises DISCOVERY_UPDATE_RESPONSE.

In one embodiment, the first signaling comprises Direct Security Mode Command.

In one embodiment, the first signaling comprises Direct Security Mode Complete.

In one embodiment, the first signaling comprises Link Identifier Update Request.

In one embodiment, the first signaling comprises Link Identifier Update Response.

In one embodiment, the first signaling comprises Link Identifier Update Ack.

In one embodiment, the first SDU comprises a Packet Data Convergence Protocol (PDCP) SDU.

In one embodiment, the first MAC PDU group at least comprises one MAC PDU.

In one embodiment, each MAC PDU in the first MAC PDU group at least carries part of the first SDU.

In one embodiment, the first SDU comprises a PDCP SDU.

In one embodiment, the second MAC PDU group at least comprises one MAC PDU.

In one embodiment, each MAC PDU in the second MAC PDU group at least carries part of the first SDU.

In one embodiment, in the first transmission, all MAC PDUs that at least carry part of bits in the first SDU are determined to form the first MAC PDU group.

In one embodiment, in the second transmission, all MAC PDUs that at least carry part of bits in the first SDU are determined to form the first MAC PDU group.

In one embodiment, the action of performing a first transmission on the first SDU and the action of performing a second transmission on the first SDU are orthogonal in time domain.

In one embodiment, the action of performing a first transmission on the first SDU is prior to the action of performing a second transmission on the first SDU.

In one embodiment, the first status report refers to a status report above an RLC layer.

In one embodiment, the first status report refers to a PDCP Status Report.

In one embodiment, the first status report explicitly indicates that the first SDU is not received yet.

In one embodiment, the action that the first SDU is not received yet includes that the first node monitors a radio signal, with the receiving power of the radio signal not reaching a recognizable threshold.

In one embodiment, the action that the first SDU is not received yet includes that the first node monitors a radio signal and attempts to blind decode but fails to decode correctly.

In one embodiment, the action that the first SDU is not received yet includes that the first node correctly receives only some of MAC PDUs in the first MAC PDU group, so there is no way to recover the whole first SDU.

In one embodiment, the action that the first SDU is not received yet includes that decompression on the first SDU is failed.

In one embodiment, the action that the first SDU is not received yet includes that a variant of RX_DELIV is smaller than a variant of RX_NEXT (i.e., RX_DELIV<RX_NEXT) in a PDCP entity in the first node, and a bit comprised in a bitmap carried by the first status report that corresponds to the first SDU is set to 0 (zero).

In one embodiment, the first status report implicitly indicates that the first SDU is not received, the first SDU is a first missing SDU, and a bitmap carried by the first status report only indicates reception of SDUs after the first missing SDU.

In one embodiment, the link layer comprises a Layer 2.

In one embodiment, the first ID is Layer-2 ID.

In one embodiment, the first ID is Layer 2 ID.

In one embodiment, the first ID is L2 ID.

In one embodiment, the first ID is Layer 2 identity.

In one embodiment, the first ID is Layer 2 identifier.

In one embodiment, the second ID is different from the first ID.

In one embodiment, the second ID is Layer-2 ID.

In one embodiment, the second ID is Layer 2 ID.

In one embodiment, the second ID is L2 ID.

In one embodiment, the second ID is Layer 2 identity.

In one embodiment, the second ID is Layer 2 identifier.

In one embodiment, the first ID and the second ID are used to determine a same node.

In one embodiment, the first ID and the second ID are used to determine the first node.

In one embodiment, the first ID and the second ID are used to determine a transmitter of the first signaling.

In one embodiment, the first signaling explicitly indicates that the first ID is renewed as the second ID.

In one embodiment, the first signaling indicates the second ID, and the second ID is seen as an update of the first ID.

In one embodiment, a transmitter and a receiver of the first signaling only maintain an ID of a same type as the first ID.

In one embodiment, the first signaling indicates the second ID, and upon reception of the second ID, the second ID is seen as an update of the first ID.

In one embodiment, each MAC PDU in the first MAC PDU group comprises K1 bit(s) in the first ID, K1 being a positive integer greater than 0.

In one subembodiment, the K1 bit(s) is(are) K1 most significant bit(s) in the first ID.

In one subembodiment, the K1 bit(s) is(are) K1 least significant bit(s) in the first ID.

In one subembodiment, K1 is equal to 8.

In one subembodiment, K1 is equal to 16.

In one subembodiment, K1 is configured by a serving cell of the first node.

In one subembodiment, K1 is configured by the first node.

In one subembodiment, K1 is configured by a transmitter of the first signaling.

In one embodiment, each MAC PDU in the second MAC PDU group comprises K2 bit(s) in the second ID, K2 being a positive integer greater than 0.

In one subembodiment, the K2 bit(s) is(are) K2 most significant bit(s) in the second ID.

In one subembodiment, the K2 bit(s) is(are) K2 least significant bit(s) in the second ID.

In one subembodiment, K2 is equal to 8.

In one subembodiment, K2 is equal to 16.

In one subembodiment, K2 is configured by a serving cell of the first node.

In one subembodiment, K2 is configured by the first node.

In one subembodiment, K2 is configured by a transmitter of the first signaling.

In one embodiment, the first MAC PDU group is transmitted through sidelink.

In one embodiment, the second MAC PDU group is transmitted through sidelink.

In one embodiment, the first MAC PDU group is transmitted through a PC5 interface.

In one embodiment, the second MAC PDU group is transmitted through a PC5 interface.

In one embodiment, the first MAC PDU group is transmitted through a Uu interface.

In one embodiment, the second MAC PDU group is transmitted through a Uu interface.

In one embodiment, the first MAC PDU group is transmitted through a PSSCH.

In one embodiment, the second MAC PDU group is transmitted through a PSSCH.

In one embodiment, the first MAC PDU group is transmitted through a DTCH.

In one embodiment, the second MAC PDU group is transmitted through a DTCH.

Embodiment 1B

Figure 1B:
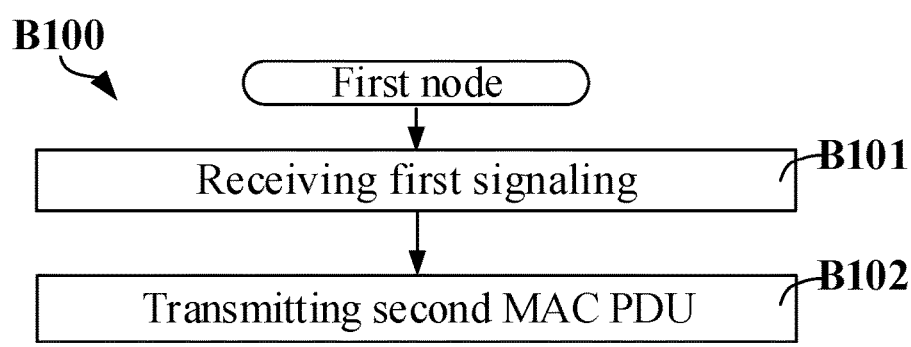
FIG. 1B illustrates a flowchart of receiving a first signaling and transmitting a second MAC PDU according to one embodiment of the present disclosure.

Embodiment 1B illustrates a flowchart of receiving a first signaling and transmitting a second MAC PDU according to one embodiment of the present disclosure, as shown in FIG. 1B. In FIG. 1B, each box represents a step. It should be particularly stressed that the sequence of how each box is arranged in the figure does not necessarily represent a chronological order of the steps respectively marked by these boxes.

In Embodiment 1B, the first node in the present disclosure receives a first signaling in step B101; and transmits a second MAC PDU in step B102;

herein, the first signaling is used to indicate a first ID set, the first ID set comprising at least one link layer ID; and generate a second ID according to a first parameter set.

The second MAC PDU comprises at least part of bits in the second ID, and the first parameter set comprises the first ID set.

In one embodiment, the first node is a UE.

In one embodiment, the first signaling indicates the second ID.

In one embodiment, the first signaling does not comprise the second ID.

In one embodiment, the first signaling comprises a upper layer signaling.

In one embodiment, the first signaling comprises a Radio Resource Control (RRC) signaling.

In one embodiment, the first signaling comprises a MAC CE.

In one embodiment, the first signaling comprises a field in a MAC subhead.

In one embodiment, the first signaling comprises a MAC subhead.

In one embodiment, the first MAC PDU carries the first signaling.

In one embodiment, the first signaling comprises a PC5-S signaling.

In one embodiment, the first signaling is a PC5-S signaling.

In one embodiment, the first signaling comprises an application layer signaling.

In one embodiment, the first signaling comprises a ProSe signaling.

In one embodiment, the first signaling is transmitted by a Uu interface.

In one embodiment, the first signaling is transmitted by a PC5 interface.

In one embodiment, the first signaling is transmitted through an SCCH.

In one embodiment, the first signaling is transmitted through an STCH.

In one embodiment, the first signaling is transmitted through a PSCCH.

In one embodiment, the first signaling is transmitted through a PSSCH.

In one embodiment, the first signaling is transmitted through a PSBCH.

In one embodiment, the first signaling is transmitted through an SL-SCH.

In one embodiment, the first signaling is transmitted through a sidelink.

In one embodiment, the first signaling is used for configuring DRB.

In one embodiment, the first signaling is used for configuring RB.

In one embodiment, the first signaling comprises RRCReconfigurationSidelink.

In one embodiment, the first signaling comprises part of fields in RRCReconfigurationSidelink.

In one embodiment, the first signaling comprises RRCReconfiguration.

In one embodiment, the first signaling comprises SIB12.

In one embodiment, the first signaling comprises SL-LogicalChannelConfigPC5.

In one embodiment, the first signaling comprises SL-LogicalChannelConfig.

In one embodiment, the first signaling comprises SL-LogicalChannelConfig-r16.

In one embodiment, the first signaling comprises SL-LogicalChannelConfig-r17.

In one embodiment, the first signaling comprises part of fields in SL-LogicalChannelConfig.

In one embodiment, the first signaling comprises sl-RLC-Config.

In one embodiment, the first signaling comprises sl-RLC-Config-r16.

In one embodiment, the first signaling comprises sl-RLC-Config-r17.

In one embodiment, the first signaling comprises part of fields in sl-RLC-Config.

In one embodiment, the first signaling comprises sl-LogicalChannelGroup.

In one embodiment, the first signaling comprises RRCConnectionReconfigurationSidelink.

In one embodiment, the first signaling comprises RRCConnectionReconfiguration.

In one embodiment, the first signaling comprises DIRECT LINK MODIFICATION REQUEST.

In one embodiment, the first signaling comprises DIRECT LINK MODIFICATION ACCEPT.

In one embodiment, the first signaling comprises DIRECT LINK KEEPALIVE REQUEST.

In one embodiment, the first signaling comprises DIRECT LINK KEEPALIVE RESPONSE.

In one embodiment, the first signaling comprises PROXIMITY_REQUEST.

In one embodiment, the first signaling comprises PROXIMITY_REQUEST_RESPONSE.

In one embodiment, the first signaling comprises PROXIMITY_ALERT.

In one embodiment, the first signaling comprises PROXIMITY_REQUEST_VALIDATION.

In one embodiment, the first signaling comprises PROXIMITY_REQUEST_VALIDATION_RESPONSE.

In one embodiment, the first signaling comprises DISCOVERY_UPDATE_REQUEST.

In one embodiment, the first signaling comprises DISCOVERY_UPDATE_RESPONSE.

In one embodiment, the first signaling comprises Direct Security Mode Command.

In one embodiment, the first signaling comprises Direct Security Mode Complete.

In one embodiment, the first signaling comprises Link Identifier Update Request.

In one embodiment, the first signaling comprises Link Identifier Update Response.

In one embodiment, the first signaling comprises Link Identifier Update Ack.

In one embodiment, the link layer comprises a Layer 2.

In one embodiment, the link layer comprises a MAC.

In one embodiment, the link layer ID is Layer-2 ID.

In one embodiment, the link layer ID is Layer 2 ID.

In one embodiment, the link layer ID is L2 ID.

In one embodiment, the link layer ID is Layer 2 identity.

In one embodiment, the link layer ID is Layer 2 identifier.

In one embodiment, the link layer ID has different definitions.

In one embodiment, the link layer ID is Layer-2 ID.

In one embodiment, the link layer ID is Layer 2 ID.

In one embodiment, the link layer ID is L2 ID.

In one embodiment, the link layer ID is Layer 2 identity.

In one embodiment, the link layer ID is Layer 2 identifier.

In one embodiment, the link layer ID is Link Layer identifier.

In one embodiment, the link layer ID is Link Layer identity.

In one embodiment, the second ID is Layer-2 ID.

In one embodiment, the second ID is Layer 2 ID.

In one embodiment, the second ID is L2 ID.

In one embodiment, the second ID is Layer 2 identity.

In one embodiment, the second ID is Layer 2 identifier.

In one embodiment, the second ID has different definitions.

In one embodiment, the second ID is Layer-2 ID.

In one embodiment, the second ID is Layer 2 ID.

In one embodiment, the second ID is L2 ID.

In one embodiment, the second ID is Layer 2 identity.

In one embodiment, the second ID is Layer 2 identifier.

In one embodiment, the second ID is Link Layer identifier.

In one embodiment, the second ID is Link Layer identity.

In one embodiment, the second ID comprises 24 bits.

In one embodiment, the second ID determines the first node.

In one embodiment, the second ID is an identity of the first node.

In one embodiment, the first ID set comprises N ID(s), N being an integer greater than or equal to 1.

In one embodiment, all IDs comprised in the first ID set are link layer IDs.

In one embodiment, the first ID set comprises the second ID.

In one embodiment, the first ID set only comprises an ID(s) other than the second ID.

In one embodiment, the first ID set comprises a first ID and a third ID.

In one embodiment, the first parameter set is equivalent to the first ID set.

In one embodiment, the first parameter set is equivalent to the first ID set and at least one element other than the first ID set.

In one embodiment, the first ID set is a subset of the first parameter set.

In one embodiment, the first signaling indicates a first generation parameter, and the first parameter set comprises the first generation parameter.

In one embodiment, the first generation parameter is a random seed.

In one embodiment, the first generation parameter is a bit range of an identity.

In one embodiment, the first generation parameter is an algorithm identifier.

In one embodiment, at least one parameter in the first parameter set is locally generated by the first node.

In one embodiment, at least one parameter in the first parameter set is in no need of indication by any signaling.

In one embodiment, at least one parameter in the first parameter set is fixed.

In one embodiment, for the given first parameter set, the second ID is determined.

In one embodiment, the second ID is generated by a first function with the first parameter set being employed as input.

In one embodiment, the first function is fixed.

In one embodiment, the first function is no need of configuration by any signaling.

In one embodiment, the first function is configurable.

In one embodiment, the first function is configured by the first signaling.

In one embodiment, the second MAC PDU comprises a second MAC sub-PDU, and the second MAC sub-PDU comprises a second MAC subhead and a first packet.

In one embodiment, the second MAC subhead in the second MAC PDU comprises at least part of bits in the second ID.

In one embodiment, an SRC field of the second MAC subhead in the second MAC PDU comprises at least part of bits in the second ID.

In one embodiment, the phrase of at least part of bits in the second ID means Q bit(s), Q being an integer greater than 0.

In one embodiment, the phrase of at least part of bits in the second ID means 8 bits.

In one embodiment, the phrase of at least part of bits in the second ID means 16 bits.

In one embodiment, the first signaling explicitly indicates the first ID set.

In one embodiment, the first signaling implicitly indicates the first ID set.

In one embodiment, a Source ID (SRC) carried by an MAC PDU bearing the first signaling is deemed as belonging to the first ID set.

In one embodiment, a Destination ID (DST) carried by an MAC PDU bearing the first signaling is deemed as belonging to the first ID set.

In one embodiment, the DST is an ID comprised in the first ID set, and the first signaling indicates bits having changed in the DST.

In one embodiment, the first ID set belongs to a No. 0 ID set, and the first signaling indicates IDs comprised by the first ID set by indicating indexes of IDs comprised by the No. 0 ID set.

In one embodiment, the first node determines the first ID set by a second fixed algorithm.

In one subembodiment, the first signaling indicates the action of determining the first ID set.

In one subembodiment, the first signaling indicates at least one input parameter of the second fixed algorithm.

In one embodiment, the first signaling is used to indicate a first logical channel ID, and the first MAC PDU comprises the first logical channel ID.

In one embodiment, the first signaling is used to indicate a second logical channel ID, and the second MAC PDU comprises the second logical channel ID.

In one embodiment, the first logical channel ID is used for secure algorithm of a PDCP PDU carried by the first MAC PDU.

In one embodiment, the first logical channel ID is used for secure algorithm of a PDCP SDU carried by the first MAC PDU.

In one embodiment, the second logical channel ID is used for secure algorithm of a PDCP PDU carried by the second MAC PDU.

In one embodiment, the second logical channel ID is used for secure algorithm of a PDCP SDU carried by the second MAC PDU.

In one embodiment, the secure algorithm comprises encrypting.

In one embodiment, the secure algorithm comprises integrity protection.

In one embodiment, the secure algorithm comprises digital signature.

Embodiment 2

Figure 2:
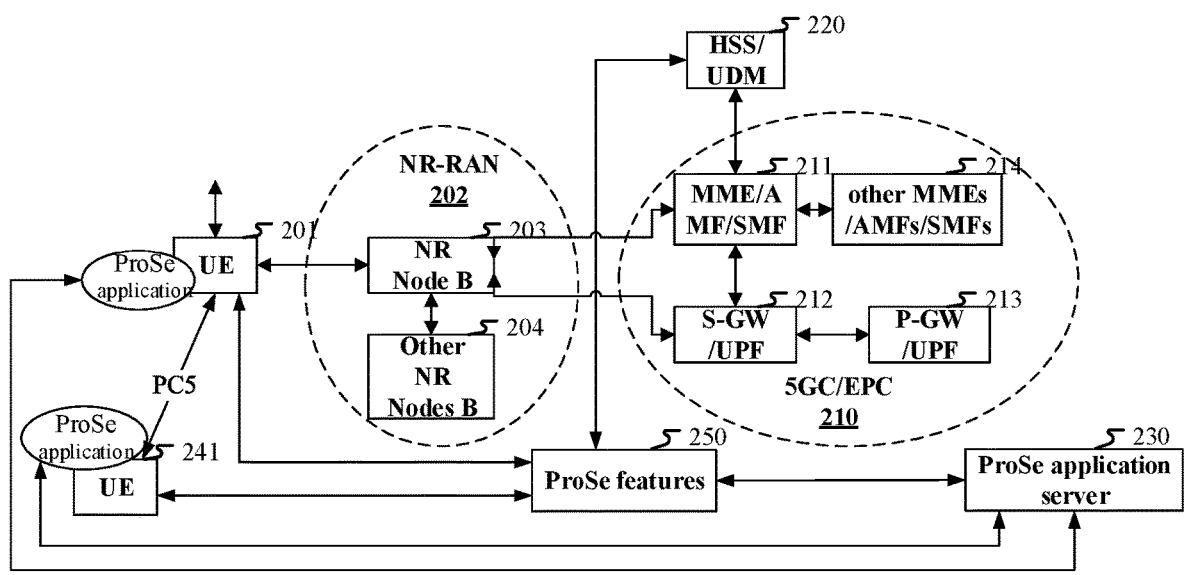
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a V2X communication architecture of 5G NR, Long-Term Evolution (LTE), and Long-Term Evolution Advanced (LTE-A) systems. The 5G NR or LTE network architecture may be called a 5G System/Evolved Packet System (5GS/EPS) 200 or other appropriate terms. The V2X communication architecture in Embodiment 2 may comprise a UE 201, a UE 241 in communication with UE 201, an NG-RAN 202, a 5G Core Network/Evolved Packet Core (5GC/EPC) 210, a Home Subscriber Server (HSS)/Unified Data Management (UDM) 220, a ProSe feature 250 and a ProSe application server 230. The V2X communication architecture may be interconnected with other access networks. For simple description, the entities/interfaces are not shown. As shown in FIG. 2, the V2X communication architecture provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching (PS) Streaming services. The ProSe feature 250 refers to logical functions of network-related actions needed for Proximity-based Service (ProSe), including Direct Provisioning Function (DPF), Direct Discovery Name Management Function and EPC-level Discovery ProSe Function. The ProSe application server 230 is featured with functions like storing EPC ProSe user ID, and mapping between an application-layer user ID and an EPC ProSe user ID as well as allocating ProSe-restricted code-suffix pool.

In one embodiment, the UE 201 and the UE 241 are connected via a PC5 Reference Point.

In one embodiment, the ProSe feature 250 is connected with the UE 201 and the UE 241 respectively via a PC3 Reference Point.

In one embodiment, the ProSe feature 250 is connected with the ProSe application server 230 via a PC2 Reference Point.

In one embodiment, the ProSe application server 230 is connected with the ProSe application of the UE 201 and the ProSe application of the UE 241 respectively via a PC1 Reference Point.

In one embodiment, the first node and the second node in the present disclosure are the UE 201 and the UE 241, respectively.

In one embodiment, a radio link between the UE 201 and the UE 241 corresponds to a sidelink (SL) in the present disclosure.

In one embodiment, a radio link from the UE 201 to the NR Node B is an uplink.

In one embodiment, a radio link from the NR Node B to the UE 201 is a downlink.

In one embodiment, a radio link from the UE 241 to the NR Node B is an uplink.

In one embodiment, a radio link from the NR Node B to the UE 241 is a downlink.

In one embodiment, the UE 201 supports relay transmission.

In one embodiment, the UE 241 supports relay transmission.

In one embodiment, the gNB 203 is a MacroCellular base station.

In one embodiment, the gNB 203 is a Micro Cell base station.

In one embodiment, the gNB 203 is a PicoCell base station.

In one embodiment, the gNB 203 is a flight platform.

In one embodiment, the gNB 203 is satellite equipment.

Embodiment 3

Figure 3:
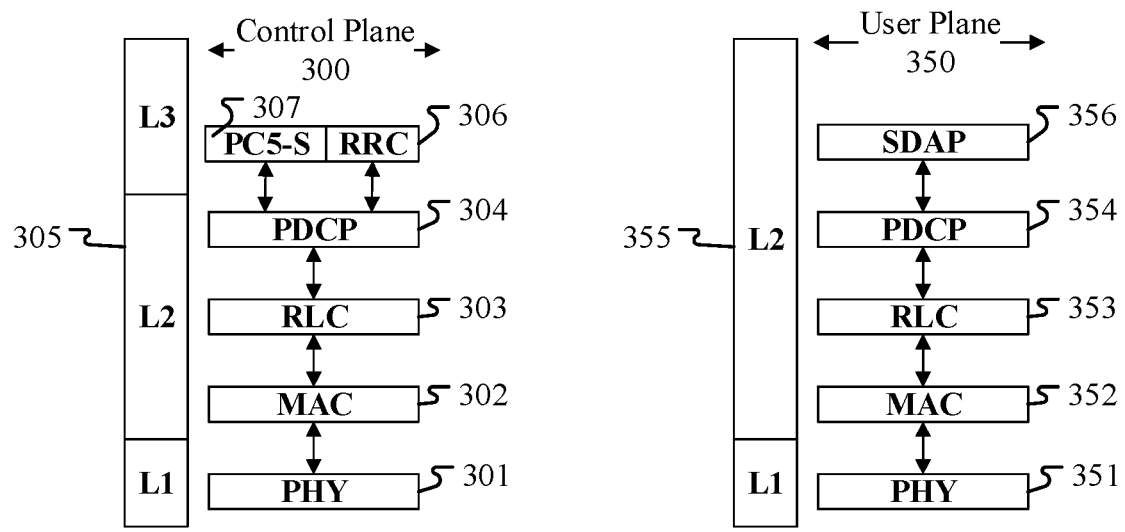
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, gNB or, satellite or aircraft in NTN) and a second node (gNB, UE, or satellite or aircraft in NTN), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first node and the second node via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes of the network side. The PDCP sublayer 304 provides multiplexing among variable radio bearers and logical channels. The PDCP sublayer 304 provides security by encrypting a packet and provides support for handover of a first node between second nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. A PC5 Signaling Protocol (PC5-S) sublayer 307 is in charge of the processing of signaling protocols of the PC5 interface. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several upper layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signaling in the present disclosure is generate by the PC5-S307.

In one embodiment, the second signaling in the present disclosure is generate by the PC5-S307.

In one embodiment, the third signaling in the present disclosure is generate by the PC5-S307.

In one embodiment, the fourth signaling in the present disclosure is generate by the RRC 306 or the PC5-S307.

In one embodiment, the first status report in the present disclosure is generate by the PDCP 354 or the RRC 306.

In one embodiment, the first physical layer signaling in the present disclosure is generate by the PHY 351.

In one embodiment, the second physical layer signaling in the present disclosure is generate by the PHY 351.

In one embodiment, the first MAC PDU in the present disclosure is generate by the MAC 302 or the MAC 352.

In one embodiment, the second MAC PDU in the present disclosure is generate by the MAC 302 or the MAC 352.

In one embodiment, the first MAC PDU group in the present disclosure is generate by the MAC 302 or the MAC 352.

In one embodiment, the second MAC PDU group in the present disclosure is generate by the MAC 302 or the MAC 352.

In one embodiment, the first signaling in the present disclosure is generate by the PC5-S307 or the RRC 306, or the MAC 302 or the MAC 352.

In one embodiment, the third signaling in the present disclosure is generate by the PC5-S307 or the RRC 306.

In one embodiment, the first physical layer signaling in the present disclosure is generate by the PHY 351.

In one embodiment, the second physical layer signaling in the present disclosure is generate by the PHY 351.

In one embodiment, the first MAC PDU in the present disclosure is generate by the MAC 302 or the MAC 352.

In one embodiment, the second MAC PDU in the present disclosure is generate by the MAC 302 or the MAC 352.

Embodiment 4

Figure 4:
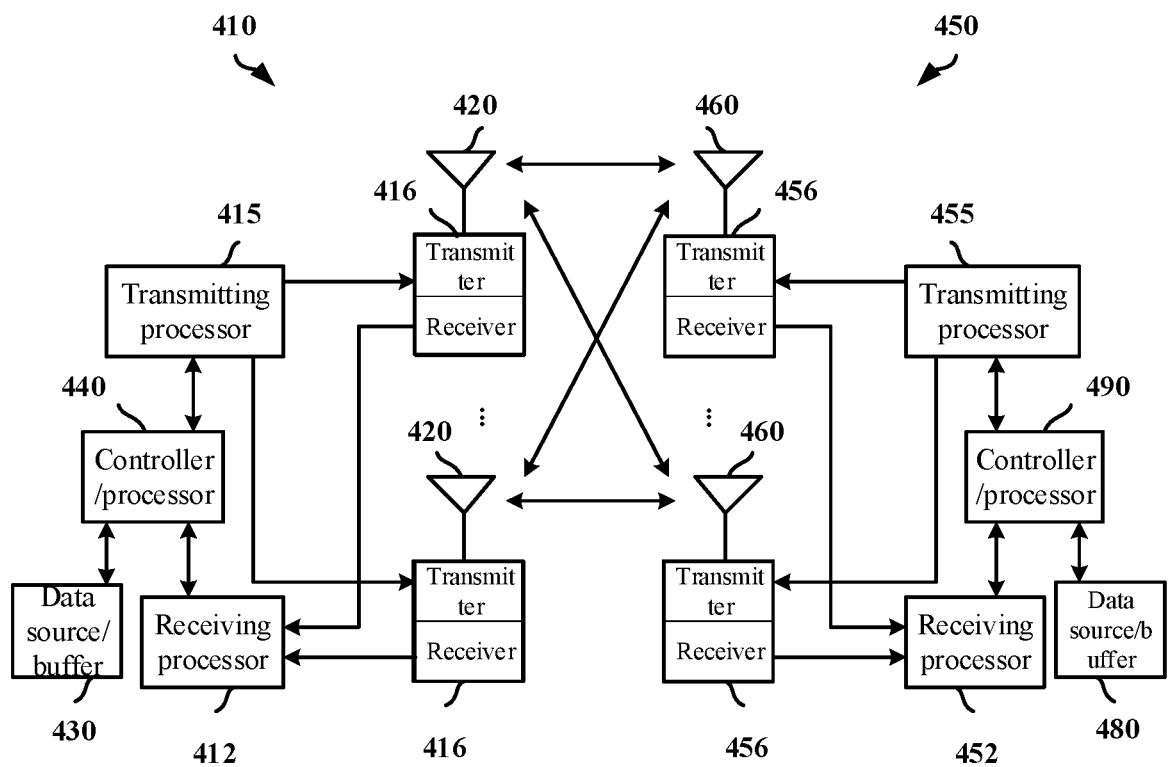
FIG. 4 illustrates a schematic diagram of a first node and a second node according to one embodiment of the present disclosure.

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, an upper layer packet from a core network is provided to the controller/processor 475. The controller/processor 475 implements the functionality of the L2 layer. In the transmission from the second communication device 410 to the first communication device 450, the controller/processor 475 provides header compression, encryption, packet segmentation and reordering, multiplexing between a logical channel and a transport channel and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, including codebook-based precoding and non-codebook-based precoding, and beamforming processing on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to antennas 420.

In a transmission from the second communication device 410 to the first communication device 450, at the first communication device 450, each receiver 454 receives a signal via a corresponding antenna 452. Each receiver 454 recovers information modulated onto the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the second communication device 410 to the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including codebook-based precoding and non-codebook-based precoding, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The first communication device 450 at least performs a first transmission on a first SDU; the action of performing a first transmission on the first SDU including transmitting a first MAC PDU group; the first MAC PDU group at least comprising a first MAC PDU; receives a first signaling and a first status report, the first signaling being used to indicate that a first ID is renewed as a second ID; the first status report being used to indicate that the first SDU is not received yet; and performs a second transmission on the first SDU; the action of performing a second transmission on the first SDU including transmitting a second MAC PDU group; the second MAC PDU group at least comprising a second MAC PDU; herein, the first signaling is used to trigger the first status report, and the first ID and the second ID are link layer IDs, respectively; the first MAC PDU group carries the first SDU; the first MAC PDU group comprises at least part of bits comprised in the first ID; and the second MAC PDU group carries the first SDU; the second MAC PDU group comprises at least part of bits comprised in the second ID.

In one embodiment, the first communication device 450 comprises a memory that stores a computer readable instruction program. The computer readable instruction program generates actions when executed by at least one processor. The actions include: performing a first transmission on a first SDU; the action of performing a first transmission on the first SDU including transmitting a first MAC PDU group; the first MAC PDU group at least comprising a first MAC PDU; receiving a first signaling and a first status report, the first signaling being used to indicate that a first ID is renewed as a second ID; the first status report being used to indicate that the first SDU is not received yet; and performing a second transmission on the first SDU; the action of performing a second transmission on the first SDU including transmitting a second MAC PDU group; the second MAC PDU group at least comprising a second MAC PDU; herein, the first signaling is used to trigger the first status report, and the first ID and the second ID are link layer IDs, respectively; the first MAC PDU group carries the first SDU; the first MAC PDU group comprises at least part of bits comprised in the first ID; and the second MAC PDU group carries the first SDU; the second MAC PDU group comprises at least part of bits comprised in the second ID.

In one embodiment, the second communication device 410 comprises at least one processor and at least one memory. The at least one memory comprises computer program codes. The at least one memory and the computer program codes are configured to be used in collaboration with the at least one processor. The second communication device 410 at least fails to correctly receive a first MAC PDU group; the first MAC PDU group at least comprising a first MAC PDU; transmits a first signaling and a first status report, the first signaling being used to indicate that a first ID is renewed as a second ID; the first status report being used to indicate that a first SDU is not received; receives a second MAC PDU group; the second MAC PDU group at least comprising a second MAC PDU; herein, the first signaling is used to trigger the first status report, and the first ID and the second ID are link layer IDs, respectively; the first MAC PDU group carries the first SDU; the first MAC PDU group comprises at least part of bits comprised in the first ID; and the second MAC PDU group carries the first SDU; the second MAC PDU group comprises at least part of bits comprised in the second ID.

In one embodiment, the second communication device 410 comprises a memory that stores a computer readable instruction program. The computer readable instruction program generates actions when executed by at least one processor. The actions include: failing to correctly receive a first MAC PDU group; the first MAC PDU group at least comprising a first MAC PDU; transmitting a first signaling and a first status report, the first signaling being used to indicate that a first ID is renewed as a second ID; the first status report being used to indicate that a first SDU is not received; receiving a second MAC PDU group; the second MAC PDU group at least comprising a second MAC PDU;

herein, the first signaling is used to trigger the first status report, and the first ID and the second ID are link layer IDs, respectively; the first MAC PDU group carries the first SDU; the first MAC PDU group comprises at least part of bits comprised in the first ID; and the second MAC PDU group carries the first SDU; the second MAC PDU group comprises at least part of bits comprised in the second ID.

In one embodiment, the first communication device 450 corresponds to the first node in the present disclosure.

In one embodiment, the second communication device 410 corresponds to the second node in the present disclosure.

In one embodiment, the first communication device 450 is a UE.

In one embodiment, the first communication device 450 is a vehicle-mounted terminal.

In one embodiment, the second communication device 410 is a UE.

In one embodiment, the second communication device 410 is a vehicle-mounted terminal.

In one embodiment, the receiver 456 (comprising the antenna 460), the receiving processor 452 and the controller/processor 490 are used for receiving the first signaling in the present disclosure.

In one embodiment, the receiver 456 (comprising the antenna 460), the receiving processor 452 and the controller/processor 490 are used for receiving the first status report in the present disclosure.

In one embodiment, the receiver 456 (comprising the antenna 460), the receiving processor 452 and the controller/processor 490 are used for receiving the first physical layer signaling in the present disclosure.

In one embodiment, the receiver 456 (comprising the antenna 460), the receiving processor 452 and the controller/processor 490 are used for receiving the second physical layer signaling in the present disclosure.

In one embodiment, the receiver 456 (comprising the antenna 460), the receiving processor 452 and the controller/processor 490 are used for receiving the fourth signaling in the present disclosure.

In one embodiment, the receiver 456 (comprising the antenna 460), the receiving processor 452 and the controller/processor 490 are used for receiving the second signaling in the present disclosure.

In one embodiment, the transmitter 456 (comprising the antenna 460), the transmitting processor 455 and the controller/processor 490 are used for transmitting the first MAC PDU group in the present disclosure.

In one embodiment, the transmitter 456 (comprising the antenna 460), the transmitting processor 455 and the controller/processor 490 are used for transmitting the first MAC PDU in the present disclosure.

In one embodiment, the transmitter 456 (comprising the antenna 460), the transmitting processor 455 and the controller/processor 490 are used for transmitting the second MAC PDU group in the present disclosure.

In one embodiment, the transmitter 456 (comprising the antenna 460), the transmitting processor 455 and the controller/processor 490 are used for transmitting the second MAC PDU in the present disclosure.

In one embodiment, the transmitter 456 (comprising the antenna 460), the transmitting processor 455 and the controller/processor 490 are used for transmitting the third signaling in the present disclosure.

In one embodiment, the transmitter 416 (comprising the antenna 420), the transmitting processor 412 and the controller/processor 440 are used for transmitting the first signaling in the present disclosure.

In one embodiment, the transmitter 416 (comprising the antenna 420), the transmitting processor 412 and the controller/processor 440 are used for transmitting the first status report in the present disclosure.

In one embodiment, the transmitter 416 (comprising the antenna 420), the transmitting processor 412 and the controller/processor 440 are used for transmitting the first physical layer signaling in the present disclosure.

In one embodiment, the transmitter 416 (comprising the antenna 420), the transmitting processor 412 and the controller/processor 440 are used for transmitting the second physical layer signaling in the present disclosure.

In one embodiment, the transmitter 416 (comprising the antenna 420), the transmitting processor 412 and the controller/processor 440 are used for transmitting the fourth signaling in the present disclosure.

In one embodiment, the transmitter 416 (comprising the antenna 420), the transmitting processor 412 and the controller/processor 440 are used for transmitting the second signaling in the present disclosure.

In one embodiment, the receiver 416 (comprising the antenna 420), the receiving processor 412 and the controller/processor 440 are used for receiving the third signaling in the present disclosure.

In one embodiment, the receiver 416 (comprising the antenna 420), the receiving processor 412 and the controller/processor 440 are used for receiving the first MAC PDU group in the present disclosure.

In one embodiment, the receiver 416 (comprising the antenna 420), the receiving processor 412 and the controller/processor 440 are used for receiving the first MAC PDU in the present disclosure.

In one embodiment, the receiver 416 (comprising the antenna 420), the receiving processor 412 and the controller/processor 440 are used for receiving the second MAC PDU group in the present disclosure.

In one embodiment, the receiver 416 (comprising the antenna 420), the receiving processor 412 and the controller/processor 440 are used for receiving the second MAC PDU in the present disclosure.

In one embodiment, the first communication device 450 comprises a memory that stores a computer readable instruction program. The computer readable instruction program generates actions when executed by at least one processor. The actions include: receiving a first signaling, the first signaling being used to indicate a first ID set, the first ID set comprising at least one link layer ID; and generating a second ID according to a first parameter set; and transmitting a second MAC PDU; herein, the second MAC PDU comprises at least part of bits in the second ID, and the first parameter set comprises the first ID set.

In one embodiment, the second communication device 410 comprises at least one processor and at least one memory. The at least one memory comprises computer program codes. The at least one memory and the computer program codes are configured to be used in collaboration with the at least one processor. The second communication device 410 at least transmits a first signaling, the first signaling being used to indicate a first ID set, the first ID set comprising at least one link layer ID; a first parameter set is used to generate a second ID; herein, a second MAC PDU comprises at least part of bits in the second ID, and the first parameter set comprises the first ID set.

In one embodiment, the second communication device 410 comprises a memory that stores a computer readable instruction program. The computer readable instruction program generates actions when executed by at least one processor. The actions include: transmitting a first signaling, the first signaling being used to indicate a first ID set, the first ID set comprising at least one link layer ID; a first parameter set being used to generate a second ID; herein, a second MAC PDU comprises at least part of bits in the second ID, and the first parameter set comprises the first ID set.

In one embodiment, the second communication device 410 comprises at least one processor and at least one memory. The at least one memory comprises computer program codes. The at least one memory and the computer program codes are configured to be used in collaboration with the at least one processor. The second communication device 410 at least transmits a first signaling, the first signaling being used to indicate a first ID set, the first ID set comprising at least one link layer ID; a first parameter set is used to generate a second ID; herein, a second MAC PDU comprises at least part of bits in the second ID, and the first parameter set comprises the first ID set.

In one embodiment, the second communication device 410 comprises a memory that stores a computer readable instruction program. The computer readable instruction program generates actions when executed by at least one processor. The actions include: transmitting a first signaling, the first signaling being used to indicate a first ID set, the first ID set comprising at least one link layer ID; a first parameter set being used to generate a second ID; herein, a second MAC PDU comprises at least part of bits in the second ID, and the first parameter set comprises the first ID set.

In one embodiment, the first communication node 450 corresponds to the first node in the present disclosure.

In one embodiment, the second communication node 410 corresponds to the second node in the present disclosure.

In one embodiment, the second communication node 410 corresponds to the third node in the present disclosure.

In one embodiment, the first communication device 450 is a UE.

In one embodiment, the first communication device 450 is a vehicle-mounted terminal.

In one embodiment, the second communication device 410 is a UE.

In one embodiment, the second communication device 410 is a vehicle-mounted terminal.

In one embodiment, the receiver 456 (comprising the antenna 460), the receiving processor 452 and the controller/processor 490 are used for receiving the first signaling in the present disclosure.

In one embodiment, the receiver 456 (comprising the antenna 460), the receiving processor 452 and the controller/processor 490 are used for receiving the first MAC PDU in the present disclosure.

In one embodiment, the receiver 456 (comprising the antenna 460), the receiving processor 452 and the controller/processor 490 are used for receiving the first physical layer signaling in the present disclosure.

In one embodiment, the transmitter 456 (comprising the antenna 460), the transmitting processor 455 and the controller/processor 490 are used for transmitting the second MAC PDU in the present disclosure.

In one embodiment, the transmitter 456 (comprising the antenna 460), the transmitting processor 455 and the controller/processor 490 are used for transmitting the third signaling in the present disclosure.

In one embodiment, the transmitter 456 (comprising the antenna 460), the transmitting processor 455 and the controller/processor 490 are used for transmitting the second physical layer signaling in the present disclosure.

In one embodiment, the transmitter 416 (comprising the antenna 420), the transmitting processor 412 and the controller/processor 440 are used for transmitting the first signaling in the present disclosure.

In one embodiment, the transmitter 416 (comprising the antenna 420), the transmitting processor 412 and the controller/processor 440 are used for transmitting the first physical layer signaling in the present disclosure.

In one embodiment, the transmitter 416 (comprising the antenna 420), the transmitting processor 412 and the controller/processor 440 are used for transmitting the first MAC PDU in the present disclosure.

In one embodiment, the receiver 416 (comprising the antenna 420), the receiving processor 412 and the controller/processor 440 are used for receiving the third signaling in the present disclosure.

In one embodiment, the receiver 416 (comprising the antenna 420), the receiving processor 412 and the controller/processor 440 are used for receiving the second MAC PDU in the present disclosure.

In one embodiment, the receiver 416 (comprising the antenna 420), the receiving processor 412 and the controller/processor 440 are used for receiving the third signaling in the present disclosure.

In one embodiment, the receiver 416 (comprising the antenna 420), the receiving processor 412 and the controller/processor 440 are used for receiving the second physical layer signaling in the present disclosure.

Embodiment 5A

Figure 5A:
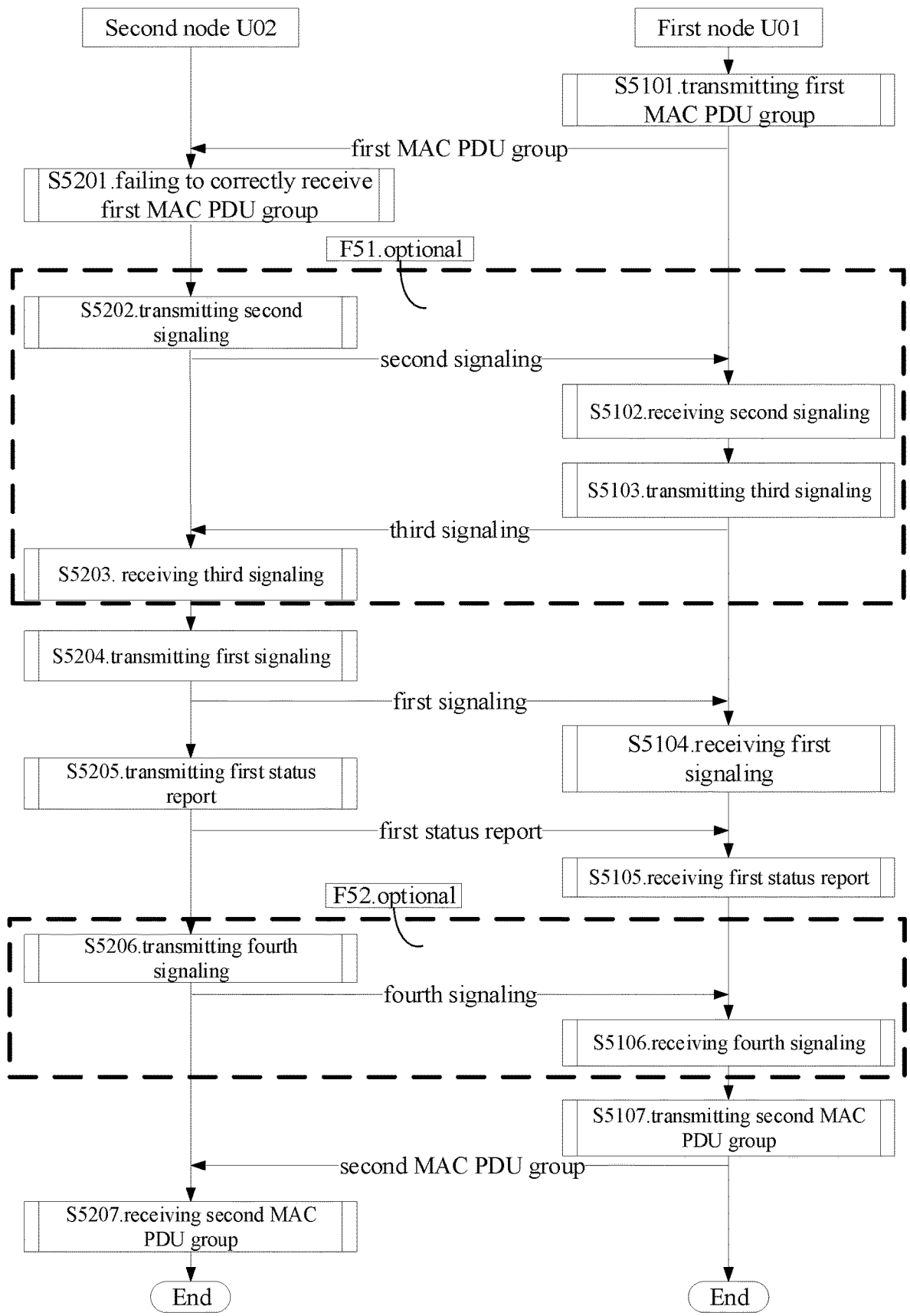
FIG. 5A illustrates a flowchart of radio signal transmission according to one embodiment of the present disclosure.

Embodiment 5A illustrates a flowchart of radio signal transmission according to one embodiment of the present disclosure, as shown in FIG. 5A. In FIG. 5A, a U01 corresponds to the first node in the present disclosure, and a U02 corresponds to the second node in the present disclosure. It should be particularly noted that the sequential order illustrated herein does not limit the order of signal transmissions and implementations in the present disclosure, and steps respectively marked by F51 and F52 are optional.

The first node U01 transmits a first MAC PDU group in step S5101; receives a second signaling in step S5102; transmits a third signaling in step S5103; and receives a first signaling in step S5104; receives a first status report in step S5105; receives a fourth signaling in step S5106; and transmits a second MAC PDU group in step S5107.

The second node U02 fails to correctly receive a first MAC PDU group in step S5201; transmits the second signaling in step S5202; receives the third signaling in step S5203; and transmits the first signaling in step S5204; transmits the first status report in step S5205; transmits the fourth signaling in step S5206; and receives the second MAC PDU group in step S5207.

In Embodiment 5A, the first node U01 performs a first transmission on a first SDU, including the step S5101: transmitting a first MAC PDU group; the first MAC PDU group at least comprising a first MAC PDU; the first signaling being used to indicate that a first ID is renewed as a second ID; the first status report being used to indicate that the first SDU is not received yet; and the first node U01 performs a second transmission on the first SDU, including the step S5107: transmitting a second MAC PDU group; the second MAC PDU group at least comprising a second MAC PDU; the first signaling is used to trigger the first status report, and the first ID and the second ID are link layer IDs, respectively; the first MAC PDU group carries the first SDU; the first MAC PDU group comprises at least part of bits comprised in the first ID; and the second MAC PDU group carries the first SDU; the second MAC PDU group comprises at least part of bits comprised in the second ID.

In one embodiment, a communication interface between the first node U01 and the second node U02 is a PC5 interface.

In one embodiment, a communication interface between the first node U01 and the second node U02 is a Uu interface.

In one embodiment, the first node U01 transmits a first physical layer signaling, the first physical layer signaling comprises configuration information of a first channel, and the first MAC PDU is transmitted on the first channel; the first physical layer signaling and the first MAC PDU jointly comprise the first ID.

In one embodiment, the first physical layer signaling comprises Downlink Control Information (DCI).

In one embodiment, the first physical layer signaling comprises Sidelink Control Information (SCI).

In one embodiment, a physical layer channel occupied by the first physical layer signaling includes PSCCH.

In one embodiment, a physical layer channel occupied by the first physical layer signaling includes PDCCH.

In one embodiment, the first physical layer signaling comprises information of time-frequency resources occupied by the first MAC PDU.

In one embodiment, the first physical layer signaling comprises scheduling information of the first MAC PDU.

In one embodiment, the first channel includes a PDSCH.

In one embodiment, the first channel includes a PSSCH.

In one embodiment, the configuration information of the first channel comprises information of time-frequency resources.

In one embodiment, the configuration information of the first channel comprises information of Redundancy Version (RV).

In one embodiment, the configuration information of the first channel comprises information of New Data Indicator (NDI).

In one embodiment, the configuration information of the first channel comprises information of HARQ.

In one embodiment, the first physical layer signaling comprises part of bits in the first ID, and the first MAC PDU comprises other bits in the first ID.

In one embodiment, the first physical layer signaling comprises N1 most significant bit(s) (MSB(s)) in the first ID, and the first MAC PDU comprises other bit(s) in the first ID other than the N1 MSB(s), N1 being an integer greater than 0.

In one embodiment, the first physical layer signaling comprises N2 least significant bit(s) (LSB(s)) in the first ID, and the first MAC PDU comprises other bit(s) in the first ID other than the N2 LSB(s), N2 being an integer greater than 0.

In one embodiment, the first MAC PDU group comprises M1 MAC PDUs, and the first node U01 transmits a corresponding physical layer signaling for any one of the M1 MAC PDUs, the corresponding physical layer signaling comprising channel configuration information, and the any one of the M1 MAC PDUs mentioned above is transmitted on a channel configured by the channel configuration information, the physical layer signaling and the any one of the M1 MAC PDUs mentioned above jointly comprise the first ID.

In one embodiment, in step S5201, the phrase of "failing to correctly receive a first MAC PDU group" includes that the second node U02 monitors a physical layer channel and performs blind decoding on the first physical layer signaling, but fails to decode the first physical layer signaling.

In one embodiment, in step S5201, the phrase of "failing to correctly receive a first MAC PDU group" includes that the second node U02 successfully receives a first physical layer signaling but fails to receive the first MAC PDU on a first channel.

In one embodiment, in step S5201, the phrase of "failing to correctly receive a first MAC PDU group" includes that the second node U02 successfully receives a first physical layer signaling but fails to decode the first MAC PDU on a first channel.

In one embodiment, in step S5201, the phrase of "failing to correctly receive a first MAC PDU group" includes that the second node U02 fails to decode all MAC PDUs comprised in the first MAC PDU group.

In one embodiment, in step S5201, the phrase of "failing to correctly receive a first MAC PDU group" includes that the second node U02 successfully decodes all MAC PDUs comprised in the first MAC PDU group, but is unable to recover the first SDU from the first MAC PDU group.

In one subembodiment, the action of being unable to recover the first SDU from the first MAC PDU group includes errors being found when decompressing the header compression of the first SDU.

In one subembodiment, the action of being unable to recover the first SDU from the first MAC PDU group includes errors being found when decrypting the first SDU.

In one embodiment, the second node listens on all time-frequency resources probably used for bearing the first physical layer channel, and performs blind decoding on the first physical layer signaling.

In one embodiment, the second signaling comprises a Link Identifier Update Request.

In one embodiment, the second signaling comprises part of fields in a Link Identifier Update Request.

In one embodiment, the second signaling comprises a link ID update request.

In one embodiment, the second signaling comprises a key update request.

In one embodiment, the second signaling comprises a Direct Rekey Request.

In one embodiment, the second signaling comprises part of fields in a Direct Rekey Request.

In one embodiment, the second signaling is used to trigger the third signaling, and the third signaling is used to trigger the first signaling, the first signaling being used to indicate that the first ID is renewed as the second ID.

In one embodiment, the first ID and the second ID are identities of the first node U01.

In one embodiment, the second signaling comprises the second ID.

In one embodiment, the second signaling indicates that the first ID is renewed as the second ID.

In one embodiment, the first ID and the second ID are identities of the second node U02.

In one embodiment, when the first ID is the identity of the first node U01, the first MAC PDU comprises Nx most significant bit(s) (MSB(s)) in the first ID, Nx being a positive integer.

In one subembodiment, Nx is equal to 16.

In one embodiment, when the first ID is the identity of the second node U02, the first MAC PDU comprises Ny most significant bit(s) (MSB(s)) in the first ID, Ny being a positive integer.

In one embodiment, Ny is equal to 8.

In one embodiment, the second signaling comprises a fourth ID, and the fourth ID is used to determine the second node U02, the first ID and the second ID being identities of the first node U01.

In one embodiment, the second signaling indicates that a third ID is renewed as a fourth ID, the third ID and the fourth ID are identities of the second node U02, and the first ID and the second ID are identities of the first node U01.

In one embodiment, the third ID and the fourth ID are both link layer IDs.

In one embodiment, the third signaling comprises a Link Identifier Update Response.

In one embodiment, the third signaling comprises part of fields in a Link Identifier Update Response.

In one embodiment, the third signaling comprises a link ID update response.

In one embodiment, the third signaling comprises a key update response.

In one embodiment, the third signaling comprises a Direct Security Mode Command.

In one embodiment, the third signaling comprises part of fields in a Direct Security Mode Command.

In one embodiment, the second signaling triggers the third signaling.

In one embodiment, the third signaling carries the second ID, the second ID being the identity of the first node U01.

In one embodiment, the third signaling carries the fourth ID, the fourth ID being the identity of the second node U02, while the first ID and the second ID are identities of the first node U01.

In one embodiment, the first node U01 employs a first key ID to encrypt the first SDU.

In one embodiment, the first key ID comprises $K_{NRP-sess}$.

In one embodiment, the first key ID comprises a KD session.

In one embodiment, the first key ID is a key.

In one embodiment, the second key ID comprises $K_{NRP-sess}$.

In one embodiment, the second key ID comprises a Kd session.

In one embodiment, the second key ID is a key.

In one embodiment, the second signaling comprises a first part of the second key ID.

In one embodiment, the second signaling comprises a first part of a first index of the second key ID, the first index being used to determine the second key ID.

In one embodiment, the second signaling comprises a first part of a first index of the second key ID, the first index uniquely determining the second key ID.

In one embodiment, the first part of the first index of the second key ID comprises Kx MSB(s) in the first index of the second key ID, Kx being a positive integer.

In one embodiment, the third signaling comprises a second part of the second key ID.

In one embodiment, the third signaling comprises a second part of a first index of the second key ID, the first index being used to determine the second key ID.

In one embodiment, the third signaling comprises a second part of a first index of the second key ID, the first index uniquely determining the second key ID.

In one embodiment, the second part of the first index of the second key ID comprises Ky LSB(s) in the first index of the second key ID, Ky being a positive integer.

In one embodiment, the second signaling and the third signaling determine the second key ID.

In one embodiment, the second signaling and the third signaling carry all bits in the first index of the second key ID.

In one embodiment, the first index comprises a $K_{NRP-sess}$ ID.

In one embodiment, the first index comprises a Kd session ID.

In one embodiment, the second signaling comprises a PC5-S signaling.

In one embodiment, the third signaling comprises a PC5-S signaling.

In one embodiment, the second signaling comprises an RRC signaling.

In one embodiment, the third signaling comprises an RRC signaling.

In one embodiment, the second signaling comprises a ProSe signaling.

In one embodiment, the third signaling comprises a ProSe signaling.

In one embodiment, the second signaling comprises a NAS signaling.

In one embodiment, the third signaling comprises a NAS signaling.

In one embodiment, a logical channel occupied by the second signaling includes an SCCH.

In one embodiment, a logical channel occupied by the second signaling includes an STCH.

In one embodiment, a logical channel occupied by the third signaling includes an SCCH.

In one embodiment, a logical channel occupied by the third signaling includes an STCH.

In one embodiment, the first signaling comprises Link Identifier Update Ack.

In one embodiment, the first signaling comprises the second ID, the second ID being the identity of the first node U01.

In one embodiment, the first signaling comprises the fourth ID, the fourth ID being the identity of the second node U02.

In one embodiment, after receiving the first signaling, the first node U01 renews the first ID as the second ID.

In one embodiment, the first signaling explicitly indicates that a first part of a first key ID as a first part of a second key ID.

In one embodiment, the first signaling comprises a first part of the second key ID, upon reception of the first part of the second key ID, the first node renews a first part of the first key ID as the first part of the second key ID.

In one embodiment, the first node only maintains one key ID, and the key ID is either the first key ID or the second key ID.

In one embodiment, the first signaling comprises a second part of the second key ID.

In one embodiment, the first signaling comprises a second part of a first index of the second key ID, the first index being used to determine the second key ID.

In one embodiment, the first signaling comprises a second part of a first index of the second key ID, the first index uniquely determining the second key ID.

In one embodiment, the second part of the first index of the second key ID comprises Ky LSB(s) in the first index of the second key ID, Ky being a positive integer.

In one embodiment, the second signaling and the first signaling determine the second key ID.

In one embodiment, the second signaling and the first signaling carry all bits in the first index of the second key ID.

In one embodiment, the first signaling triggers the first status report.

In one embodiment, the first signaling carries the first status report.

In one embodiment, the first signaling and the first status report are multiplexed in a same MAC PDU.

In one embodiment, the first status report is a first PDCP PDU to be transmitted by the second node U02 after transmission of the first signaling.

In one embodiment, the first signaling comprises a link ID update response.

In one embodiment, the second signaling comprises a Link Identifier Update Request.

In one embodiment, the second signaling comprises part of fields in a Link Identifier Update Request.

In one embodiment, the first signaling comprises a Direct Rekey Request.

In one embodiment, the first signaling comprises part of fields in a Direct Rekey Request.

In one embodiment, the first signaling comprises a link ID update request.

In one embodiment, the first signaling comprises a second ID, the second ID being the identity of the second node U02.

In one embodiment, the first signaling comprises the fourth ID, the fourth ID being used to determine the second node U02, the first ID and the second ID are identities of the first node U01.

In one embodiment, the first signaling indicates that a third ID is renewed as a fourth ID, the third ID and the fourth ID are identities of the second node U02, and the first ID and the second ID are identities of the first node U01.

In one embodiment, the first signaling triggers the first status report.

In one embodiment, the first signaling triggers a Link Identifier Update Response, and the Link Identifier Update Response in turn triggers the first status report.

In one embodiment, the first signaling triggers a Link Identifier Update Response, and the Link Identifier Update Response triggers Link Identifier Update ACK, which in turn triggers the first status report.

In one embodiment, the first signaling comprises a first part of the second key ID.

In one embodiment, the first signaling comprises a first part of a first index of the second key ID, and the first index is used to determine the second key ID.

In one embodiment, the first signaling comprises a first part of a first index of the second key ID, and the first index uniquely determines the second key ID.

In one embodiment, the first part of the first index of the second key ID comprises Ky LSB(s) in the first index of the second key ID, Ky being a positive integer.

In one embodiment, the first signaling and a Link Identifier Update Response determine the second key ID.

In one embodiment, the first signaling and a Link Identifier Update Response carry all bits in the first index of the second key ID.

In one embodiment, the first MAC PDU group employ a Radio Bearer (RB) in AM mode.

In one embodiment, the first MAC PDU group employ an RB in UM mode.

In one embodiment, the first MAC PDU group employ RLC in AM mode.

In one embodiment, the first MAC PDU group employ RLC in UM mode.

In one embodiment, the first signaling is used to indicate that the first node U01 releases an RLC entity associated with the first MAC PDU group.

In one embodiment, the first signaling is used to indicate that the first node U01 re-establishes an RLC entity associated with the first MAC PDU group.

In one embodiment, the first signaling is used to indicate that the first node U01 resets an RLC entity associated with the first MAC PDU group.

In one embodiment, the first signaling is used to indicate that the first node U01 resets a MAC entity associated with the first MAC PDU group.

In one embodiment, the first status report is used to indicate that the first node U01 releases an RLC entity associated with the first MAC PDU group.

In one embodiment, the first status report is used to indicate that the first node U01 re-establishes an RLC entity associated with the first MAC PDU group.

In one embodiment, the first status report is used to indicate that the first node U01 resets an RLC entity associated with the first MAC PDU group.

In one embodiment, the first status report is used to indicate that the first node U01 resets a MAC entity associated with the first MAC PDU group.

In one embodiment, after receiving the first signaling, the first node U01 releases an RLC entity associated with the first MAC PDU.

In one embodiment, after receiving the first signaling, the first node U01 re-establishes an RLC entity associated with the first MAC PDU.

In one embodiment, after receiving the first signaling, the first node U01 resets an RLC entity associated with the first MAC PDU.

In one embodiment, after receiving the first signaling, the first node U01 resets a MAC entity associated with the first MAC PDU.

In one embodiment, after receiving the first status report, the first node U01 releases an RLC entity associated with the first MAC PDU.

In one embodiment, after receiving the first status report, the first node U01 re-establishes an RLC entity associated with the first MAC PDU.

In one embodiment, after receiving the first status report, the first node U01 resets an RLC entity associated with the first MAC PDU.

In one embodiment, after receiving the first status report, the first node U01 resets a MAC entity associated with the first MAC PDU.

In one embodiment, after receiving the first status report, the first node U01 deletes an RLC PDU carried by the first MAC PDU group unconfirmed in RLC buffer.

In one embodiment, after receiving the first status report, the first node U01 deletes an RLC SDU carried by the first MAC PDU group unconfirmed in RLC buffer.

In one embodiment, after receiving the first status report, the first node U01 deletes the first MAC PDU group unconfirmed in MAC buffer.

In one embodiment, after receiving the first status report, the first node U01 deletes an RLC PDU carried by the first MAC PDU group unconfirmed in an RLC entity.

In one embodiment, after receiving the first status report, the first node U01 deletes an RLC SDU carried by the first MAC PDU group unconfirmed in an RLC entity.

In one embodiment, after receiving the first status report, the first node U01 deletes the first MAC PDU group unconfirmed in a MAC entity.

In one embodiment, the phrase of an RLC entity associated with the first MAC PDU comprises RLC employed by the first MAC PDU group.

In one embodiment, the phrase of an RLC entity associated with the first MAC PDU comprises an RLC entity to which an RLC PDU carried by the first MAC PDU group belongs.

In one embodiment, the phrase of an RLC entity associated with the first MAC PDU comprises an RLC entity associated with an RB employed by the first MAC PDU group.

In one embodiment, the phrase of an RLC entity associated with the first MAC PDU comprises an RLC entity corresponding to the first MAC PDU group.

In one embodiment, the phrase of an RLC entity associated with the first MAC PDU comprises an RLC entity corresponding to a logical channel of a MAC entity corresponding to the first MAC PDU group.

In one embodiment, the first status report comprises an RRC signaling.

In one embodiment, the first status report comprises a PC5-S signaling.

In one embodiment, the first status report occupies an STCH logical channel.

In one embodiment, the first status report occupies an SCCH logical channel.

In one embodiment, the fourth signaling is an RRC signaling.

In one embodiment, the fourth signaling is a PC5-S signaling.

In one embodiment, the first signaling carries the fourth signaling.

In one embodiment, the fourth signaling comprises RRCReconfigurationSidelink.

In one embodiment, the fourth signaling comprises part of fields in RRCReconfigurationSidelink.

In one embodiment, the fourth signaling comprises RRCConnectionReconfigurationSidelink.

In one embodiment, the fourth signaling comprises part of fields in RRCConnectionReconfigurationSidelink.

In one embodiment, the fourth signaling modifies an RB between the first node U01 and the second node U02.

In one embodiment, the fourth signaling modifies an RB occupied by the first MAC PDU group between the first node U01 and the second node U02.

In one embodiment, the fourth signaling modifies a logical channel ID of an RB occupied by the first MAC PDU group between the first node U01 and the second node U02.

In one embodiment, the action of applying the first logical channel ID in secure algorithm of the first SDU comprises encrypting the first SDU with the first logical channel ID.

In one embodiment, the action of applying the first logical channel ID in secure algorithm of the first SDU comprises protecting the integrity of the first SDU with the first logical channel ID.

In one embodiment, the action of applying the second logical channel ID in secure algorithm of the first SDU comprises encrypting the first SDU with the second logical channel ID.

In one embodiment, the action of applying the second logical channel ID in secure algorithm of the first SDU comprises protecting the integrity of the first SDU with the second logical channel ID.

In one embodiment, the first MAC PDU comprises the first logical channel ID.

In one embodiment, each MAC PDU in the first MAC PDU group comprises the first logical channel ID.

In one embodiment, the first logical channel ID comprises a Logical Channel IDentifier (LCID).

In one embodiment, the first node U01 uses the first logical channel ID to encrypt the first SDU.

In one embodiment, the first node U01 uses 5 LSBs in the first logical channel ID to encrypt the first SDU.

In one embodiment, the first node U01 uses 5 LSBs in the first logical channel ID to protect the integrity of the first SDU.

In one embodiment, the first node U01 transmits a second physical layer signaling, the second physical layer signaling comprises configuration information of a second channel, and the second MAC PDU is transmitted on the second channel; the second physical layer signaling and the second MAC PDU jointly comprise the second ID.

In one embodiment, the second physical layer signaling comprises DCI.

In one embodiment, the second physical layer signaling comprises SCI.

In one embodiment, a physical layer channel occupied by the second physical layer signaling includes PSCCH.

In one embodiment, a physical layer channel occupied by the second physical layer signaling includes PDCCH.

In one embodiment, the second physical layer signaling comprises information of time-frequency resources occupied by the second MAC PDU.

In one embodiment, the second physical layer signaling comprises scheduling information of the second MAC PDU.

In one embodiment, the second channel includes a PDSCH.

In one embodiment, the second channel includes a PSSCH.

In one embodiment, the configuration information of the second channel comprises information of time-frequency resources.

In one embodiment, the configuration information of the second channel comprises information of RV.

In one embodiment, the configuration information of the second channel comprises information of NDI.

In one embodiment, the configuration information of the second channel comprises information of HARQ.

In one embodiment, the second physical layer signaling comprises part of bits in the second ID, and the second MAC PDU comprises other bits in the second ID.

In one embodiment, the second physical layer signaling comprises N1 MSB(s) in the second ID, and the second MAC PDU comprises other bit(s) in the second ID other than the N1 MSB(s), N1 being an integer greater than 0.

In one embodiment, the second physical layer signaling comprises N2 LSB(s) in the second ID, and the second MAC PDU comprises other bit(s) in the second ID other than the N2 LSB(s), N2 being an integer greater than 0.

In one embodiment, the second MAC PDU group comprises M2 MAC PDUs, and the first node U01 transmits corresponding physical layer information for any one of the M2 MAC PDUs, the corresponding physical layer information comprising channel configuration signaling, and the any one of the M2 MAC PDUs mentioned above is transmitted on a channel configured by the channel configuration signaling, the physical layer information and the any one of the M2 MAC PDUs mentioned above jointly comprise the second ID.

In one embodiment, the first node U01 uses the second key ID to encrypt the first SDU carried by the second MAC PDU group.

In one embodiment, the first node U01 uses the second key ID to protect the integrity of the first SDU carried by the second MAC PDU group.

In one embodiment, the first node U01 uses the second logical channel ID to encrypt the first SDU carried by the second MAC PDU group.

In one embodiment, the first node U01 uses the second logical channel ID to protect the integrity of the first SDU carried by the second MAC PDU group.

In one embodiment, the second node U02 uses the second key ID to decrypt the first SDU carried by the second MAC PDU in step S5207.

In one embodiment, the second node U02 uses the second logical channel ID to decrypt the first SDU carried by the second MAC PDU in step S5207.

In one embodiment, the second node U02 uses the second key ID to check the integrity protection of the first SDU carried by the second MAC PDU in step S5207.

In one embodiment, the second node U02 uses the second logical channel ID to check the integrity protection of the first SDU carried by the second MAC PDU in step S5207.

In one embodiment, the first ID is different from the second ID.

In one embodiment, the first key ID is different from the second key ID.

In one embodiment, the first logical channel ID is different from the second logical channel ID.

In one embodiment, the second MAC PDU comprises the second logical channel ID.

In one embodiment, each MAC PDU in the second MAC PDU group comprises the second logical channel ID.

In one embodiment, the second logical channel ID comprises an LCID.

In one embodiment, the first signaling triggers the first node U01's transmitting of a second status report.

In one embodiment, the second signaling triggers the first node U01's transmitting of a second status report.

In one embodiment, the third signaling triggers the first node U01's transmitting of a second status report.

In one embodiment, the second status report indicates that a second SDU is not received by the first node U01.

In one embodiment, the second node U02 performs a first transmission on the second SDU, including transmitting a third MAC PDU group; the third MAC PDU group at least comprises one MAC PDU, and each MAC PDU in the third MAC PDU group at least carries part of bit information of the second SDU.

In one embodiment, the first signaling indicates first time information, and the first time information is used to determine the time at which the first ID is renewed as the second ID.

In one embodiment, the first time is an absolute time.

In one embodiment, the first time is an offset relative to a reference time.

In one embodiment, the first time is a time window.

In one embodiment, the first time indicates a length of a timer, when the timer is expired, the first ID is renewed as the second ID.

In one embodiment, after the first ID is renewed as the second ID, each MAC PDU transmitted by the first node U01 to the second node U02 employs the second ID.

In one embodiment, after the first ID is renewed as the second ID, all MAC PDUs transmitted by the first node U01 to the second node U02 no longer employ the first ID.

In one embodiment, the second node U02 is required to transmit the first status report after transmitting the first signaling.

In one embodiment, the first signaling is required to carry the first status report.

In one embodiment, the first signaling is required to be multiplexed with the first status report in a same MAC PDU.

In one embodiment, the first signaling is used to trigger Link Identifier Update ACK, which in turn triggers the first status report.

In one embodiment, upon reception of the second signaling, the first node U01 is required to transmit the third signaling.

In one embodiment, upon reception of the third signaling, the second node U02 is required to transmit the first signaling.

In one embodiment, the first status report comprises a First Missing COUNT (FMC) field, the FMC field indicating the first SDU.

In one embodiment, the first status report comprises a Bitmap field, the Bitmap field indicating that a first SDU set is not received.

In one embodiment, the first status report comprises a Bitmap field, and each bit in the Bitmap corresponds to a PDCP SDU, a bit comprised in the Bitmap being 0 means that a corresponding PDCP SDU is not received; while a bit comprised in the Bitmap being 1 means that a corresponding PDCP SDU is received.

Embodiment 5B

Figure 5B:
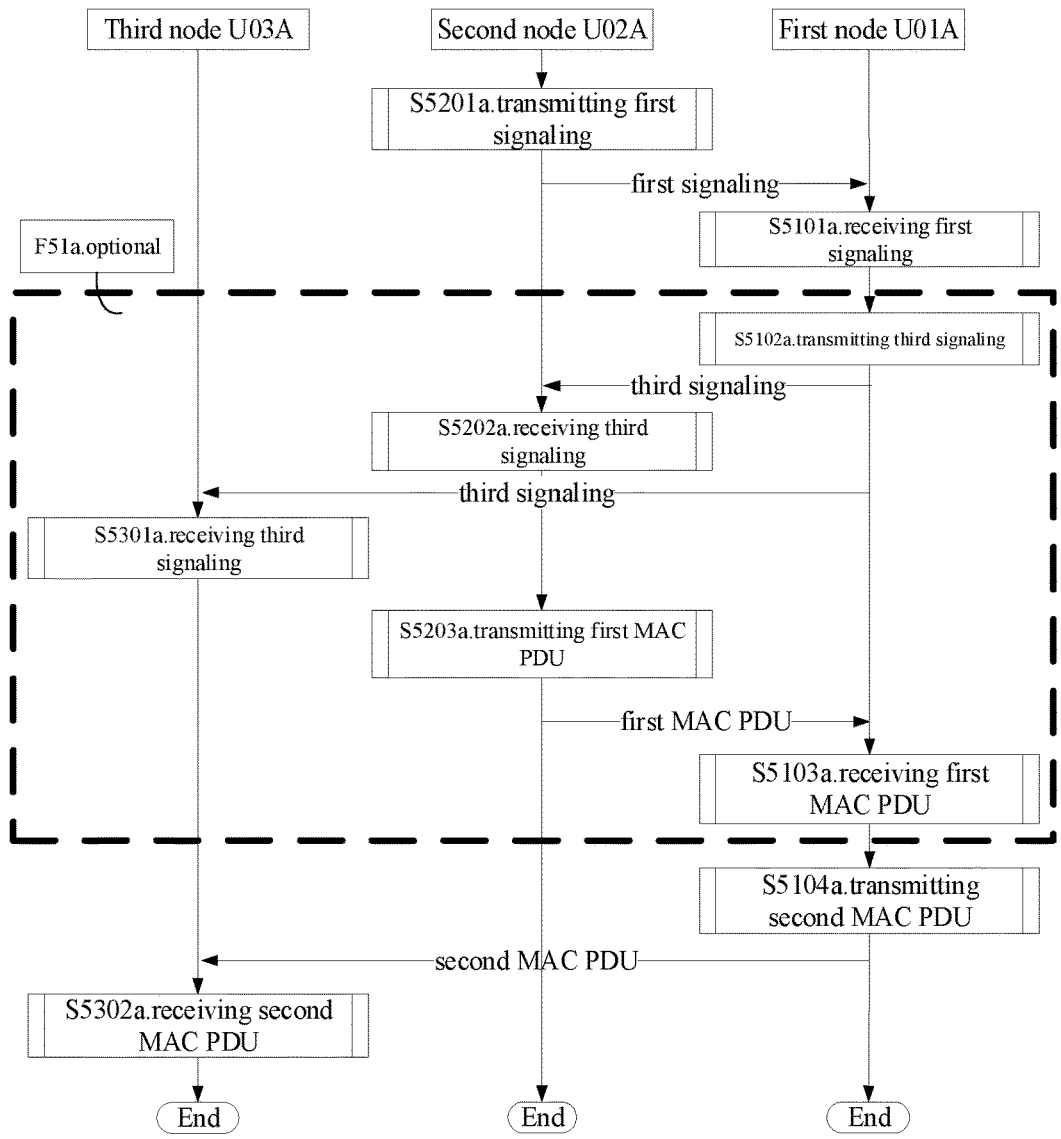
FIG. 5B illustrates a flowchart of radio signal transmission according to one embodiment of the present disclosure.

Embodiment 5B illustrates a flowchart of radio signal transmission according to one embodiment of the present disclosure, as shown in FIG. 5B. In FIG. 5B, U01A corresponds to a first node in the present disclosure, U02A corresponds to a second node in the present disclosure, and U03A corresponds to a third node in the present disclosure. It should be particularly noted that the sequential order illustrated herein does not limit the order of signal transmissions and implementations in the present disclosure, and steps marked by F51a are optional.

The first node U01A receives a first signaling in step S5101a; transmits a third signaling in step S5102a; receives a first MAC PDU in step S5103a; and transmits a second MAC PDU in step S5104a.

The second node U02A transmits the first signaling in step S5201a; receives the third signaling in step S5202a; and transmits the first MAC PDU in step S5203a.

The third node U03A receives the third signaling in step S5301a; and receives the second MAC PDU in step S5302a.

In Embodiment 5B, the first signaling is used to indicate a first ID set, the first ID set comprising at least one link layer ID; generates a second ID according to a first parameter set; the second MAC PDU comprises at least part of bits in the second ID, and the first parameter set comprises the first ID set.

In one embodiment, a communication interface between the first node U01A and the second node U02A is a PC5 interface.

In one embodiment, a communication interface between the first node U01A and the second node U02A is a Uu interface.

In one embodiment, a communication interface between the first node U01A and the third node U03A is a PC5 interface.

In one embodiment, a communication interface between the first node U01A and the third node U03A is a Uu interface.

In one embodiment, a communication interface between the second node U02A and the third node U03A is a PC5 interface.

In one embodiment, a communication interface between the second node U02A and the third node U03A is a Uu interface.

In one embodiment, the first signaling triggers the third signaling.

In one embodiment, the first signaling indicates that the first node U01A renews its identity as the second ID.

In one embodiment, the third signaling comprises at least part of bits in the second ID.

In one embodiment, the third signaling comprises the second ID.

In one embodiment, the third signaling indicates that ID updating is completed.

In one embodiment, the third signaling is used to indicate that the first signaling does not conflict with the current configuration.

In one embodiment, the third signaling comprises a higher-layer signaling.

In one embodiment, the third signaling comprises a PC5-Radio Resource Control (PC5-RRC) signaling.

In one embodiment, the third signaling comprises an RRC signaling.

In one embodiment, the third signaling comprises a PC5-S signaling.

In one embodiment, the third signaling is a PC5-S signaling.

In one embodiment, the third signaling comprises an application-layer signaling.

In one embodiment, the third signaling comprises a ProSe signaling.

In one embodiment, the third signaling is transmitted on a Uu interface.

In one embodiment, the third signaling is transmitted on a PC5 interface.

In one embodiment, the third signaling is transmitted through an SCCH.

In one embodiment, the third signaling is transmitted through an STCH.

In one embodiment, the third signaling is transmitted through a PSCCH.

In one embodiment, the third signaling is transmitted through a PSSCH.

In one embodiment, the third signaling is transmitted through a PSBCH.

In one embodiment, the third signaling is transmitted through an SL-SCH.

In one embodiment, the third signaling is transmitted through a sidelink.

In one embodiment, the third signaling is used for configuring DRB.

In one embodiment, the third signaling is used for configuring RB.

In one embodiment, the third signaling comprises RRCReconfigurationSidelink.

In one embodiment, the third signaling comprises part of fields in RRCReconfigurationSidelink.

In one embodiment, the third signaling comprises RRCReconfiguration.

In one embodiment, the third signaling comprises SIB12.

In one embodiment, the third signaling comprises SL-LogicalChannelConfigPC5.

In one embodiment, the third signaling comprises SL-LogicalChannelConfig.

In one embodiment, the third signaling comprises SL-LogicalChannelConfig-r16.

In one embodiment, the third signaling comprises SL-LogicalChannelConfig-r17.

In one embodiment, the third signaling comprises part of fields in SL-LogicalChannelConfig.

In one embodiment, the third signaling comprises sl-RLC-Config.

In one embodiment, the third signaling comprises sl-RLC-Config-r16.

In one embodiment, the third signaling comprises sl-RLC-Config-r17.

In one embodiment, the third signaling comprises part of fields in sl-RLC-Config.

In one embodiment, the third signaling comprises sl-LogicalChannelGroup.

In one embodiment, the third signaling comprises RRCConnectionReconfigurationSidelink.

In one embodiment, the third signaling comprises RRCConnectionReconfiguration.

In one embodiment, the third signaling comprises DIRECT LINK MODIFICATION REQUEST.

In one embodiment, the third signaling comprises DIRECT LINK MODIFICATION ACCEPT.

In one embodiment, the third signaling comprises DIRECT LINK KEEPALIVE REQUEST.

In one embodiment, the third signaling comprises DIRECT LINK KEEPALIVE RESPONSE.

In one embodiment, the third signaling comprises PROXIMITY_REQUEST.

In one embodiment, the third signaling comprises PROXIMITY_REQUEST_RESPONSE.

In one embodiment, the third signaling comprises PROXIMITY_ALERT.

In one embodiment, the third signaling comprises PROXIMITY_REQUEST_VALIDATION.

In one embodiment, the third signaling comprises PROXIMITY_REQUEST_VALIDATION_RESPONSE.

In one embodiment, the third signaling comprises DISCOVERY_UPDATE_REQUEST.

In one embodiment, the third signaling comprises DISCOVERY_UPDATE_RESPONSE.

In one embodiment, the third signaling comprises a Direct Security Mode Command.

In one embodiment, the third signaling comprises a Direct Security Mode Complete.

In one embodiment, the third signaling comprises a Link Identifier Update Request.

In one embodiment, the third signaling comprises a Link Identifier Update Response.

In one embodiment, the third signaling comprises a Link Identifier Update Ack.

In one embodiment, a first signaling is used to indicate that the first node U01A releases an RLC entity associated with the second MAC PDU.

In one embodiment, a first signaling is used to indicate that the first node U01A re-establishes an RLC entity associated with the second MAC PDU.

In one embodiment, a first signaling is used to indicate that the first node U01A resets an RLC entity associated with the second MAC PDU.

In one embodiment, a first signaling is used to indicate that the first node U01A resets a MAC entity associated with the second MAC PDU.

In one embodiment, a first status report is used to indicate that the first node U01A releases an RLC entity associated with the second MAC PDU.

In one embodiment, a first status report is used to indicate that the first node U01A re-establishes an RLC entity associated with the second MAC PDU.

In one embodiment, a first status report is used to indicate that the first node U01A resets an RLC entity associated with the second MAC PDU.

In one embodiment, a first status report is used to indicate that the first node U01A resets a MAC entity associated with the second MAC PDU.

In one embodiment, upon reception of the first signaling, the first node U01A releases an RLC entity associated with the second MAC PDU.

In one embodiment, upon reception of the first signaling, the first node U01A re-establishes an RLC entity associated with the second MAC PDU.

In one embodiment, upon reception of the first signaling, the first node U01A resets an RLC entity associated with the second MAC PDU.

In one embodiment, upon reception of the first signaling, the first node U01A resets a MAC entity associated with the second MAC PDU.

In one embodiment, the phrase of "an RLC entity associated with the second MAC PDU" comprises RLC employed by the second MAC PDU.

In one embodiment, the phrase of "an RLC entity associated with the second MAC PDU" comprises an RLC entity to which an RLC PDU carried by the second MAC PDU belongs.

In one embodiment, the phrase of "an RLC entity associated with the second MAC PDU" comprises an RLC entity associated with an RB employed by the second MAC PDU.

In one embodiment, the phrase of "an RLC entity associated with the second MAC PDU" comprises an RLC entity corresponding to the second MAC PDU.

In one embodiment, the phrase of "an RLC entity associated with the second MAC PDU" comprises an RLC entity corresponding to a logical channel of a MAC entity corresponding to the second MAC PDU.

In one embodiment, the first node U01A transmits a fourth signaling, and the first signaling triggers the fourth signaling.

In one subembodiment, a receiver of the fourth signaling is the third node U03A.

In one subembodiment, the fourth signaling is a PC5-S signaling.

In one subembodiment, the fourth signaling is a PC5-RRC signaling.

In one subembodiment, the fourth signaling comprises the second ID.

In one subembodiment, the fourth signaling indicates that the first node employs the second ID.

In one subembodiment, the fourth signaling indicates that the first node is updated to the second ID.

In one embodiment, the first MAC PDU comprises a first MAC sub-PDU, the first MAC sub-PDU comprising a first MAC subhead and a first packet.

In one embodiment, the first MAC subhead of the first MAC PDU comprises at least part of bits in the first ID.

In one embodiment, an SRC field of the first MAC subhead of the first MAC PDU comprises at least part of bits in the first ID.

In one embodiment, the phrase of "at least part of bits in the first ID" refers to P bit(s), P being an integer greater than 0.

In one embodiment, the phrase of "at least part of bits in the first ID" refers to 8 bits.

In one embodiment, the phrase of "at least part of bits in the first ID" refers to 16 bits.

In one embodiment, the first MAC PDU comprises at least part of bits in the first ID, the first ID is a link layer ID in the first ID set, and the first MAC PDU and the second MAC PDU respectively comprise a first packet.

In one embodiment, the second MAC PDU is generated by a first MAC PDU.

In one embodiment, the phrase that the second MAC PDU is generated by a first MAC PDU includes a meaning that the second MAC PDU comprises at least part of the first MAC PDU.

In one embodiment, the phrase that the second MAC PDU is generated by a first MAC PDU includes a meaning that the first packet comprised by the second MAC PDU comes from the first MAC PDU.

In one embodiment, the phrase that the second MAC PDU is generated by a first MAC PDU includes a meaning that a source ID (SRC) comprised by the second MAC PDU comes from a Destination ID (DST) comprised by the first MAC PDU.

In one embodiment, the phrase that the second MAC PDU is generated by a first MAC PDU includes a meaning that the second MAC PDU is used for forwarding bits comprised by the first MAC PDU.

In one embodiment, the phrase that the second MAC PDU is generated by a first MAC PDU includes a meaning that at least part of MAC SDUs carried by the second MAC PDU come from MAC SDUs carried by the first MAC PDU.

In one embodiment, the first packet belongs to a MAC SDU.

In one embodiment, the first packet comprises multiple MAC SDUs.

In one embodiment, a first MAC PDU comprises at least part of bits in the first ID and at least part of bits in the second ID.

In one embodiment, the second ID is different from the first ID.

In one embodiment, the first ID is Layer-2 ID.

In one embodiment, the first ID is Layer 2 ID.

In one embodiment, the first ID is L2 ID.

In one embodiment, the first ID is Layer 2 identity.

In one embodiment, the first ID is Layer 2 identifier.

In one embodiment, the first ID has different definitions.

In one embodiment, the first ID is Layer-2 ID.

In one embodiment, the first ID is Layer 2 ID.

In one embodiment, the first ID is L2 ID.

In one embodiment, the first ID is Layer 2 identity.

In one embodiment, the first ID is Layer 2 identifier.

In one embodiment, the first ID is Link Layer identifier.

In one embodiment, the first ID is Link Layer identity.

In one embodiment, the first ID comprises 24 bits.

In one embodiment, the first ID determines the second node.

In one embodiment, the first ID is the identity of the second node.

In one embodiment, the first MAC PDU comprises at least part of bits in the second ID.

In one embodiment, a DST field of the first MAC subhead of the first MAC PDU comprises at least part of bits in the second ID.

In one embodiment, the second MAC PDU comprises at least part of bits in a third ID, and the third ID is a link layer ID in the first ID set different from the first ID.

In one embodiment, the second MAC subhead of the second MAC PDU comprises at least part of bits in the third ID.

In one embodiment, a DST field of the second MAC subhead of the second MAC PDU comprises at least part of bits in the third ID.

In one embodiment, the third ID is Layer-2 ID.

In one embodiment, the third ID is Layer 2 ID.

In one embodiment, the third ID is L2 ID.

In one embodiment, the third ID is Layer 2 identity.

In one embodiment, the third ID is Layer 2 identifier.

In one embodiment, the third ID has different definitions.

In one embodiment, the third ID is Layer-2 ID.

In one embodiment, the third ID is Layer 2 ID.

In one embodiment, the third ID is L2 ID.

In one embodiment, the third ID is Layer 2 identity.

In one embodiment, the third ID is Layer 2 identifier.

In one embodiment, the third ID is Link Layer identifier.

In one embodiment, the third ID is Link Layer identity.

In one embodiment, the third ID comprises 24 bits.

In one embodiment, the third ID determines the third node.

In one embodiment, the third ID is the identity of the third node.

In one embodiment, when the third signaling is received, the second ID is deemed to be effective.

In one embodiment, the third signaling indicates that the second ID is in effect.

In one embodiment, the first signaling is transmitted by unicast.

In one embodiment, the first signaling is transmitted by a non-unicast way.

In one embodiment, the first signaling is transmitted by groupcast.

In one embodiment, the first signaling is transmitted by broadcast.

In one embodiment, the third signaling is transmitted by unicast.

In one embodiment, the third signaling is transmitted by a non-unicast way.

In one embodiment, the third signaling is transmitted by groupcast.

In one embodiment, the third signaling is transmitted by broadcast.

In one embodiment, the first MAC PDU is transmitted by unicast.

In one embodiment, the second MAC PDU is transmitted by unicast.

In one embodiment, the first ID, the second ID and the third ID are mutually different.

In one embodiment, the first node generates a fourth logical channel ID, the third signaling comprising the fourth logical channel ID.

In one subembodiment, the first MAC PDU comprises the fourth logical channel ID.

In one subembodiment, the first node generates the fourth logical channel ID in a random manner.

In one subembodiment, the fourth logical channel ID is used for encrypting the first packet carried by the first MAC PDU.

In one subembodiment, an ID other than the fourth logical channel ID is used for encrypting the first packet carried by the first MAC PDU.

In one embodiment, the first node generates a fifth logical channel ID, the third signaling comprising the fifth logical channel ID.

In one subembodiment, the second MAC PDU comprises the fifth logical channel ID.

In one subembodiment, the first node generates the fifth logical channel ID in a random manner.

In one subembodiment, the fifth logical channel ID is used for encrypting the first packet carried by the second MAC PDU.

In one subembodiment, an ID other than the fifth logical channel ID is used for encrypting the first packet carried by the first MAC PDU.

Embodiment 6A

Figure 6A:
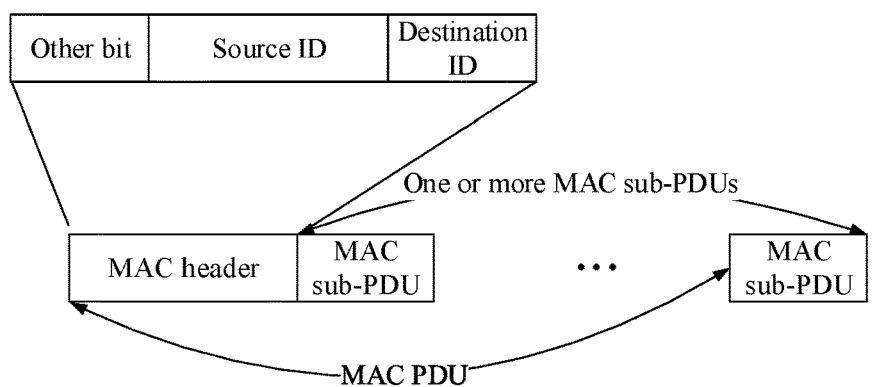
FIG. 6A illustrates a schematic diagram of a MAC PDU according to one embodiment of the present disclosure.

Embodiment 6A illustrates a schematic diagram of a MAC PDU according to one embodiment of the present disclosure, as shown in FIG. 6A.

In Embodiment 6A, a MAC PDU comprises a MAC Header and at least one MAC sub-PDU; the MAC Header comprises a source ID, a destination ID and other bits.

In one embodiment, the MAC PDU is transmitted on an SL-SCH.

In one embodiment, a number of bits comprised in the MAC Header is fixed.

In one embodiment, a number of bits comprised in the MAC Header is 32.

In one embodiment, the MAC Header is an SL-SCH MAC subheader.

In one embodiment, the other bits comprise 5 fields, which are V, R, R, R and R, respectively, and the numbers of bits respectively comprised in the fields are 4, 1, 1, 1 and 1, respectively.

In one embodiment, the source ID and the destination ID respectively comprise 16 bits and 8 bits.

In one embodiment, the source ID and the destination ID comprised in the MAC Header are respectively a SRC field and a DST field.

In one embodiment, each MAC sub-PDU comprises a MAC subheader and a MAC SDU, and a MAC subheader in each MAC sub-PDU comprises a LCID field, the LCID field indicating a channel ID of a logical channel that corresponds to the corresponding MAC SDU.

In one embodiment, the LCID field comprises 5 bits.

In one embodiment, the LCID field comprises 6 bits.

In one embodiment, each MAC PDU is allowed to comprise padding bits.

In one embodiment, a MAC sub-PDU comprises an RLC PDU.

In one embodiment, a MAC sub-PDU comprises a MAC CE.

In one embodiment, the MAC PDU in FIG. 6A refers to the MAC PDU in the first MAC PDU group in the present disclosure.

In one subembodiment, the first MAC PDU at least comprises a first MAC sub-PDU.

In one embodiment, the MAC PDU in FIG. 6A refers to the MAC PDU in the second MAC PDU group in the present disclosure.

In one subembodiment, the second MAC PDU at least comprises a second MAC sub-PDU.

In one embodiment, the source ID comprised by the MAC PDU in FIG. 6A is part of bits in the first ID in the present disclosure.

In one embodiment, the source ID comprised by the MAC PDU in FIG. 6A is part of bits in the second ID in the present disclosure.

In one embodiment, the destination ID comprised by the MAC PDU in FIG. 6A is part of bits in the first ID in the present disclosure.

In one embodiment, the destination ID comprised by the MAC PDU in FIG. 6A is part of bits in the second ID in the present disclosure.

Embodiment 6B

Figure 6B:
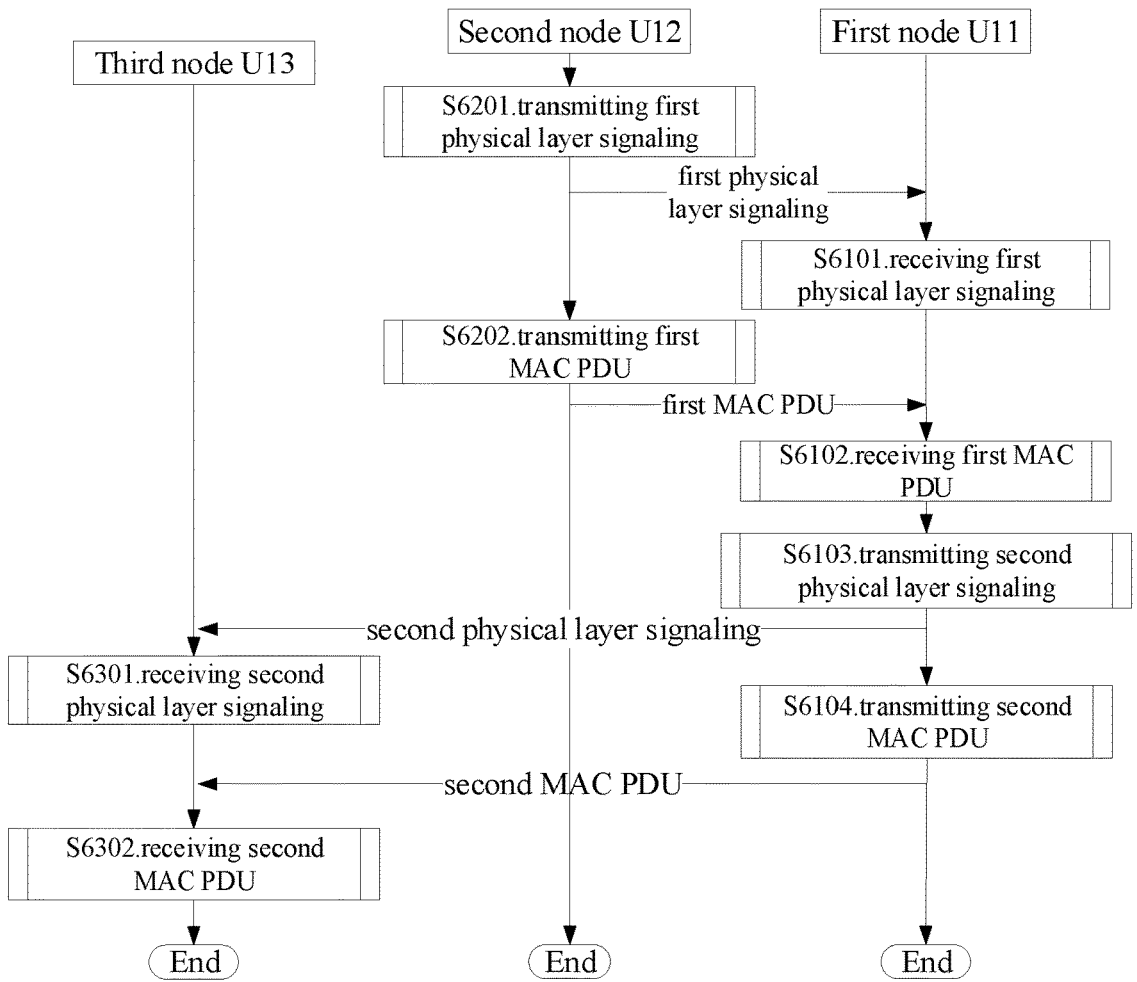
FIG. 6B illustrates a flowchart of radio signal transmission according to one embodiment of the present disclosure.

Embodiment 6B illustrates a flowchart of radio signal transmission according to one embodiment of the present disclosure, as shown in FIG. 6B. In FIG. 6B, U11 corresponds to a first node in the present disclosure, U12 corresponds to a second node in the present disclosure, and U13 corresponds to a third node in the present disclosure. It should be particularly noted that the sequential order illustrated herein does not limit the order of signal transmissions and implementations in the present disclosure, and the Embodiment 6B is based on Embodiment 5B, so some embodiments requested but still not illustrated in the Embodiment 6B can refer to the Embodiment 5B.

The first node U11 receives a first physical-layer signaling in step S6101; receives a first MAC PDU in step S6102; transmits a second physical-layer signaling in step S6103; and transmits a second MAC PDU in step S6104.

The second node U12 transmits the first physical-layer signaling in step S6201; and transmits the first MAC PDU in step S6202.

The third node U13 receives the second physical-layer signaling in step S6301; and receives the second MAC PDU in step S6302.

In one embodiment, the first physical layer signaling comprises configuration information of a first channel, and a channel occupied by the first MAC PDU includes the first channel; the first physical layer signaling and the first MAC PDU jointly comprise the first ID.

In one embodiment, the second physical layer signaling comprises configuration information of a second channel, and a channel occupied by the second MAC PDU includes the second channel; the second physical layer signaling and the second MAC PDU jointly comprise the second ID.

In one embodiment, the first physical layer signaling comprises DCI.

In one embodiment, the first physical layer signaling comprises SCI.

In one embodiment, a physical layer channel occupied by the first physical layer signaling includes a PSCCH.

In one embodiment, a physical layer channel occupied by the first physical layer signaling includes a PDCCH.

In one embodiment, the first physical layer signaling comprises information of time-frequency resources occupied by the first MAC PDU.

In one embodiment, the first physical layer signaling comprises scheduling information of the first MAC PDU.

In one embodiment, the first channel includes a PDSCH.

In one embodiment, the first channel includes a PSSCH.

In one embodiment, the configuration information of the first channel comprises information of time-frequency resources.

In one embodiment, the configuration information of the first channel comprises information of RV.

In one embodiment, the configuration information of the first channel comprises information of NDI.

In one embodiment, the configuration information of the first channel comprises information of HARQ.

In one embodiment, the first channel includes a PSSCH.

In one embodiment, the first channel includes a PDSCH.

In one embodiment, the first channel includes a PSCCH.

In one embodiment, the first physical layer signaling comprises part of bits in the first ID, and the first MAC PDU comprises other bits in the first ID.

In one embodiment, the first physical layer signaling comprises N1 most significant bit(s) (MSB(s)) in the first ID, and the first MAC PDU comprises other bit(s) in the first ID other than the N1 MSB(s), N1 being an integer greater than 0.

In one embodiment, the first physical layer signaling comprises N2 least significant bit(s) (LSB(s)) in the first ID, and the first MAC PDU comprises other bit(s) in the first ID other than the N2 LSB(s), N2 being an integer greater than 0.

In one embodiment, the first physical layer signaling comprises N3 most significant bit(s) (MSB(s)) in the second ID, and the first MAC PDU comprises other bit(s) in the second ID other than the N3 MSB(s), N3 being an integer greater than 0.

In one embodiment, the first physical layer signaling comprises N4 least significant bit(s) (LSB(s)) in the second ID, and the first MAC PDU comprises other bit(s) in the second ID other than the N4 LSB(s), N4 being an integer greater than 0.

In one embodiment, N2 is equal to 8, and N4 is equal to 16.

In one embodiment, N1 is equal to 8, and N3 is equal to 16.

In one embodiment, the second physical layer signaling comprises DCI.

In one embodiment, the second physical layer signaling comprises SCI.

In one embodiment, a physical layer channel occupied by the second physical layer signaling includes a PSCCH.

In one embodiment, a physical layer channel occupied by the second physical layer signaling includes a PDCCH.

In one embodiment, the second physical layer signaling comprises information of time-frequency resources occupied by the second MAC PDU.

In one embodiment, the second physical layer signaling comprises scheduling information of the second MAC PDU.

In one embodiment, the second channel includes a PDSCH.

In one embodiment, the second channel includes a PSSCH.

In one embodiment, the configuration information of the second channel comprises information of time-frequency resources.

In one embodiment, the configuration information of the second channel comprises information of RV.

In one embodiment, the configuration information of the second channel comprises information of NDI.

In one embodiment, the configuration information of the second channel comprises information of HARQ.

In one embodiment, the second channel includes a PSSCH.

In one embodiment, the second channel includes a PDSCH.

In one embodiment, the second channel includes a PSCCH.

In one embodiment, the second physical layer signaling comprises part of bits in the second ID, and the second MAC PDU comprises other bits in the second ID.

In one embodiment, the second physical layer signaling comprises W1 MSB(s) in the second ID, and the second MAC PDU comprises other bit(s) in the second ID other than the W1 MSB(s), W1 being an integer greater than 0.

In one embodiment, the second physical layer signaling comprises W2 LSB(s) in the second ID, and the second MAC PDU comprises other bit(s) in the second ID other than the W2 LSB(s), W2 being an integer greater than 0.

In one embodiment, the second physical layer signaling comprises W3 MSB(s) in the third ID, and the second MAC PDU comprises other bit(s) in the third ID other than the W3 MSB(s), W3 being an integer greater than 0.

In one embodiment, the second physical layer signaling comprises W4 LSB(s) in the third ID, and the second MAC PDU comprises other bit(s) in the third ID other than the W4 LSB(s), W4 being an integer greater than 0.

In one embodiment, W2 is equal to 8, and W4 is equal to 16.

In one embodiment, W1 is equal to 8, and W3 is equal to 16.

Embodiment 7A

Figure 7A:
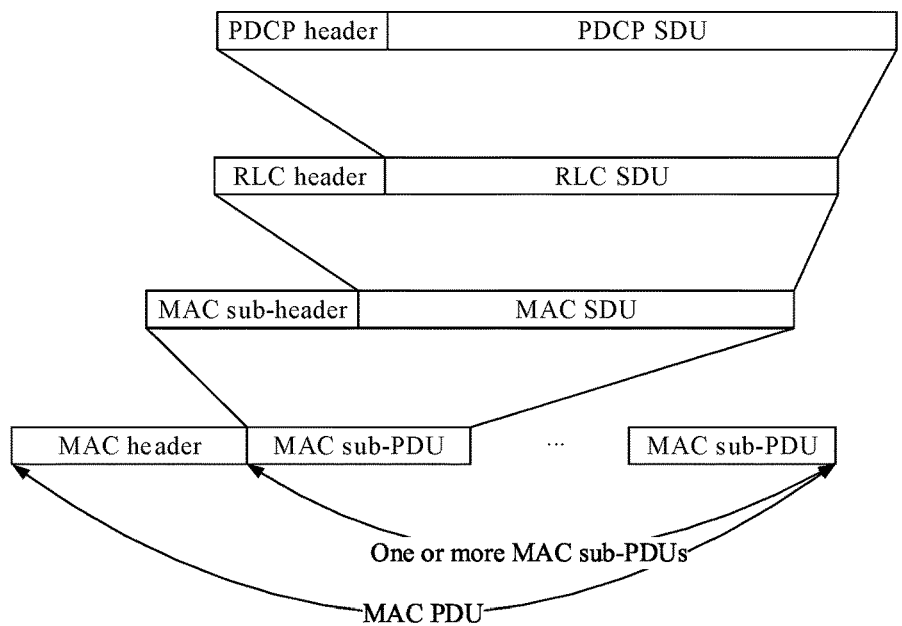
FIG. 7A illustrates a schematic diagram of multi-layer PDU processing according to one embodiment of the present disclosure.

Embodiment 7A illustrates a schematic diagram of multi-layer PDU processing according to one embodiment of the present disclosure, as shown in FIG. 7A; on the basis of the Embodiment 6A, the Embodiment 7A provides further illustrations of the multi-layer PDU processing.

In one embodiment, a PDCP PDU comprises a PDCP Header and a PDCP SDU.

In one embodiment, contents contained in a PDCP Header is related to an RB type.

In one embodiment, a PDC Header of a Signalling Radio Bearer (SRB) comprises fields of R, R, R, R and PDCP SN.

In one embodiment, a PDC Header of a Data Radio Bearer (DRB) comprises fields of D/C, R, R, R and PDCP SN.

In one embodiment, a PDCP PDU optionally comprises a MAC-I field.

In one embodiment, a header of PDCP PDU bearing PDCP status report comprises fields of D/C, PDU Type, R, R, R, R and FMC.

In one embodiment, a PDCP SDU refers to Data.

In one embodiment, a PDCP SDU refers to an RRC signaling.

In one embodiment, a PDCP SDU refers to a PC5-S signaling.

In one embodiment, a PDCP SDU refers to SDAP PDU.

In one embodiment, a PDCP SDU refers to SDAP PDU Bearer IP packet.

In one embodiment, the PDCP SDU in FIG. 7A is the first SDU in the present disclosure.

In one embodiment, a PDCP PDU is transmitted to an RLC entity through an interface of the PDCP entity and RLC entity, an RLC SDU in FIG. 7A comprising a PDCP PDU.

In one embodiment, a PDCP PDU is transmitted to an RLC entity after being through an RLC RB provided by the PDCP entity and RLC entity.

In one embodiment, a PDCP PDU is transmitted to an RLC layer.

In one embodiment, a PDCP PDU is transmitted to an RLC entity associated with a PDCP entity.

In one embodiment, an RLC PDU comprises an RLC Header and an RLC SDU.

In one embodiment, the RLC SDU is Data.

In one embodiment, contents contained in an RLC Header are related to an RLC mode, i.e., the RLC Header of an RLC PDU in Transparent Mode (TMD) is empty.

In one embodiment, the RLC PDU illustrated by FIG. 7A corresponds to Acknowledged Mode (AM) and Unacknowledged Mode (UM/UMD).

In one embodiment, an RLC Header of a UMD RLC PDU comprises an SI field and an SN field.

In one embodiment, an RLC Header of a UMD RLC PDU comprises one or more R fields.

In one embodiment, an RLC Header of an AMD RLC PDU comprises D/C field, P field, SI field and SN field.

In one embodiment, an RLC Header of an AMD RLC PDU comprises one or more R fields.

In one embodiment, an RLC Header of a status PDU comprises D/C field and CPT field.

In one embodiment, an RLC PDU bears data or control information.

In one embodiment, an RLC PDU bears data or STATUS PDU payload.

In one embodiment, an RLC PDU is mapped to a MAC layer by a logical channel interface.

In one embodiment, an RLC PDU is transmitted to a MAC layer.

In one embodiment, a MAC SDU of a MAC sub-PDU is an RLC PDU.

In one embodiment, a MAC SDU of a MAC sub-PDU is a MAC CE.

In one embodiment, a MAC PDU comprises a MAC Header and at least one MAC sub-PDU; the MAC Header comprises an SRC, a DST and other bits.

In one embodiment, a MAC sub-PDU comprises a MAC subhead and a MAC SDU.

In one embodiment, a logical channel between an RLC layer and a MAC layer includes SCCH and STCH.

Embodiment 7B

Figure 7B:
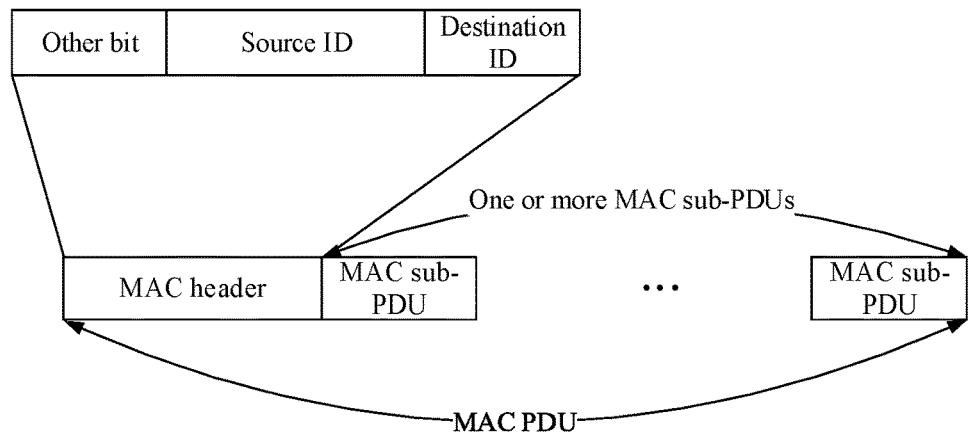
FIG. 7B illustrates a schematic diagram of a MAC PDU according to one embodiment of the present disclosure.

Embodiment 7B illustrates a schematic diagram of a MAC PDU according to one embodiment of the present disclosure, as shown in FIG. 7B.

In Embodiment 7B, a MAC PDU comprises a MAC Header and at least one MAC sub-PDU; the MAC Header comprises an SRC, a DST and other bits.

In one embodiment, the MAC PDU is transmitted on an SL-SCH.

In one embodiment, a number of bits comprised in the MAC Header is fixed.

In one embodiment, a number of bits comprised in the MAC Header is 32.

In one embodiment, the MAC Header is an SL-SCH MAC subheader.

In one embodiment, the MAC Header is an SL-SCH subheader.

In one embodiment, the other bits comprise 5 fields, which are V, R, R, R and R, respectively, and the numbers of bits respectively comprised in the fields are 4, 1, 1, 1 and 1, respectively.

In one embodiment, the source ID and the destination ID respectively comprise 16 bits and 8 bits.

In one embodiment, the source ID and the destination ID comprised in the MAC Header are respectively a SRC field and a DST field.

In one embodiment, each MAC sub-PDU comprises a MAC subheader and a MAC SDU, and a MAC subheader in each MAC sub-PDU comprises a LCID field, the LCID field indicating a channel ID of a logical channel that corresponds to the corresponding MAC SDU.

In one embodiment, the LCID field comprises 5 bits.

In one embodiment, the LCID field comprises 6 bits.

In one embodiment, each MAC PDU is allowed to comprise padding bits.

In one embodiment, a MAC sub-PDU comprises an RLC PDU.

In one embodiment, a MAC sub-PDU comprises a MAC CE.

In one embodiment, the MAC PDU in FIG. 7B is the first MAC PDU in the present disclosure.

In one subembodiment, the first MAC PDU at least comprises a first MAC sub-PDU.

In one embodiment, the MAC PDU in FIG. 7B is the second MAC PDU in the present disclosure.

In one subembodiment, the second MAC PDU at least comprises a second MAC sub-PDU.

In one embodiment, the MAC PDU in FIG. 7B is a third MAC PDU in the present disclosure.

In one subembodiment, the third MAC PDU at least comprises a third MAC sub-PDU.

Embodiment 8A

Figure 8A:
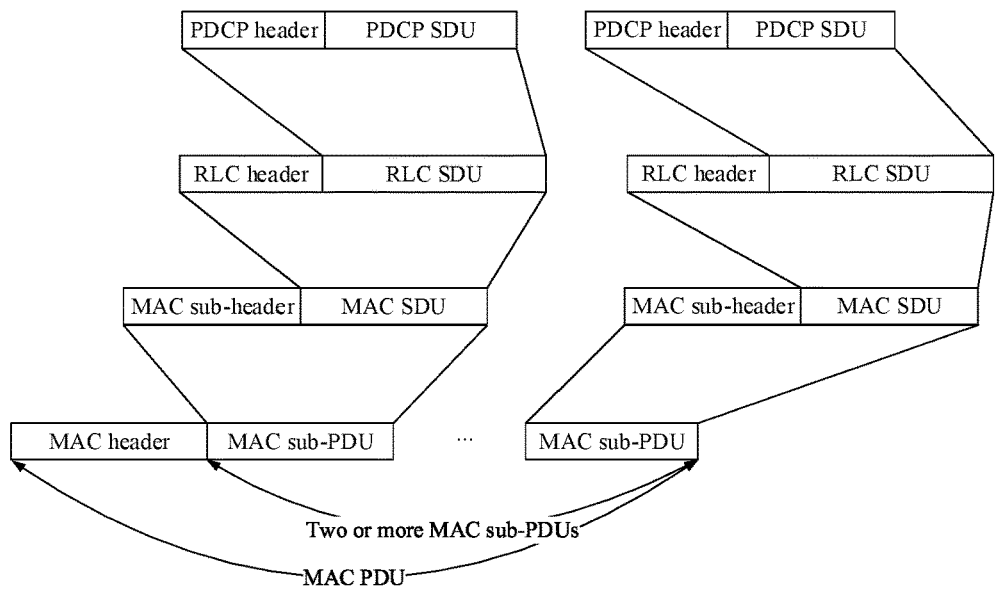
FIG. 8A illustrates a schematic diagram of multi-layer PDU processing according to one embodiment of the present disclosure.

Embodiment 8A illustrates a schematic diagram of multi-layer PDU processing according to one embodiment of the present disclosure, as shown in FIG. 8A; on the basis of the Embodiment 7A, the Embodiment 8A provides further illustrations of the multi-layer PDU processing.

In one embodiment, two PDCP PDUs are respectively mapped to two RLC layers to form two RLC PDUs.

In one embodiment, two PDCP PDUs belonging to different RBs are respectively borne by two RLC PDUs on an RLC layer.

In one embodiment, a PDCP PDU in FIG. 8A bears the first status report in the present disclosure.

In one embodiment, a PDCP PDU in FIG. 8A bears the first status report in the present disclosure, the first status report being a PDCP Status report.

In one embodiment, each RLC PDU in FIG. 8A is borne by a MAC sub-PDU, respectively.

In one embodiment, the MAC sub-PDUs in FIG. 8A belong to a same MAC PDU.

In one embodiment, the MAC sub-PDUs in FIG. 8A are multiplexed in a MAC PDU.

In one embodiment, a source ID comprised in a MAC Header in FIG. 8A comprises part of bits in the first ID or part of bits in the second ID of the present disclosure.

In one embodiment, each of the RLC PDUs has a same receiver.

In one embodiment, each of the MAC sub-PDUs has a same receiver.

In one embodiment, as illustrated in FIG. 8A a PDCP PDU bears a PC5-S signaling, and another PDCP PDU bears an RRC signaling.

In one embodiment, as illustrated in FIG. 8A a PDCP PDU bears a PC5-S signaling, and another PDCP PDU bears data.

In one embodiment, as illustrated in FIG. 8A a PDCP PDU bears an RRC signaling, and another PDCP PDU bears data.

Embodiment 8B

Figure 8B:
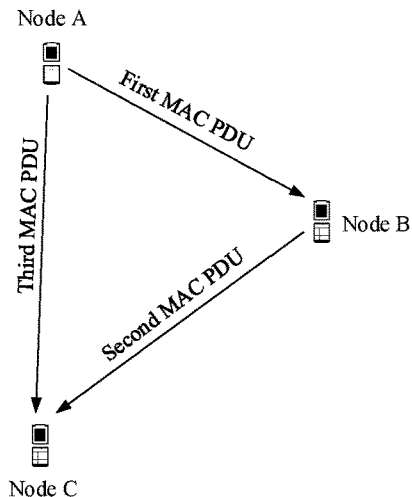
FIG. 8B illustrates a schematic diagram of a node A in communication with a node C according to one embodiment of the present disclosure.

Embodiment 8B illustrates a schematic diagram of a node A in communication with a node C according to one embodiment of the present disclosure, as shown in FIG. 8B.

In Embodiment 8A, the node A corresponds to the second node in the present disclosure the node C corresponds to the third node in the present disclosure; and the node B corresponds to the first node in the present disclosure.

In one embodiment, an interface between the node A and the node B is a PC5 interface.

In one embodiment, an interface between the node A and the node C is a PC5 interface.

In one embodiment, an interface between the node B and the node C is a PC5 interface.

In one embodiment, the first MAC PDU comprises a first MAC sub-PDU, the first MAC sub-PDU comprising a first packet.

In one embodiment, the second MAC PDU comprises a second MAC sub-PDU, the second MAC sub-PDU comprising the first packet.

In one embodiment, the third MAC PDU comprises a third MAC sub-PDU, the third MAC sub-PDU comprising the first packet.

In one embodiment, the first MAC PDU and the second MAC PDU respectively carry at least part of bits in a same PDCP SDU.

In one embodiment, the first MAC PDU, the second MAC PDU and the third MAC PDU respectively carry at least part of bits in a same PDCP SDU.

In one embodiment, the first MAC PDU is used for generating the second MAC PDU.

In one embodiment, at least part of bits in the first packet carried by the first MAC PDU are carried by the second MAC PDU.

In one embodiment, a source ID carried by the first MAC PDU is different from a source ID carried by the third MAC PDU.

In one embodiment, a destination ID carried by the first MAC PDU is different from a source ID carried by the second MAC PDU.

In one embodiment, a destination ID carried by the second MAC PDU is different from a destination ID carried by the third MAC PDU.

In one embodiment, different MAC PDUs carrying a same PDCP SDU transmitted by the node A have different source addresses.

In one embodiment, different MAC PDUs carrying a same PDCP SDU received by the node C have different destination addresses.

In one embodiment, different MAC PDUs carrying a same PDCP SDU transmitted by the node A have different logical channel IDs.

In one embodiment, different MAC PDUs carrying a same PDCP SDU transmitted by the node A have a same logical channel ID.

In one embodiment, different MAC PDUs carrying a same PDCP SDU received by the node C have different logical channel IDs.

In one embodiment, different MAC PDUs carrying a same PDCP SDU received by the node C have a same logical channel ID.

In one embodiment, an SRC of the third MAC PDU comprises at least part of bits in a fourth ID.

In one embodiment, a DST of the third MAC PDU comprises at least part of bits in a fifth ID.

In one embodiment, the fourth ID is different from any one of the first ID, the second ID and the third ID.

In one embodiment, the fifth ID is different from any one of the first ID, the second ID and the third ID.

In one embodiment, the fourth ID is different from the fifth ID.

In one embodiment, the fourth ID is used to determine the node A.

In one embodiment, the first ID is used to determine the node A.

In one embodiment, the fifth ID is used to determine the node C.

In one embodiment, the third ID is used to determine the node C.

In one embodiment, the first MAC PDU carries the second ID.

In one embodiment, the DST of the first MAC PDU is a sixth ID, the sixth ID is different from the second ID, and the sixth ID determines the node A.

In one embodiment, an advantage of the above method includes that the ID updating of each node won't influence communications between other nodes, and the communications between other nodes won't cause any impact on security or privacy.

In one embodiment, an advantage of the above method includes that the node B which serves as a relay node and the node C, which is the destination node, do not need to maintain a higher-layer link, including a secure link.

Embodiment 9A

Figure 9A:
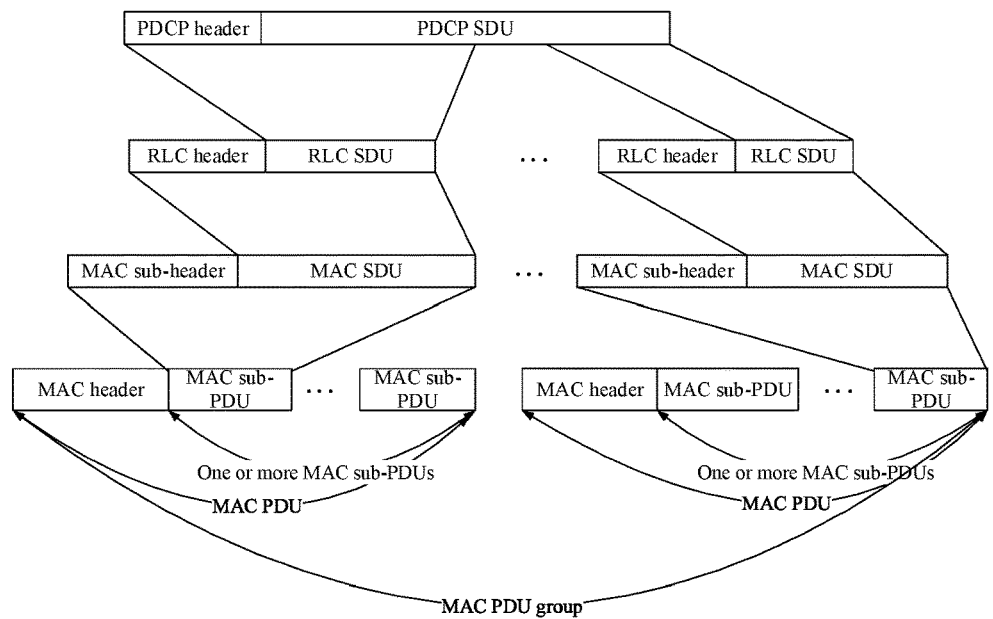
FIG. 9A illustrates a schematic diagram of multi-layer PDU processing according to one embodiment of the present disclosure.

Embodiment 9A illustrates a schematic diagram of multi-layer PDU processing according to one embodiment of the present disclosure, as shown in FIG. 9A; on the basis of the Embodiment 7A, the Embodiment 9A provides further illustrations of the multi-layer PDU processing.

In one embodiment, a PDCP PDU comprises a PDCP SDU.

In one embodiment, a PDCP PDU is transmitted to an RLC layer.

In one embodiment, a PDCP PDU is transmitted to an RLC entity.

In one embodiment, a PDCP PDU is transmitted to an RLC entity via an interface between a PDCP entity and the RLC entity.

In one embodiment, a PDCP PDU is transmitted to an RLC layer by an RLC bearer provided by an RLC entity.

In one embodiment, an RLC SDU comprises a segment of the PDCP PDU.

In one embodiment, an RLC PDU comprises a segment of an RLC SDU.

In one embodiment, an RLC PDU comprises a segment of a PDCP SDU.

In one embodiment, the RLC layer performs segmentation processing on the PDCP PDU.

In one embodiment, the PDCP PDU is split into Y segments by an RLC layer, and each of the segments is carried by an RLC PDU.

In one embodiment, an RLC Header of each RLC PDU carrying a PDCP PDU segment comprises a SO field.

In one embodiment, multiple RLC PDUs that carry different segments of a same PDCP PDU employ a same Radio Bearer.

In one embodiment, each MAC SDU corresponds to an RLC PDU.

In one embodiment, each MAC subhead carries a same logical channel ID.

In one embodiment, MAC subheads of any two MAC sub-PDUs respectively carrying different segments of a same PDCP PDU carry a same logical channel ID.

In one embodiment, the MAC subhead in FIG. 9A carries the first logical channel ID.

In one embodiment, the PDCP SDU in FIG. 9A is the first SDU in the present disclosure.

In one embodiment, the PDCP SDU in FIG. 9A is the second SDU in Embodiment 5A.

In one embodiment, in a first transmission on the first SDU, the PDCP layer employs a first logical channel ID to encrypt the first SDU.

In one embodiment, in a second transmission on the first SDU, the PDCP layer employs a second logical channel ID to encrypt the first SDU.

In one embodiment, MAC sub-PDUs respectively carrying different segments of a same PDCP PDU belong to different MAC PDUs.

In one embodiment, MAC sub-PDUs respectively carrying different segments of a same PDCP PDU belong to a same MAC PDU group.

In one embodiment, the MAC PDU group in FIG. 9A is the first MAC PDU group in the present disclosure.

In one embodiment, the MAC PDU group in FIG. 9A is the second MAC PDU group in the present disclosure.

In one embodiment, in a first transmission performed on the first SDU, the PDCP PDU carries a MAC-I field, and the first key ID is used for generating the MAC-I.

In one embodiment, in a first transmission performed on the first SDU, the PDCP PDU carries a MAC-I field, and the first logical channel ID is used for generating the MAC-I.

In one embodiment, in a second transmission performed on the first SDU, the PDCP PDU carries a MAC-I field, and the second key ID is used for generating the MAC-I.

In one embodiment, in a second transmission performed on the first SDU, the PDCP PDU carries a MAC-I field, and the second logical channel ID is used for generating the MAC-I.

Embodiment 9B

Figure 9B:
FIG. 9B illustrates a schematic diagram of a first parameter set generating a second ID according to one embodiment of the present disclosure.

Embodiment 9B illustrates a schematic diagram of a first parameter set generating a second ID according to one embodiment of the present disclosure, as shown in FIG. 9B.

In one embodiment, the first node generates a second ID according to the first parameter set.

In one embodiment, the first ID set is a subset of the first parameter set.

In one embodiment, the first signaling indicates the first parameter set.

In one embodiment, at least one parameter in the first parameter set is locally generated by the first node.

In one embodiment, at least one parameter in the first parameter set is in no need of indication by any signaling.

In one embodiment, at least one parameter in the first parameter set is fixed.

In one embodiment, the first signaling indicates a first generation parameter, and the first parameter set comprises the first generation parameter.

In one embodiment, the first generation parameter is a random seed.

In one embodiment, the first generation parameter is a bit range of an identity.

In one embodiment, the first generation parameter is an identifier of algorithm used for generating the second ID.

In one embodiment, for the given first parameter set, the second ID is determined.

In one embodiment, the second ID is generated by a first function with the first parameter set being employed as an input.

In one embodiment, the first function is fixed.

In one embodiment, the first function is no need of configuration by any signaling.

In one embodiment, the first function is configurable.

In one embodiment, the first function is configured by the first signaling.

In one embodiment, the first parameter set comprises the first ID set.

In one embodiment, the first ID set comprises a first source ID and a third destination ID.

In one embodiment, the first source ID determines a transmitter of the first signaling, and the third destination ID determines a receiver of the second MAC PDU.

In one embodiment, the first source ID is the first ID.

In one embodiment, the third destination ID is the third ID.

In one embodiment, the first MAC PDU carries the first source ID.

In one embodiment, the second MAC PDU carries the third destination ID.

In one embodiment, the second ID is a combination of the first source ID and the third destination ID.

In one embodiment, V1 most significant bit(s) (MSB(s)) in the second ID is(are) from V1 MSB(s) in the first source ID, and V2 least significant bit(s) (LSB(s)) in the second ID is(are) from V2 LSB(s) in the third destination ID, V1 and V2 being positive integers.

In one embodiment, V1 most significant bit(s) (MSB(s)) in the second ID is(are) from V1 LSB(s) in the first source ID, and V2 least significant bit(s) (LSB(s)) in the second ID is(are) from V2 MSB(s) in the third destination ID, V1 and V2 being positive integers.

In one embodiment, V1 most significant bit(s) (MSB(s)) in the second ID is(are) from V1 MSB(s) in the third destination ID, and V2 least significant bit(s) (LSB(s)) in the second ID is(are) from V2 LSB(s) in the first source ID, V1 and V2 being positive integers.

In one embodiment, V1 most significant bit(s) (MSB(s)) in the second ID is(are) from V1 LSB(s) in the third destination ID, and V2 least significant bit(s) (LSB(s)) in the second ID is(are) from V2 MSB(s) in the first source ID, V1 and V2 being positive integers.

In one embodiment, the second ID is a combination of Z1 MSB(s) in the first source ID and Z-Z1 LSB(s) in the third destination ID, wherein Z is a number of bits comprised in the second ID, and Z1 is a positive integer less than Z.

In one embodiment, Z is equal to 24, and Z1 is equal to 8.

In one embodiment, Z is equal to 24, and Z1 is equal to 16.

In one embodiment, the second ID is a combination of Z2 LSB(s) in the first source ID and Z-Z2 MSB(s) in the third destination ID, wherein Z is a number of bits comprised in the second ID, and Z2 is a positive integer less than Z.

In one embodiment, Z is equal to 24, and Z2 is equal to 8.

In one embodiment, Z is equal to 24, and Z2 is equal to 16.

In one embodiment, at least E bit(s) in the second ID is(are) obtained by E bit(s) in the first source ID and E bit(s) in the third destination ID being through Modulo-2 Addition (MOD-2 ADD), wherein E is a positive integer greater than 0.

In one subembodiment, E is equal to 24.

In one subembodiment, E is equal to 8.

In one subembodiment, E is equal to 16.

In one subembodiment, an e-th bit of the E bits in the second ID is obtained by an e-th bit of the E bits in the first source ID and an e-th bit of the E bits in the third destination ID being through MOD-2 ADD.

In one subembodiment of the above embodiments, the e-th bit is any one of the E bits.

In one subembodiment of the above embodiments, the e-th bit is the e-th MSB bit among the E bits.

In one embodiment, at least E bit(s) in the second ID is(are) obtained by E bit(s) in the first source ID, E bit(s) in the third destination ID and E random bit(s) being through Modulo-2 Addition (MOD-2 ADD), wherein E is a positive integer greater than 0.

In one subembodiment, E is equal to 24.

In one subembodiment, E is equal to 8.

In one subembodiment, E is equal to 16.

In one subembodiment, the E random bit(s) is(are) determined by the first generation parameter.

In one subembodiment, an e-th bit of the E bits in the second ID is obtained by an e-th bit of the E bits in the first source ID and an e-th bit of the E bits in the third destination ID being through MOD-2 ADD.

In one subembodiment of the above embodiments, the e-th bit is any one of the E bits.

In one subembodiment of the above embodiments, the e-th bit is the e-th MSB bit among the E bits.

In one embodiment, the second ID is obtained by the first source ID being first cyclic shifted by C1 bit(s) and the third destination ID being second cyclic shifted by C2 bit(s) jointly being through MOD-2 ADD.

In one subembodiment, C1 is an integer greater than or equal to 0.

In one subembodiment, C2 is an integer greater than or equal to 0.

In one subembodiment, at least one of C1 or C2 is greater than 0.

In one subembodiment, the first cyclic shift is either left cyclic shift or right cyclic shift.

In one subembodiment, the second cyclic shift is either left cyclic shift or right cyclic shift.

In one embodiment, the second ID is obtained by I1 bit(s) in the first source ID and I2 bit(s) in the third destination ID being interleaved, herein, I1 and I2 are both positive integers greater than 0, and I1+I2 is equal to the length of the second ID.

In one subembodiment, I1 is equal to I2 (i.e., I1=I2), the n1-th bit in the second ID is from the first source ID (SRC), and the (n1+1)-th bit is from the third destination ID (DST); the n2-th bit in the second ID is from the third DST, and the (n2+1)-th bit is from the first SRC; herein, n1 and n2 are both positive integers greater than 0.

In one subembodiment, I1=A1*I2, the n1-th bit to the (n1+A1−1)-th bit in the second ID are from the first source ID (SRC), and then the (n1+A1)-th bit in the second ID is from the third destination ID (DST); the n2-th bit in the second ID is from the third DST, and then the (n2+1)-th bit to the (n2+A1)-th bit are from the first SRC; herein, n1 and n2 are both positive integers greater than 0; and A1 is a positive integer.

In one subembodiment, I2=A2*I1, the n1-th bit in the second ID is from the first source ID (SRC), and then the (n1+1)-th bit to the (n1+A2)-th bit are from the third destination ID (DST); the n2-th bit to the (n2+A2−1)-th bit in the second ID are from the third DST, and then the (n2+A2)-th bit is from the first SRC; herein, n1 and n2 are both positive integers greater than 0, and A2 is a positive integer.

In one subembodiment, values of I1 and I2 are related to the first time information.

In one subembodiment, a ratio between I1 and I2 is related to the first time information.

In one subembodiment, the value of I1 is DFN mod T1, DFN (that is, Direct Frame Number) being determined by the first time information and T1 being a positive integer.

In one subembodiment, T1 is equal to 8.

In one subembodiment, T1 is equal to 12.

In one subembodiment, T1 is equal to 16.

In one subembodiment, T1 is equal to 24.

In one subembodiment, a ratio of I1 to I2 is DFN mod T2, DFN being determined by the first time information and T2 being a positive integer.

In one subembodiment, a ratio of I2 to I1 is DFN mod T2, DFN being determined by the first time information and T2 being a positive integer.

In one subembodiment, T2 is equal to 1.

In one subembodiment, T2 is equal to 2.

In one subembodiment, T2 is equal to 3.

In one subembodiment, T2 is equal to 4.

In one subembodiment, T2 is equal to 6.

In one embodiment, the first time information determines a first bit sequence, and a length of the first bit sequence is equal to the length of the second ID.

In one embodiment, the first time information comprises DFN, and the first bit sequence comprises at least part of bits in the DFN.

In one subembodiment, KK1 least significant bit(s) (LSB(s)) in the first bit sequence is(are) from DFN, while other bits comprised in the first bit sequence are all zeros or all ones, herein KK1 is a length of DFN.

In one embodiment, the first time information comprises SFN (that is, System Frame Number), and the first bit sequence comprises at least part of bits in the SFN.

In one subembodiment, KK2 least significant bit(s) (LSB(s)) in the first bit sequence is(are) from SFN, while other bits comprised in the first bit sequence are all zeros or all ones, herein KK2 is a length of SFN.

In one embodiment, a value of each bit comprised in the first bit sequence is used to determine whether a corresponding bit comprised in the second ID is from the first SRC or the third DST.

In one subembodiment, a bx-th bit in the first bit sequence is of the value of 0, so the value of a bx-th bit in the second ID is from the first SRC; a bx-th bit in the first bit sequence is of the value of 1, so the value of a bx-th bit in the second ID is from the third DST; herein, the bx-th bit is any bit comprised in the first bit sequence.

In one subembodiment, a bx-th bit in the first bit sequence is of the value of 1, so the value of a bx-th bit in the second ID is from the first SRC; a bx-th bit in the first bit sequence is of the value of 0, so the value of a bx-th bit in the second ID is from the third DST; herein, the bx-th bit is any bit comprised in the first bit sequence.

In one embodiment, a first parameter which serves as an input parameter is input to a RE-digit register, the second ID is determined by an output of the RE-digit register, herein RE is a positive integer.

In one subembodiment, the first parameter comprises the first generation parameter.

In one subembodiment, the first parameter comprises the first time information.

In one subembodiment, the first parameter comprises DFN determined by the first time information.

In one subembodiment, the first parameter comprises SFN determined by the first time information.

In one subembodiment, the first parameter comprises at least part of bits in the first SRC.

In one subembodiment, the first parameter comprises at least part of bits in the third DST.

In one subembodiment, RE is equal to the length of the second ID.

In one subembodiment, RE is equal to 23.

In one subembodiment, RE is equal to 24.

In one subembodiment, RE is equal to 25.

In one subembodiment, at least part of bits in the second ID are equal to a value output by the RE-digit register.

In one subembodiment, all bits in the second ID are equal to a value output by the RE-digit register.

In one embodiment, the first generation parameter is a cyclic shift value.

In one subembodiment, the cyclic shift value is 0.

In one subembodiment, the cyclic shift value is an integer.

In one embodiment, the second ID L2 is determined by the following function:

L2=L1 XOR C(L3, O1)

Herein, L2 is the second ID, L1 is the first SRC, and L3 is the third DST, C ( ) is a cyclic shift function, O1 is a cyclic shift value determined by the first generation parameter, and XOR means XOR (i.e., exclusive or) operation.

In one embodiment, C ( ) is a left cyclic shift function or a right cyclic shift function.

In one embodiment, for a bit sequence of [b1 b2 b3 b4 b5] comprising 5 bits, when a shift value is 2, the processing result of the cyclic shift function C ( ) is:

C ([b1 b2 b3 b4 b5], 2)=>[b3 b4 b5 b1 b2].

In one embodiment, the first ID set only comprises one of the first SRC and the third DST.

In one embodiment, the second ID L2 is determined by the following relationship:

L2=C(Lx,O2)

Herein, L2 is the second ID, C ( ) is a cyclic shift function, O2 is a cyclic shift value determined by the first generation parameter.

In one subembodiment, Lx is the first SRC.

In one subembodiment, Lx is the third DST.

In one embodiment, the second ID L2 is determined by the following relationship:

L2=D(Lx)

Herein, D is a second function.

In one subembodiment, D is a decryption function.

In one subembodiment, the second function is configurable.

In one subembodiment, the second function is fixed.

In one subembodiment, Lx is the first SRC.

In one subembodiment, Lx is the third DST.

In one subembodiment, Lx is the fourth ID, the fourth ID being an identity employed before the first signaling is transmitted.

In one subembodiment, Lx is the fourth ID, and the first signaling indicates that the fourth ID is renewed as the second ID.

In one subembodiment, the first signaling implicitly indicates the first ID set.

In one subembodiment, the first signaling indicates that the second ID is in effect.

In one subembodiment, the first node detects a MAC PDU carrying the second ID.

In one subembodiment, the first node detects a MAC PDU carrying the fourth ID and a MAC PDU carrying the second ID simultaneously.

In one subembodiment, D is determined through consultation of the first node and a transmitter of the first signaling.

In one subembodiment, D is determined by a transmitter of the first signaling

In one embodiment, an advantage of the above methods lies in that the second ID being determined according to an ID before updating ensures that an ID can be updated as fast as possible and easily verified.

In one embodiment, the second ID L2 is determined by the following relationship:

L2=F1 (Ly, R1)

Herein, F1 is a fixed function, and R1 is determined by the first generation parameter.

In one subembodiment, F1 is a XOR function.

In one subembodiment, R1 is a random bit sequence.

In one subembodiment, Ly is the first SRC.

In one subembodiment, Ly is the third DST.

In one subembodiment, Ly is the fourth ID, the fourth ID being an identity employed before the first signaling is transmitted.

In one subembodiment, Ly is the fourth ID, and the first signaling indicates that the fourth ID is renewed as the second ID.

In one embodiment, the second ID L2 is determined by the following relationship:

L2=F2 (Lz1, Lz2, R2)

Herein, F2 is a fixed function, and R2 is determined by the first generation parameter.

In one subembodiment, F2 is a slice function used for slicing the first R2 bit(s) of Lz1 and then concatenating with the last (24-R2) bit(s) of Lz2, herein, R2 is a positive integer greater than 0 and less than 24.

In one subembodiment, F2 is a XOR function.

In one subembodiment, R2 is a random bit sequence.

In one subembodiment, the first generation parameter indicates R2.

In one subembodiment, the first generation parameter indicates a seed for generating R2.

In one subembodiment, Lz1 is the first SRC.

In one subembodiment, Lz2 is the third DST.

In one subembodiment, either Lz1 or Lz2 is the fourth ID, the fourth ID being an identity employed before the first signaling is transmitted.

In one subembodiment, either Lz1 or Lz2 is the fourth ID, and the first signaling indicates that the fourth ID is renewed as the second ID.

In one subembodiment, F2 is an interleave function used for interleaving Lz1 and Lz2 under the control of a parameter R2.

In one subembodiment, R2 is an interleaving depth.

In one subembodiment, R2 is a type indicator of interleaving.

In one embodiment, the first parameter set comprises first time information.

In one embodiment, the first time information comprises System Frame Number (SFN).

In one embodiment, the first time information comprises Direct Frame Number (DFN).

In one embodiment, the first time information comprises DFN of a transmission time for the first signaling In one embodiment, the first time information comprises SFN of a transmission time for the first signaling In one embodiment, the first time information comprises DFN of a reception time for the first signaling In one embodiment, the first time information comprises SFN of a reception time for the first signaling In one embodiment, the first time information comprises DFN of a transmission time for the second MAC PDU.

In one embodiment, the first time information comprises SFN of a transmission time for the second MAC PDU.

In one embodiment, the first time information comprises DFN of a reception time for the second MAC PDU.

In one embodiment, the first time information comprises SFN of a reception time for the second MAC PDU.

In one embodiment, the second ID L2 is determined by the following relationship:

L2=F3 (Lz3, Lz4, t1)

Herein, F3 is a fixed function, and t1 is determined by the first generation parameter.

In one subembodiment, F3 is a slice function used for slicing the first t1 bit(s) of Lz3 and then concatenating with the last (24-t1) bit(s) of Lz4, herein t1 is a value of DFN mod 24.

In one subembodiment, F3 is a XOR function.

In one subembodiment, t1 is a random bit sequence.

In one subembodiment, Lz3 is the first SRC.

In one subembodiment, Lz4 is the third DST.

In one subembodiment, either of Lz3 and Lz4 is the fourth ID, the fourth ID being an identity employed before the first signaling is transmitted.

In one subembodiment, either of Lz3 and Lz4 is the fourth ID, and the first signaling indicates that the fourth ID is renewed as the second ID.

In one subembodiment, F3 is an interleave function used for interleaving Lz3 and Lz4 under the control of a parameter t1.

In one subembodiment, t1 is an interleaving depth.

In one subembodiment, t1 is a type indicator of interleaving.

In one embodiment, an advantage of the above methods lies in that the generation of a second ID is time-dependent and more secure; furthermore, a second ID carried by a MAC PDU can change with time, hence higher security.

In one embodiment, the first signaling indicates a second ID and a fifth ID.

In one embodiment, the first node monitors a physical channel comprising a second ID and a physical channel comprising the fifth ID simultaneously.

In one embodiment, the first node monitors a MAC PDU comprising a second ID and a MAC PDU comprising the fifth ID simultaneously.

In one embodiment, the first node monitors a MAC PDU and SCI respectively comprising a second ID and the fifth ID simultaneously.

In one embodiment, the fifth ID is of no effect anymore and the second ID is in effect immediately after a MAC PDU carrying the second ID is detected.

In one embodiment, when the second ID is detected, the fifth ID is of no effect anymore and the second ID is in effect immediately.

In one embodiment, the first parameter set comprises the first link ID.

In one embodiment, the first parameter set comprises the second link ID.

In one embodiment, the second ID at least comprises part of bits in the first link ID.

In one embodiment, the second ID at least comprises part of bits in the second link ID.

Embodiment 10

Figure 10:
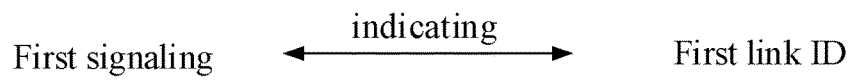
FIG. 10 illustrates a schematic diagram of a first signaling indicating a first link ID according to one embodiment of the present disclosure.

Embodiment 10 illustrates a schematic diagram of a first signaling indicating a first link ID according to one embodiment of the present disclosure, as shown in FIG. 10.

In one embodiment, the first signaling explicitly indicates the first link ID.

In one embodiment, the first link ID comprises a link layer ID.

In one embodiment, the first link ID comprises a physical layer ID.

In one embodiment, the first link ID comprises an application layer ID.

In one embodiment, the first link ID comprises a PC5 link ID.

In one embodiment, the first link ID is a traffic-related ID.

In one embodiment, the first link ID is an ID related to a transceiving node.

In one embodiment, the first link ID is an ID related to a transceiving node and traffics.

In one embodiment, the first link ID comprises an RB ID.

In one embodiment, the first link ID comprises a flow ID.

In one embodiment, the first link ID comprises a traffic ID.

In one embodiment, the first link ID comprises a session ID.

In one embodiment, the first link ID comprises a logical channel ID.

In one embodiment, the first link ID comprises a link ID.

In one embodiment, the first link ID comprises a unicast link ID.

In one embodiment, the first link ID comprises a SLRB-PC5-ConfigIndex.

In one embodiment, the first link ID determines the first link.

In one embodiment, the first link ID uniquely determines the first link.

In one embodiment, the first link ID is an identity of the first link.

In one embodiment, the first link comprises an RB.

In one embodiment, the first link comprises flow.

In one embodiment, the first link comprises traffics.

In one embodiment, the first link comprises a session.

In one embodiment, the first link comprises a logical channel

In one embodiment, the first link comprises a unicast link.

In one embodiment, the first link comprises a SLRB-PC5-ConfigIndex.

In one embodiment, the first link comprises a physical channel

In one embodiment, the first link comprises a transport channel

In one embodiment, the first link comprises a logical channel

In one embodiment, the first MAC PDU belongs to the first link.

In one embodiment, the first MAC PDU only belongs to the first link.

In one embodiment, the first ID corresponds to the first link.

In one embodiment, the first ID is bound to the first link.

In one embodiment, the first ID belongs to the first link.

In one embodiment, the first MAC PDU belongs to the first link.

In one embodiment, the first MAC PDU occupies the first link.

In one embodiment, the first MAC PDU only occupies the first link.

In one embodiment, the first MAC PDU is for the first link.

In one embodiment, the first MAC PDU bears data of traffic determined by the first link.

In one embodiment, the first MAC PDU employs an RB determined by the first link.

In one embodiment, the first MAC PDU employs a unicast link determined by the first link.

In one embodiment, the first ID is the only one ID that serves as an SRC to be associated with the first link.

In one embodiment, the first ID is the only one ID that serves as an SRC of a MAC PDU transmitted on the first link to be associated with the first link.

In one embodiment, the first signaling implicitly indicates the first link ID.

In one embodiment, the first signaling implicitly indicates the first link ID through transmission on the first link.

Embodiment 11

Figure 11:
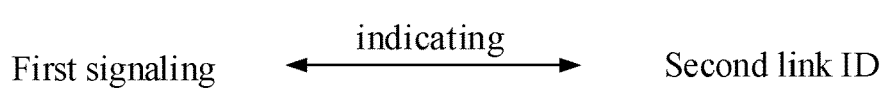
FIG. 11 illustrates a schematic diagram of a first signaling indicating a second link ID according to one embodiment of the present disclosure.

Embodiment 11 illustrates a schematic diagram of a first signaling indicating a second link ID according to one embodiment of the present disclosure, as shown in FIG. 11.

In one embodiment, the first signaling explicitly indicates the second link ID.

In one embodiment, the second link ID comprises a link layer ID.

In one embodiment, the second link ID comprises a physical layer ID.

In one embodiment, the second link ID comprises an application layer ID.

In one embodiment, the second link ID comprises a PC5 link ID.

In one embodiment, the second link ID is a traffic-related ID.

In one embodiment, the second link ID is an ID related to a transceiving node.

In one embodiment, the second link ID is an ID related to a transceiving node and traffics.

In one embodiment, the second link ID comprises an RB ID.

In one embodiment, the second link ID comprises a flow ID.

In one embodiment, the second link ID comprises a traffic ID.

In one embodiment, the second link ID comprises a session ID.

In one embodiment, the second link ID comprises a logical channel ID.

In one embodiment, the second link ID comprises a link ID.

In one embodiment, the second link ID comprises a unicast link ID.

In one embodiment, the second link ID comprises a SLRB-PC5-ConfigIndex.

In one embodiment, the second link ID determines the second link.

In one embodiment, the second link ID uniquely determines the second link.

In one embodiment, the second link ID is an identity of the second link.

In one embodiment, the second link comprises an RB.

In one embodiment, the second link comprises flow.

In one embodiment, the second link comprises traffics.

In one embodiment, the second link comprises a session.

In one embodiment, the second link comprises a logical channel

In one embodiment, the second link comprises a unicast link.

In one embodiment, the second link comprises a SLRB-PC5-ConfigIndex.

In one embodiment, the second link comprises a physical channel

In one embodiment, the second link comprises a transport channel

In one embodiment, the second link comprises a logical channel

In one embodiment, the second MAC PDU belongs to the second link.

In one embodiment, the second MAC PDU only belongs to the second link.

In one embodiment, the second ID corresponds to the second link.

In one embodiment, the second ID is bound to the second link.

In one embodiment, the second ID belongs to the second link.

In one embodiment, the second MAC PDU belongs to the second link.

In one embodiment, the second MAC PDU occupies the second link.

In one embodiment, the second MAC PDU is for the second link.

In one embodiment, the second MAC PDU bears data of traffic determined by the second link.

In one embodiment, the second MAC PDU employs an RB determined by the second link.

In one embodiment, the second MAC PDU employs a unicast link determined by the second link.

In one embodiment, the second MAC PDU only occupies the second link.

In one embodiment, the second ID is the only one ID that serves as an SRC to be associated with the second link.

In one embodiment, the second ID is the only one ID that serves as an SRC of a MAC PDU transmitted on the second link to be associated with the second link.

In one embodiment, the first signaling implicitly indicates the second link ID.

In one embodiment, the first signaling implicitly indicates the second link ID through transmission on the second link.

In one embodiment, the second link is different from the first link.

In one embodiment, the second link ID is different from the first link ID.

Embodiment 12

Figure 12:
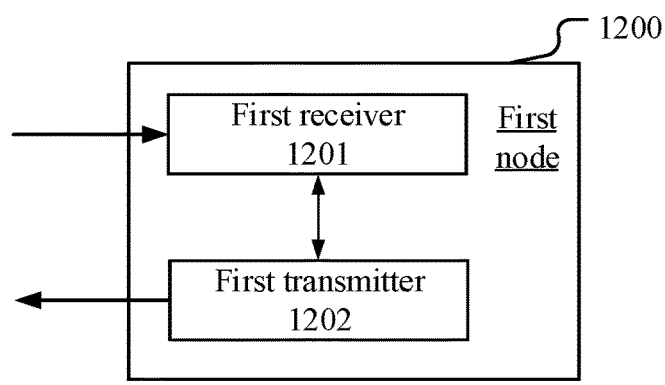
FIG. 12 illustrates a structure block diagram of a processing device used in a first node according to one embodiment of the present disclosure.

Embodiment 12 illustrates a schematic diagram of a processing device used in a first node according to one embodiment of the present disclosure, as shown in FIG. 12. In FIG. 12, a processing device 1200 in the first node comprises a first receiver 1201 and a first transmitter 1202.

In Embodiment 12, the first receiver 1201 receives a first signaling, the first signaling being used to indicate a first ID set, the first ID set comprising at least one link layer ID; and generates a second ID according to a first parameter set;
the first transmitter 1202 transmits a second MAC PDU;
herein, the second MAC PDU comprises at least part of bits in the second ID, and the first parameter set comprises the first ID set.

In one embodiment, the first receiver 1201 receives a first MAC PDU;
herein, the first MAC PDU comprises at least part of bits in the first ID, the first ID is a link layer ID in the first ID set, and the first MAC PDU and the second MAC PDU respectively comprise a first packet.

In one embodiment, the second MAC PDU comprises at least part of bits in a third ID, and the third ID is a link layer ID in the first ID set different from the first ID.

In one embodiment, the first signaling indicates a second link ID, the second link ID is used to determine a second link, and the second ID is associated with the second link, the second MAC PDU belonging to the second link.

In one embodiment, the first parameter set comprises first time information.

In one embodiment, the first receiver 1201 receives a first physical layer signaling, the first physical layer signaling comprises configuration information of a first channel, and a channel occupied by the first MAC PDU includes the first channel;
herein, the first physical layer signaling and the first MAC PDU jointly comprise the first ID.

In one embodiment, the first transmitter 1202 transmits a second physical layer signaling, the second physical layer signaling comprises configuration information of a second channel, and a channel occupied by the second MAC PDU includes the second channel;
herein, the second physical layer signaling and the second MAC PDU jointly comprise the second ID.

In one embodiment, the first transmitter 1202 transmits a third signaling, the third signaling being used to respond to the first signaling.

In one embodiment, the first signaling is used to indicate a first logical channel ID, and the first MAC PDU comprises the first logical channel ID.

In one embodiment, the first signaling is used to indicate a second logical channel ID, and the second MAC PDU comprises the second logical channel ID.

In one embodiment, the first node is a UE.

In one embodiment, the first node is a terminal supporting large delay difference.

In one embodiment, the first node is a terminal supporting NTN.

In one embodiment, the first node is an aircraft.

In one embodiment, the first node is a vehicle-mounted terminal.

In one embodiment, the first node is a relay.

In one embodiment, the first node is a ship.

In one embodiment, the first node is an IoT terminal.

In one embodiment, the first node is an IIoT terminal.

In one embodiment, the first node is a piece of equipment supporting transmission with low delay and high reliability.

In one embodiment, the first receiver 1201 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1202 comprises at least one of the antenna 452, the transmitter 454, the transmitting processor 468, the multi-antenna transmitting processor 457, the controller/processor 459, the memory 460 or the data source 467 in Embodiment 4.

Embodiment 13

Figure 13:
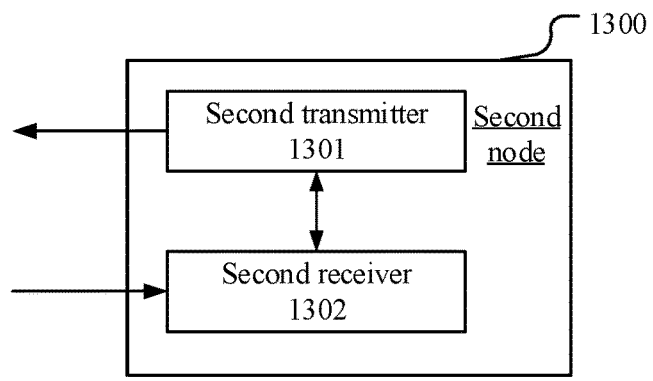
FIG. 13 illustrates a structure block diagram of a processing device used in a second node according to one embodiment of the present disclosure.

Embodiment 13 illustrates a structure block diagram of a processing device used in a second node according to one embodiment of the present disclosure; as shown in FIG. 13. In FIG. 13, a processing device 1300 in a second node comprises a second receiver 1302 and a second transmitter 1301.

In Embodiment 13, the second transmitter 1301 transmits a first signaling, the first signaling being used to indicate a first ID set, the first ID set comprising at least one link layer ID; a first parameter set is used to generate a second ID;
herein, a second MAC PDU comprises at least part of bits in the second ID, and the first parameter set comprises the first ID set.

In one embodiment, the second transmitter 1301 transmits a first MAC PDU;

herein, the first MAC PDU comprises at least part of bits in the first ID, the first ID is a link layer ID in the first ID set, and the first MAC PDU and the second MAC PDU respectively comprise a first packet.

In one embodiment, the second MAC PDU comprises at least part of bits in a third ID, and the third ID is a link layer ID in the first ID set different from the first ID.

In one embodiment, the first signaling indicates a first link ID, the first link ID is used to determine a first link, and the second ID is associated with the first link, the first MAC PDU belonging to the first link.

In one embodiment, the first signaling indicates a second link ID, the second link ID is used to determine a second link, and the second ID is associated with the second link, the second MAC PDU belonging to the second link.

In one embodiment, the first parameter set comprises first time information.

In one embodiment, the second transmitter 1301 transmits a first physical layer signaling, the first physical layer signaling comprises configuration information of a first channel, and a channel occupied by the first MAC PDU includes the first channel;

herein, the first physical layer signaling and the first MAC PDU jointly comprise the first ID.

In one embodiment, the second receiver 1302 receives a third signaling, the third signaling being used to respond to the first signaling.

In one embodiment, the first signaling is used to indicate the first signaling is used to indicate a first logical channel ID, and the first MAC PDU comprises the first logical channel ID.

In one embodiment, the first signaling is used to indicate a second logical channel ID, and the second MAC PDU comprises the second logical channel ID.

In one embodiment, the second node is a UE.

In one embodiment, the second node is a terminal supporting large delay difference.

In one embodiment, the second node is a terminal supporting NTN.

In one embodiment, the second node is an aircraft.

In one embodiment, the second node is a vehicle-mounted terminal.

In one embodiment, the second node is a relay.

In one embodiment, the second node is a ship.

In one embodiment, the second node is an IoT terminal.

In one embodiment, the second node is an IIoT terminal.

In one embodiment, the second node is a piece of equipment supporting transmission with low delay and high reliability.

In one embodiment, the second transmitter 1301 comprises at least one of the antenna 420, the transmitter 418, the transmitting processor 416, the multi-antenna transmitting processor 471, the controller/processor 475 or the memory 476 in Embodiment 4.

In one embodiment, the second receiver 1302 comprises at least one of the antenna 420, the receiver 418, the receiving processor 470, the multi-antenna receiving processor 472, the controller/processor 475 or the memory 476 in Embodiment 4.

Embodiment 14

Figure 14:
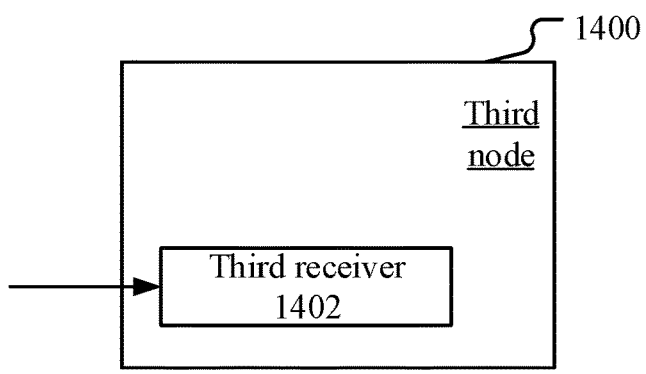
FIG. 14 illustrates a structure block diagram of a processing device used in a third node according to one embodiment of the present disclosure.

Embodiment 14 illustrates a structure block diagram of a processing device used in a third node according to one embodiment of the present disclosure; as shown in FIG. 14.

In FIG. 14, a processing device 1400 in the third node comprises a third receiver 1402.

In Embodiment 14, the third receiver 1402 receives a second MAC PDU;

herein, the second MAC PDU comprises at least part of bits in a second ID, and a first parameter set comprises the first ID set; a first signaling is used to indicate a first ID set, and the first ID set comprises at least one link layer ID; a first parameter set is used to generate a second ID.

In one embodiment, a first MAC PDU is used to generate the second MAC PDU, and the first MAC PDU comprises at least part of bits in a first ID, the first ID is a link layer ID in the first ID set, and the first MAC PDU and the second MAC PDU respectively comprise a first packet.

In one embodiment, the second MAC PDU comprises at least part of bits in a third ID, and the third ID is a link layer ID in the first ID set different from the first ID.

In one embodiment, the first signaling indicates a first link ID, the first link ID is used to determine a first link, and the second ID is associated with the first link, the first MAC PDU belonging to the first link.

In one embodiment, the first signaling indicates a second link ID, the second link ID is used to determine a second link, and the second ID is associated with the second link, the second MAC PDU belonging to the second link.

In one embodiment, the first parameter set comprises first time information.

In one embodiment, the third receiver 1402 receives a second physical layer signaling, the second physical layer signaling comprises configuration information of a second channel, and a channel occupied by the second MAC PDU includes the second channel;

herein, the second physical layer signaling and the second MAC PDU jointly comprise the second ID.

In one embodiment, the third receiver 1402 receives a third signaling, the third signaling being used to respond to the first signaling In one embodiment, the first signaling is used to indicate a first logical channel ID, and the first MAC PDU comprises the first logical channel ID.

In one embodiment, the first signaling is used to indicate a second logical channel ID, and the second MAC PDU comprises the second logical channel ID.

In one embodiment, the second node is a UE.

In one embodiment, the second node is a terminal supporting large delay difference.

In one embodiment, the second node is a terminal supporting NTN.

In one embodiment, the second node is an aircraft.

In one embodiment, the second node is a vehicle-mounted terminal.

In one embodiment, the second node is a relay.

In one embodiment, the second node is a ship.

In one embodiment, the second node is an IoT terminal.

In one embodiment, the second node is an IIoT terminal.

In one embodiment, the second node is a piece of equipment supporting transmission with low delay and high reliability.

In one embodiment, the third receiver 1402 comprises at least one of the antenna 420, the receiver 418, the receiving processor 470, the multi-antenna receiving processor 472, the controller/processor 475 or the memory 476 in Embodiment 4.

Embodiment 15

Figure 15:
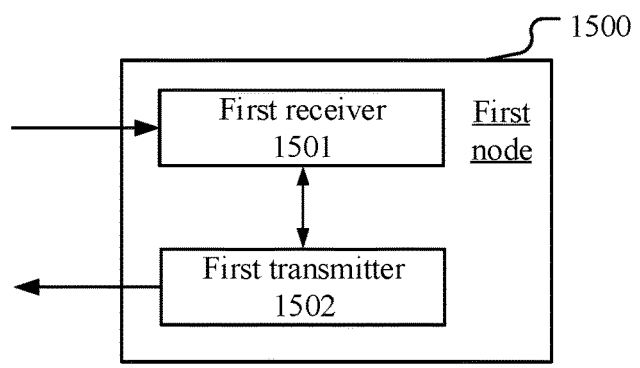
FIG. 15 illustrates a structure block diagram of a processing device used in a first node according to one embodiment of the present disclosure.

Embodiment 15 illustrates a structure block diagram of a processing device used in a first node according to one embodiment of the present disclosure; as shown in FIG. 15. In FIG. 15, a processing device 1500 in a first node comprises a first receiver 1501 and a first transmitter 1502.

In Embodiment 15, the first transmitter 1502 performs a first transmission on a first SDU; the action of performing a first transmission on the first SDU including transmitting a first MAC PDU group; the first MAC PDU group at least comprising a first MAC PDU;

the first receiver 1501 receives a first signaling and a first status report, the first signaling being used to indicate that a first ID is renewed as a second ID; the first status report being used to indicate that the first SDU is not received yet;

the first transmitter 1502 performs a second transmission on the first SDU; the action of performing a second transmission on the first SDU including transmitting a second MAC PDU group; the second MAC PDU group at least comprising a second MAC PDU;

herein, the first signaling is used to trigger the first status report, and the first ID and the second ID are link layer IDs, respectively; the first MAC PDU group carries the first SDU; the first MAC PDU group comprises at least part of bits comprised in the first ID; and the second MAC PDU group carries the first SDU; the second MAC PDU group comprises at least part of bits comprised in the second ID.

In one embodiment, the action of performing a first transmission on the first SDU includes:

transmitting a first physical layer signaling, the first physical layer signaling comprising configuration information of a first channel, and the first MAC PDU being transmitted on the first channel;

herein, the first physical layer signaling and the first MAC PDU jointly comprise the first ID.

In one embodiment, the action of performing a second transmission on the first SDU includes:

transmitting a second physical layer signaling, the second physical layer signaling comprising configuration information of a second channel, and the second MAC PDU being transmitted on the second channel;

herein, the second physical layer signaling and the second MAC PDU jointly comprise the second ID.

In one embodiment, the first status report indicates that a first SDU set is not received, the first SDU set comprising the first SDU.

In one embodiment, the first receiver 1501 receives a second signaling;

the first transmitter 1502 transmits a third signaling;

herein, the second signaling is used to trigger the third signaling, and the third signaling is used to trigger the first signaling.

In one embodiment, the first signaling is used to indicate that a first part of a first key ID is renewed as a first part of a second key ID; the action of performing a first transmission on the first SDU includes: the first transmitter 1502, using the first key ID to encrypt the first SDU; the action of performing a second transmission on the first SDU includes: the first transmitter 1502, using the second key ID to encrypt the first SDU.

In one embodiment, the first receiver 1501 receives a fourth signaling;

herein, the fourth signaling is used to indicate that a first logical channel ID is renewed as a second logical channel ID; the action of performing a first transmission on the first SDU includes: the first transmitter 1502, applying the first logical channel ID in secure algorithm of the first SDU; the action of performing a second transmission on the first SDU includes: the first transmitter 1502, applying the second logical channel ID in secure algorithm of the first SDU.

In one embodiment, the first node is a UE.

In one embodiment, the first node is a terminal supporting large delay difference.

In one embodiment, the first node is a terminal supporting NTN.

In one embodiment, the first node is an aircraft.

In one embodiment, the first node is a vehicle-mounted terminal.

In one embodiment, the first node is a relay.

In one embodiment, the first node is a ship.

In one embodiment, the first node is an IoT terminal.

In one embodiment, the first node is an IIoT terminal.

In one embodiment, the first node is a piece of equipment supporting transmission with low delay and high reliability.

In one embodiment, the first receiver 1501 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1502 comprises at least one of the antenna 452, the transmitter 454, the transmitting processor 468, the multi-antenna transmitting processor 457, the controller/processor 459, the memory 460 or the data source 467 in Embodiment 4.

Embodiment 16

Figure 16:
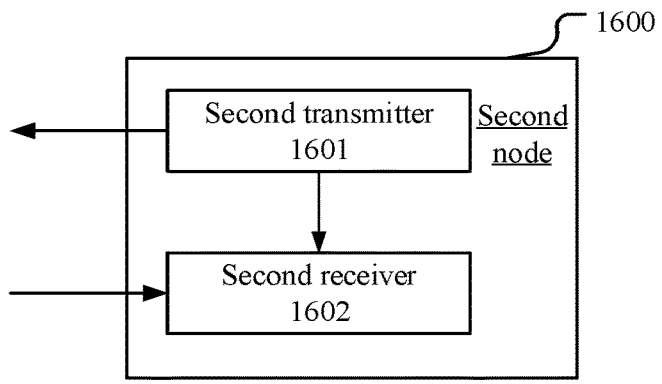
FIG. 16 illustrates a structure block diagram of a processing device used in a second node according to one embodiment of the present disclosure.

Embodiment 16 illustrates a structure block diagram of a processing device used in a second node according to one embodiment of the present disclosure; as shown in FIG. 16. In FIG. 16, a processing device 1600 in the second node comprises a second receiver 1602 and a second transmitter 1601.

In Embodiment 16, the first receiver 1602 fails to correctly receive a first MAC PDU group; the first MAC PDU group at least comprising a first MAC PDU;

the first transmitter 1601 transmits a first signaling and a first status report, the first signaling being used to indicate that a first ID is renewed as a second ID; the first status report being used to indicate that a first SDU is not received;

the first receiver 1602 receives a second MAC PDU group; the second MAC PDU group at least comprising a second MAC PDU;

herein, the first signaling is used to trigger the first status report, and the first ID and the second ID are link layer IDs, respectively; the first MAC PDU group carries the first SDU; the first MAC PDU group comprises at least part of bits comprised in the first ID; and the second MAC PDU group carries the first SDU; the second MAC PDU group comprises at least part of bits comprised in the second ID.

In one embodiment, the second receiver 1602 monitors a first physical layer signaling, the first physical layer signaling comprises configuration information of a first channel, and the first MAC PDU is transmitted on the first channel;

herein, the first physical layer signaling and the first MAC PDU jointly comprise the first ID.

In one embodiment, the second receiver 1602 monitors a second physical layer signaling, the second physical layer signaling comprises configuration information of a second channel, and the second MAC PDU is transmitted on the second channel;

herein, the second physical layer signaling and the second MAC PDU jointly comprise the second ID.

In one embodiment, the first status report indicates that a first SDU set is not received, the first SDU set comprising the first SDU.

In one embodiment, the second transmitter 1601 transmits a second signaling;
the second receiver 1602 receives a third signaling;
herein, the second signaling is used to trigger the third signaling, and the third signaling is used to trigger the first signaling.

In one embodiment, the first signaling is used to indicate that a first part of a first key ID is renewed as a first part of a second key ID; the first key ID is used to encrypt the first SDU carried by the first MAC PDU group; the second key ID is used to encrypt the first SDU carried by the second MAC PDU group; the second receiver 1602 employs the second key ID to decrypt the first SDU carried by the second MAC PDU group.

In one embodiment, the second transmitter 1601 transmits a fourth signaling;
herein, the fourth signaling is used to indicate that a first logical channel ID is renewed as a second logical channel ID; the first logical channel ID is applied in secure algorithm of the first SDU carried by the first MAC PDU group; the second logical channel ID is applied in secure algorithm of the first SDU carried by the second MAC PDU group.

In one embodiment, the second node is a UE.

In one embodiment, the second node is a terminal supporting large delay difference.

In one embodiment, the second node is a terminal supporting NTN.

In one embodiment, the second node is an aircraft.

In one embodiment, the second node is a vehicle-mounted terminal.

In one embodiment, the second node is a relay.

In one embodiment, the second node is a ship.

In one embodiment, the second node is an IoT terminal.

In one embodiment, the second node is an IIoT terminal.

In one embodiment, the second node is a piece of equipment supporting transmission with low delay and high reliability.

In one embodiment, the second transmitter 1601 comprises at least one of the antenna 420, the transmitter 418, the transmitting processor 416, the multi-antenna transmitting processor 471, the controller/processor 475 or the memory 476 in Embodiment 4.

In one embodiment, the second receiver 1602 comprises at least one of the antenna 420, the receiver 418, the receiving processor 470, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, satellite communication equipment, ship communication equipment, and NTN UE, etc. The base station or system device in the present disclosure includes but is not limited to macro-cellular base stations, micro-cellular base stations, home base stations, relay base station, gNB (NR node B), Transmitter Receiver Point (TRP), NTN base station, satellite equipment and fight platform, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising: a first transmitter, performing a first transmission on a first Service Data Unit (SDU); the action of performing a first transmission on the first SDU includes transmitting a first Media Access Control (MAC) Protocol Data Unit (PDU) group; the first MAC PDU group at least comprises a first MAC PDU; a first receiver, receiving a first signaling and a first status report, the first signaling being used to indicate that a first identifier (ID) is renewed as a second ID; the first status report is used to indicate that the first SDU is not received yet; and the first transmitter, performing a second transmission on the first SDU; the action of performing a second transmission on the first SDU includes transmitting a second MAC PDU group; the second MAC PDU group at least comprises a second MAC PDU; wherein the first signaling is used to trigger the first status report, and the first ID and the second ID are link layer IDs, respectively; the first MAC PDU group carries the first SDU; the first MAC PDU group comprises at least part of bits comprised in the first ID; and the second MAC PDU group carries the first SDU; the second MAC PDU group comprises at least part of bits comprised in the second ID.

2. The first node according to claim 1, wherein the action of performing a first transmission on the first SDU includes: transmitting a first physical layer signaling, the first physical layer signaling comprises configuration information of a first channel, and the first MAC PDU is transmitted on the first channel; wherein the first physical layer signaling and the first MAC PDU jointly comprise the first ID.

3. The first node according to claim 2, wherein the action of performing a second transmission on the first SDU includes: transmitting a second physical layer signaling, the second physical layer signaling comprises configuration information of a second channel, and the second MAC PDU group is transmitted on the second channel; wherein the second physical layer signaling and the second MAC PDU jointly comprise the second ID.

4. The first node according to claim 2, wherein the first status report indicates that a first SDU set is not received, the first SDU set comprising the first SDU.

5. The first node according to claim 4, comprising: the first receiver, receiving a second signaling; and the first transmitter, transmitting a third signaling; wherein the second signaling is used to trigger the third signaling, and the third signaling is used to trigger the first signaling.

6. The first node according to claim 5, wherein the second signaling comprises a key update request.

7. The first node according to claim 1, wherein the first signaling is used to indicate that a first part of a first key ID is renewed as a first part of a second key ID; the action of performing a first transmission on the first SDU includes: the first transmitter, using the first key ID to encrypt the first SDU; the action of performing a second transmission on the first SDU includes: the first transmitter, using the second key ID to encrypt the first SDU.

8. The first node according to claim 7, comprising: the first receiver, receiving a fourth signaling; wherein the fourth signaling is used to indicate that a first logical channel ID is renewed as a second logical channel ID; the action of performing a first transmission on the first SDU includes: the first transmitter, applying the first logical channel ID in secure algorithm of the first SDU; the action of performing a second transmission on the first SDU includes: the first transmitter, applying the second logical channel ID in secure algorithm of the first SDU.

9. The first node according to claim 8, wherein in the first transmission, all MAC PDUs that at least carry part of bits in the first SDU are determined to form the first MAC PDU group.

10. The first node according to claim 9, wherein in the second transmission, all MAC PDUs that at least carry part of bits in the first SDU are determined to form the first MAC PDU group.

11. The first node according to claim 8, wherein the action that the first SDU is not received yet includes that a variant of RX_DELIV is smaller than a variant of RX_NEXT (i.e., RX_DELIV<RX_NEXT) in a Packet Data Convergence Protocol (PDCP) entity in the first node, and a bit comprised in a bitmap carried by the first status report that corresponds to the first SDU is set to 0 (zero).

12. The first node according to claim 8, wherein the first status report implicitly indicates that the first SDU is not received, the first SDU is a first missing SDU, and a bitmap carried by the first status report only indicates reception of SDUs after the first missing SDU.

13. The first node according to claim 8, wherein a transmitter and a receiver of the first signaling only maintain an ID of a same type as the first ID.

14. The first node according to claim 8, wherein the first signaling is used to indicate that the first node re-establishes a Radio Link Control (RLC) entity associated with the first MAC PDU group.

15. The first node according to claim 8 wherein the first signaling is used to indicate that the first node resets a MAC entity associated with the first MAC PDU group.

16. The first node according to claim 8, wherein after receiving the first status report, the first node deletes an RLC PDU carried by the first MAC PDU group that is not yet confirmed in RLC buffer.

17. The first node according to claim 13, wherein the first signaling is used to indicate that the first node re-establishes an RLC entity associated with the first MAC PDU group.

18. The first node according to claim 17, wherein after receiving the first status report, the first node deletes an RLC PDU carried by the first MAC PDU group that is not yet confirmed in RLC buffer.

19. A second node for wireless communications, comprising: a second receiver, failing to correctly receive a first Media Access Control (MAC) Protocol Data Unit (PDU) group; the first MAC PDU group at least comprises a first MAC PDU; a second transmitter, transmitting a first signaling and a first status report, the first signaling being used to indicate that a first identifier (ID) is renewed as a second ID; the first status report is used to indicate that a first Service Data Unit (SDU) is not received; the second receiver, receiving a second MAC PDU group; the second MAC PDU group at least comprises a second MAC PDU; wherein the first signaling is used to trigger the first status report, and the first ID and the second ID are link layer IDs, respectively; the first MAC PDU group carries the first SDU; the first MAC PDU group comprises at least part of bits comprised in the first ID; and the second MAC PDU group carries the first SDU; the second MAC PDU group comprises at least part of bits comprised in the second ID.

20. A method in a first node for wireless communications, comprising: performing a first transmission on a first Service Data Unit (SDU); the action of performing a first transmission on the first SDU includes transmitting a first Media Access Control (MAC) Protocol Data Unit (PDU) group; the first MAC PDU group at least comprises a first MAC PDU; receiving a first signaling and a first status report, the first signaling being used to indicate that a first identifier (ID) is renewed as a second ID; the first status report is used to indicate that the first SDU is not received yet; and performing a second transmission on the first SDU; the action of performing a second transmission on the first SDU includes transmitting a second MAC PDU group; the second MAC PDU group at least comprises a second MAC PDU; wherein the first signaling is used to trigger the first status report, and the first ID and the second ID are link layer IDs, respectively; the first MAC PDU group carries the first SDU; the first MAC PDU group comprises at least part of bits comprised in the first ID; and the second MAC PDU group carries the first SDU; the second MAC PDU group comprises at least part of bits comprised in the second ID.

* * * * *